(12) United States Patent
Kido

(10) Patent No.: US 7,559,068 B2
(45) Date of Patent: *Jul. 7, 2009

(54) DISK CARRYING DEVICE WITH GUIDE BASE AND ARM ROLLER

(75) Inventor: Kunio Kido, Tokyo (JP)

(73) Assignee: Nidec Pigeon Corporation (JP)

( * ) Notice: Subject to any disclaimer, the term of this patent is extended or adjusted under 35 U.S.C. 154(b) by 626 days.

This patent is subject to a terminal disclaimer.

(21) Appl. No.: 11/104,772

(22) Filed: Apr. 13, 2005

(65) Prior Publication Data

US 2005/0235300 A1 Oct. 20, 2005

(30) Foreign Application Priority Data

Apr. 14, 2004 (JP) ............................. 2004-119621

(51) Int. Cl.
*G11B 17/04* (2006.01)
(52) U.S. Cl. ..................................................... 720/624
(58) Field of Classification Search ......... 720/604–605, 720/619–626, 631, 639–642, 652, 617
See application file for complete search history.

(56) References Cited

U.S. PATENT DOCUMENTS

| | | | | |
|---|---|---|---|---|
| 6,411,582 B1 * | 6/2002 | Nakatani et al. | ............. | 720/620 |
| 6,512,730 B1 * | 1/2003 | Lee et al. | ................... | 720/622 |
| 6,735,161 B1 * | 5/2004 | Sato et al. | ................... | 720/621 |
| 6,751,180 B2 * | 6/2004 | Tanaka et al. | ............... | 720/623 |
| 6,930,970 B2 * | 8/2005 | Kuo | ............................ | 720/620 |
| 6,978,467 B1 * | 12/2005 | Fukushima et al. | ......... | 720/624 |
| 7,039,925 B2 * | 5/2006 | Kobayashi et al. | .......... | 720/626 |
| 7,134,127 B2 * | 11/2006 | Aoki et al. | .................... | 720/619 |
| 7,140,030 B2 * | 11/2006 | Togawa | ....................... | 720/623 |
| 2003/0099182 A1 * | 5/2003 | Maeda et al. | ............... | 369/77.1 |
| 2003/0161243 A1 * | 8/2003 | Tuchiya | ....................... | 369/77.1 |
| 2005/0028179 A1 * | 2/2005 | Ho et al. | ...................... | 720/621 |

FOREIGN PATENT DOCUMENTS

JP  11-213506  8/1999
WO  WO 2004049324 A1 *  6/2004

OTHER PUBLICATIONS

English Abstract for Japanese Patent No. JP 11-213506 dated Aug. 6, 1999.

* cited by examiner

*Primary Examiner*—Jorge L Ortiz Criado
*Assistant Examiner*—Nathan Danielsen
(74) *Attorney, Agent, or Firm*—Cantor Colburn LLP

(57) ABSTRACT

A disk carrying device including a transporting roller for carrying a disk, a turntable and a damper for holding the disk, a trigger plate moved by carrying of the disk to a chucking position for changing a transmission route of driving force from the transporting roller to a cam plate, a first biasing means for urging the trigger plate to a position before moving, a guide base for pressing the disk on the transporting roller, an arm roller disposed on an opposite side of the guide base with respect to the transporting roller so as to move the guide base apart from the transporting roller, and a second biasing means disposed between the guide base and the arm roller. The second biasing means is extended when the disk is present between the guide base and the transporting roller and generates urging force pulling the guide base to the transporting roller.

4 Claims, 38 Drawing Sheets

[Fig. 1]
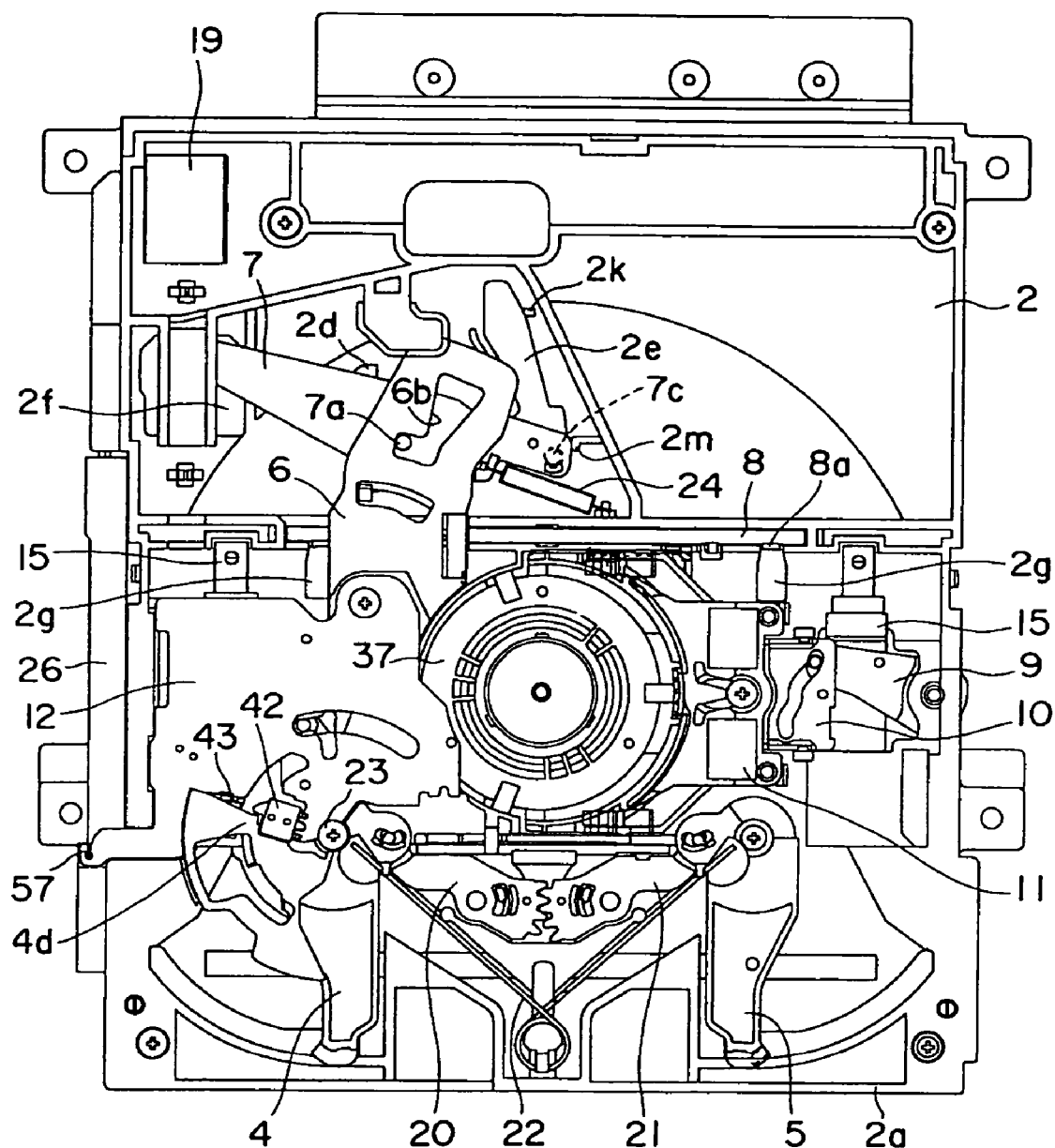

[Fig. 2]
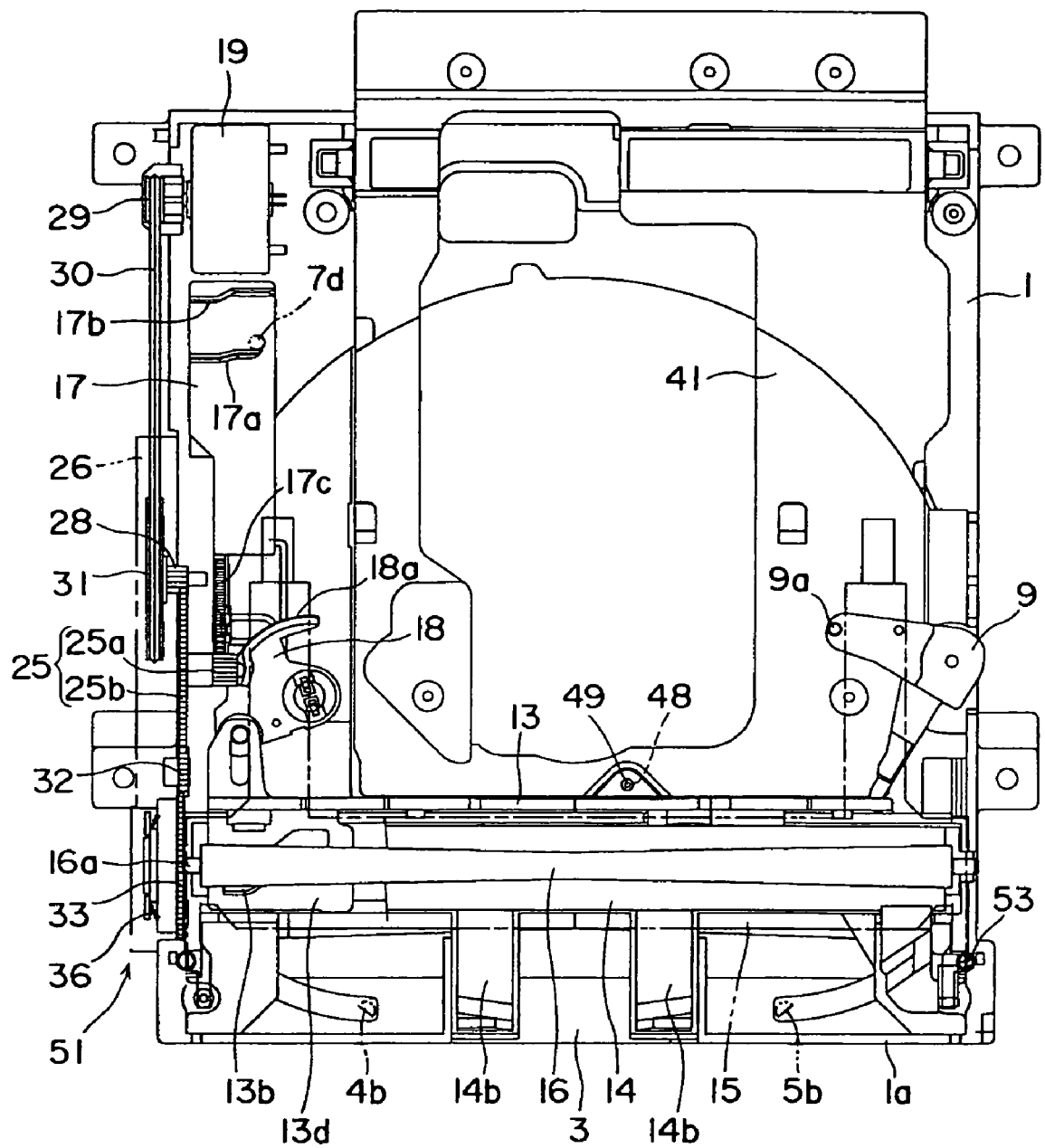

[Fig. 3]
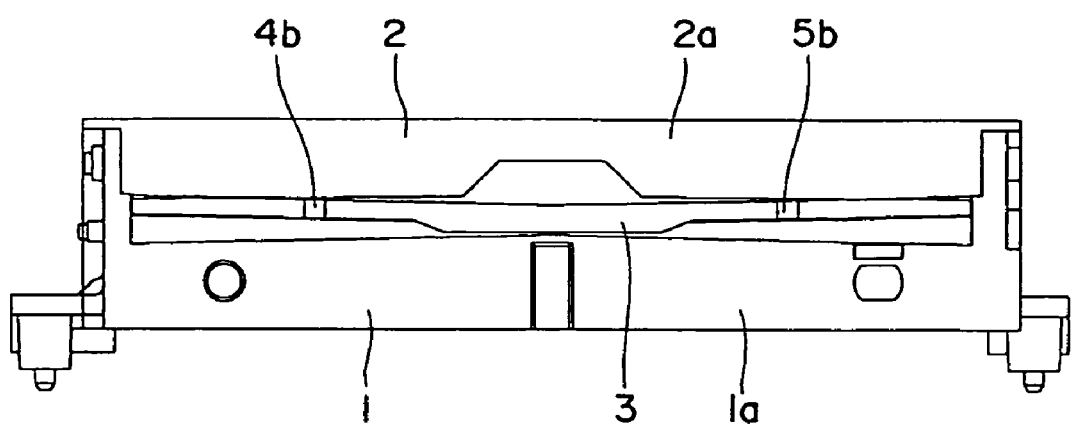

[Fig. 4]
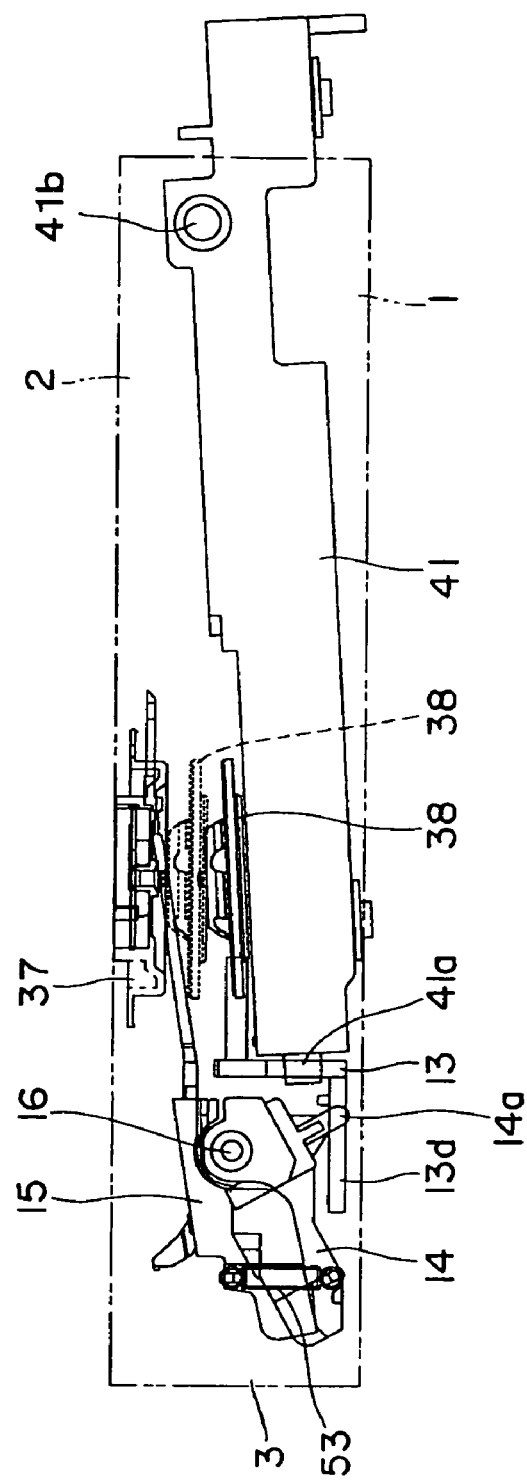

[Fig. 5]
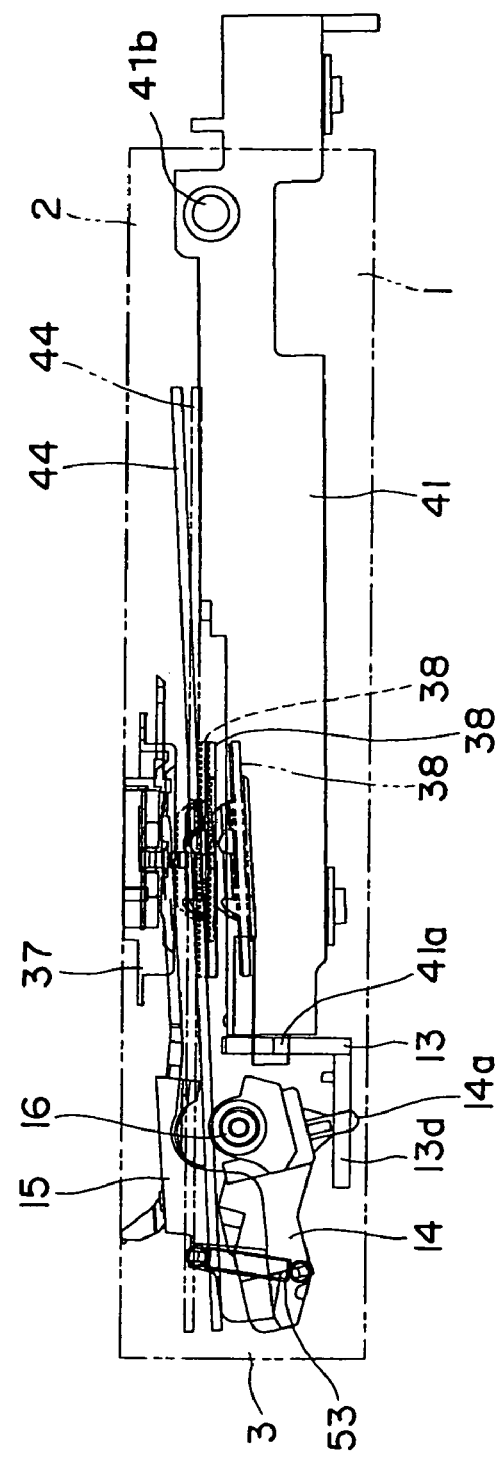

[Fig. 6]
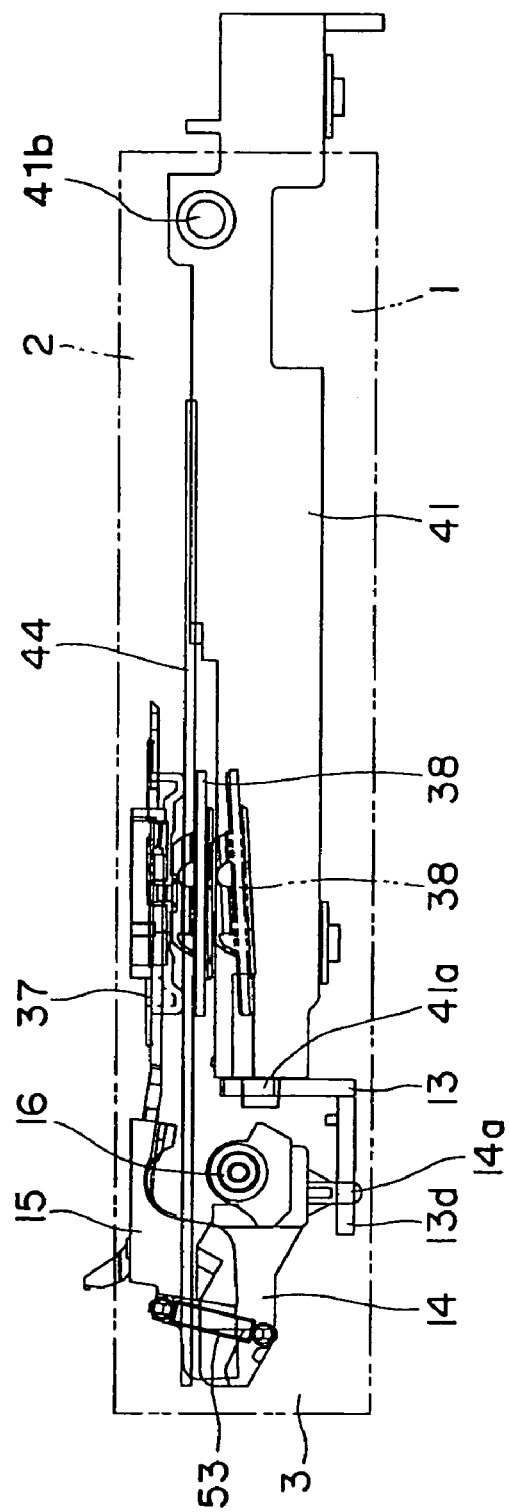

[Fig. 7]
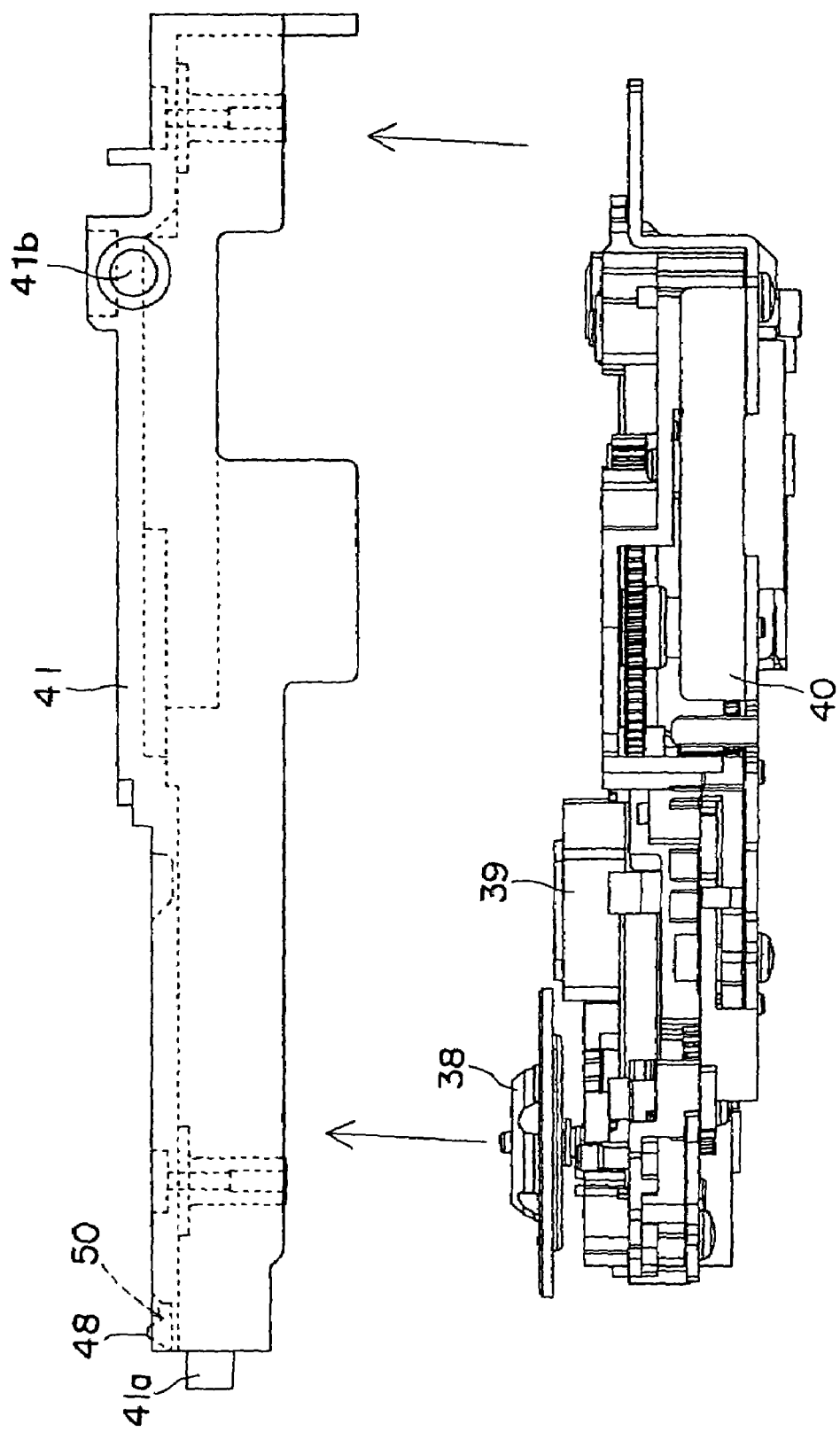

[Fig. 8]
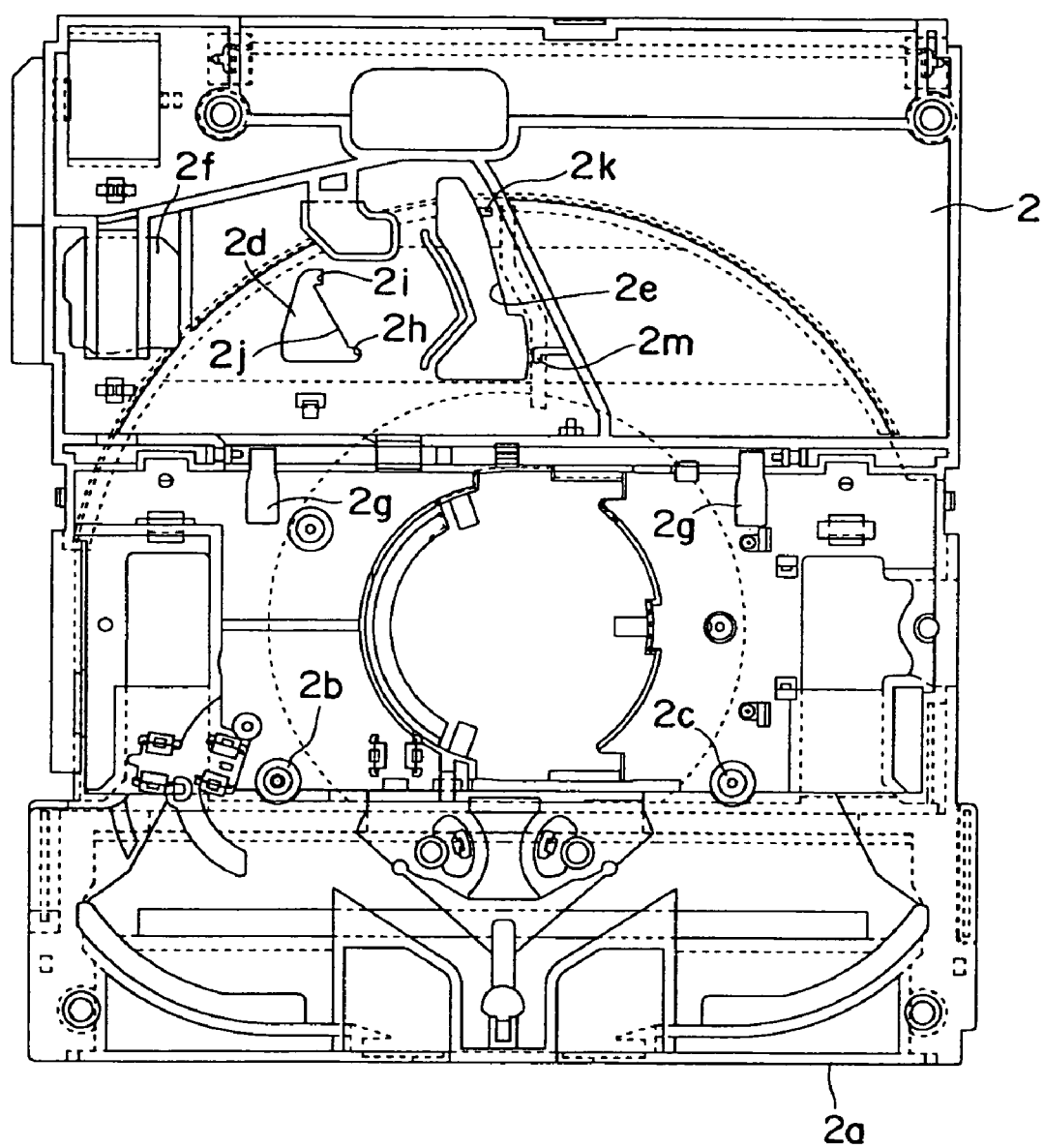

[Fig. 9]
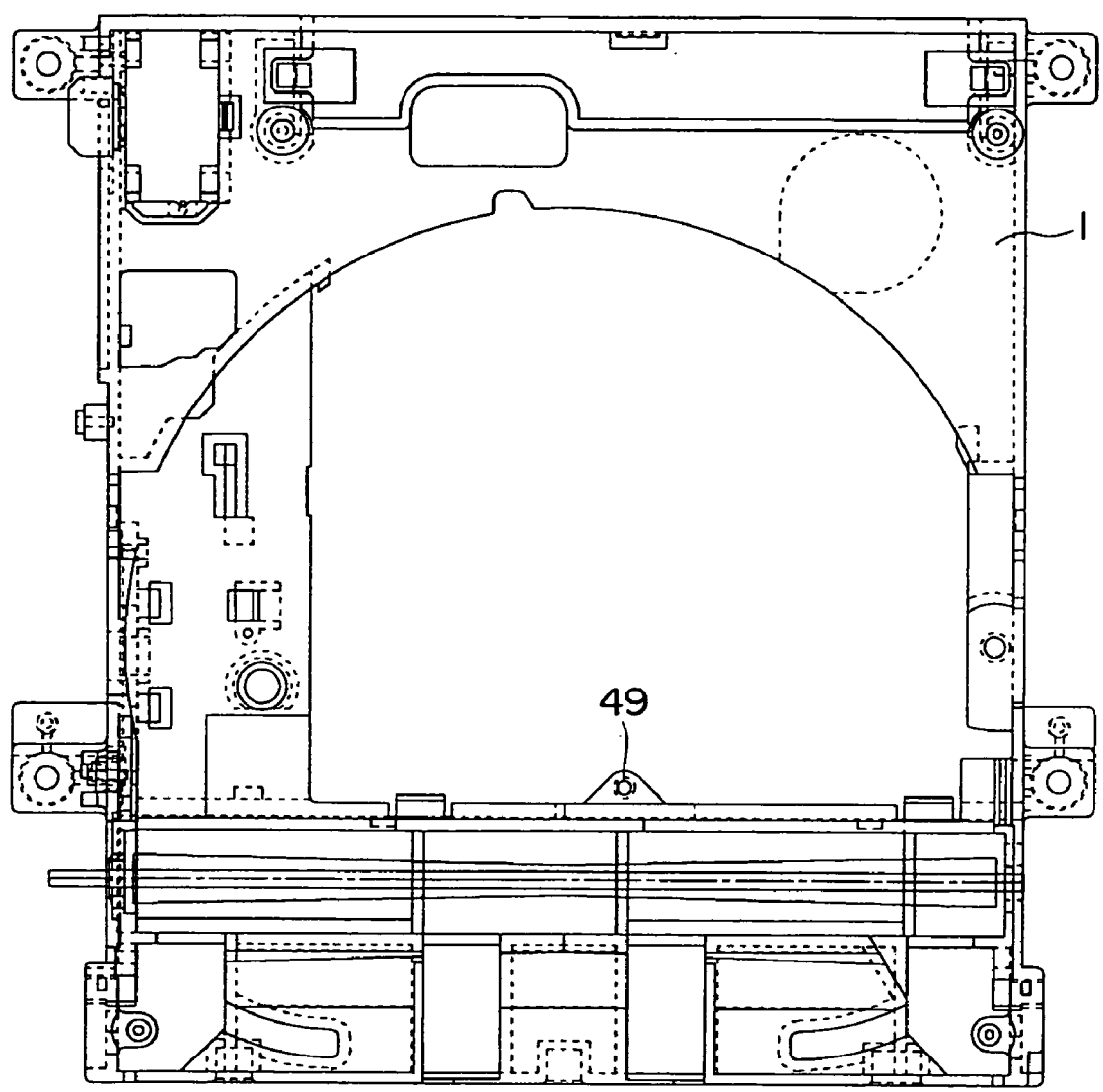

[Fig. 10]
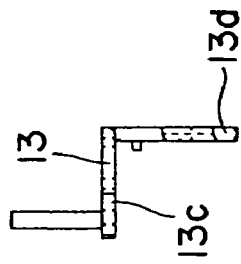
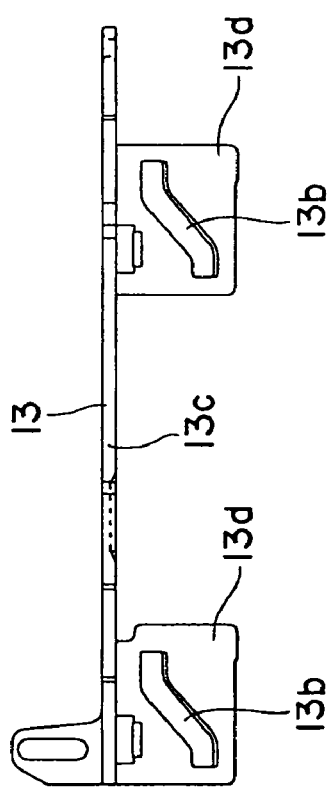
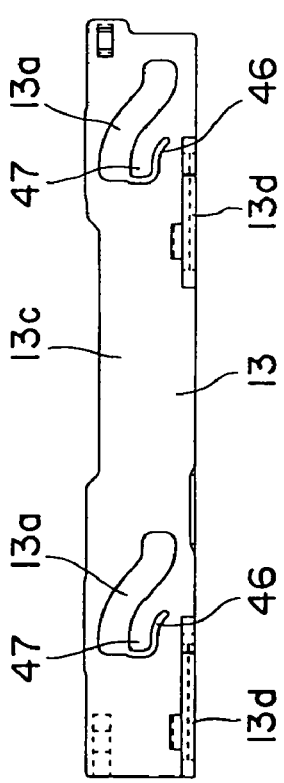

[Fig. 11]
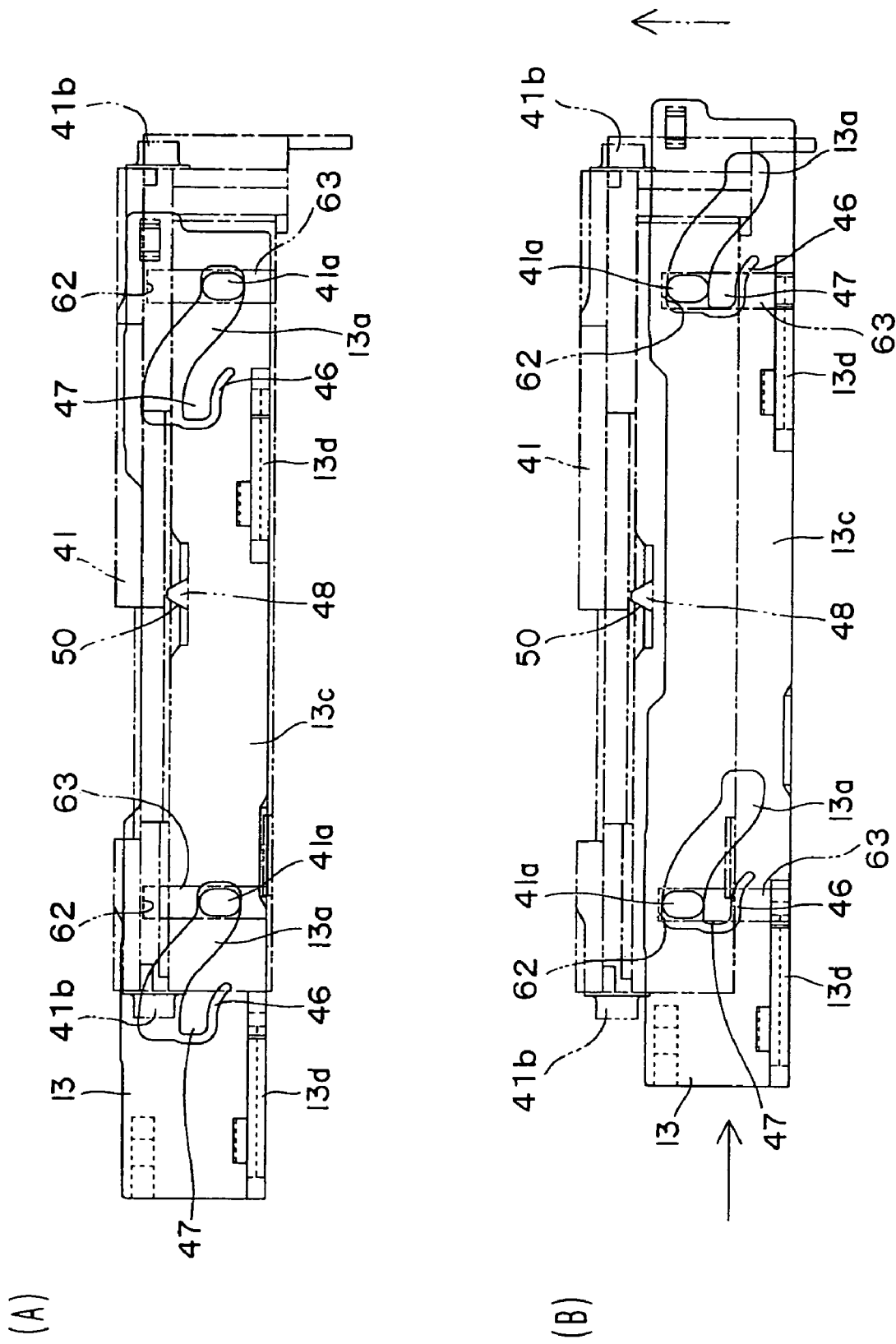

[Fig. 12]
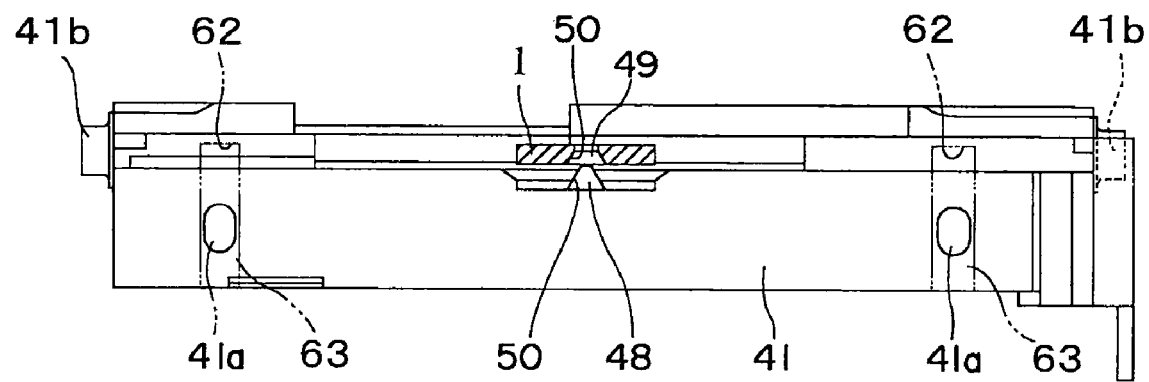

[Fig. 13]
(A)
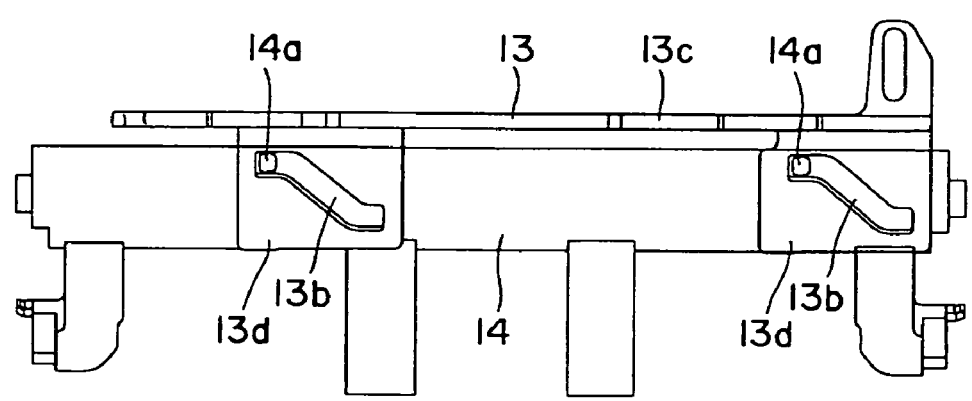
(B)
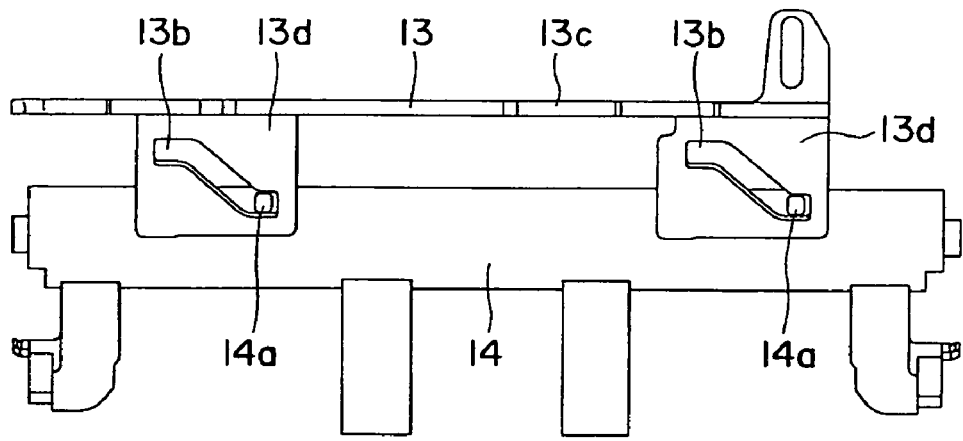

[Fig. 14]
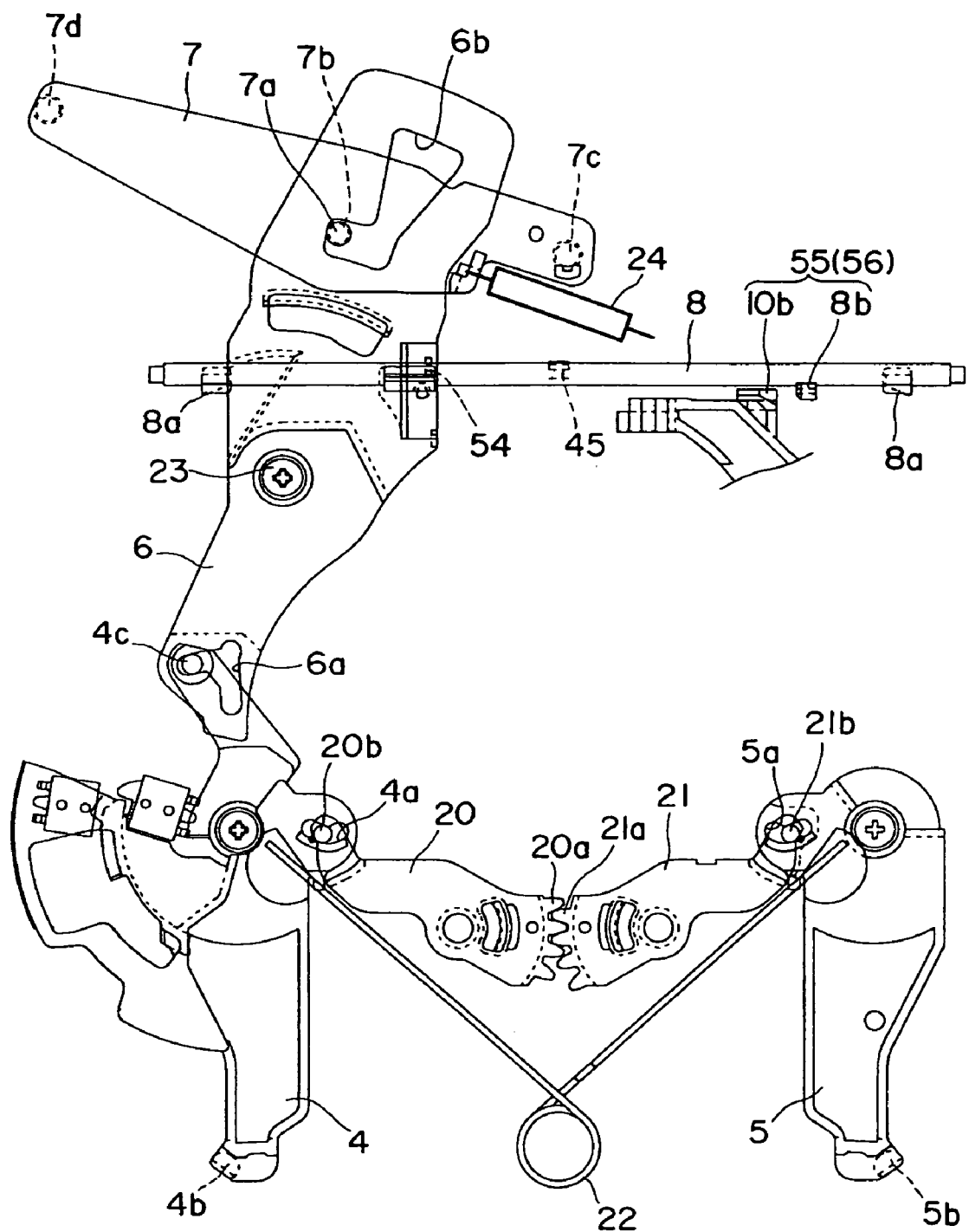

[Fig. 15]
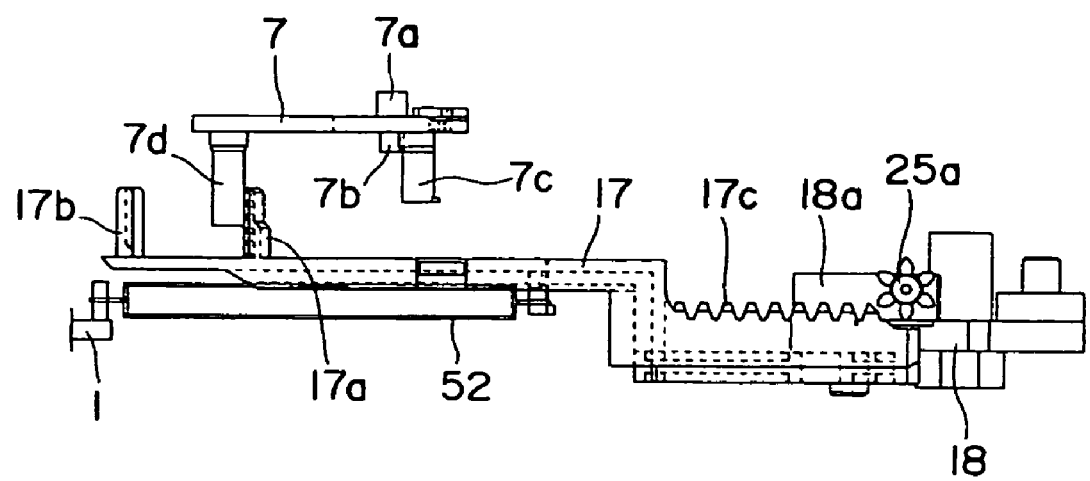

[Fig. 16]
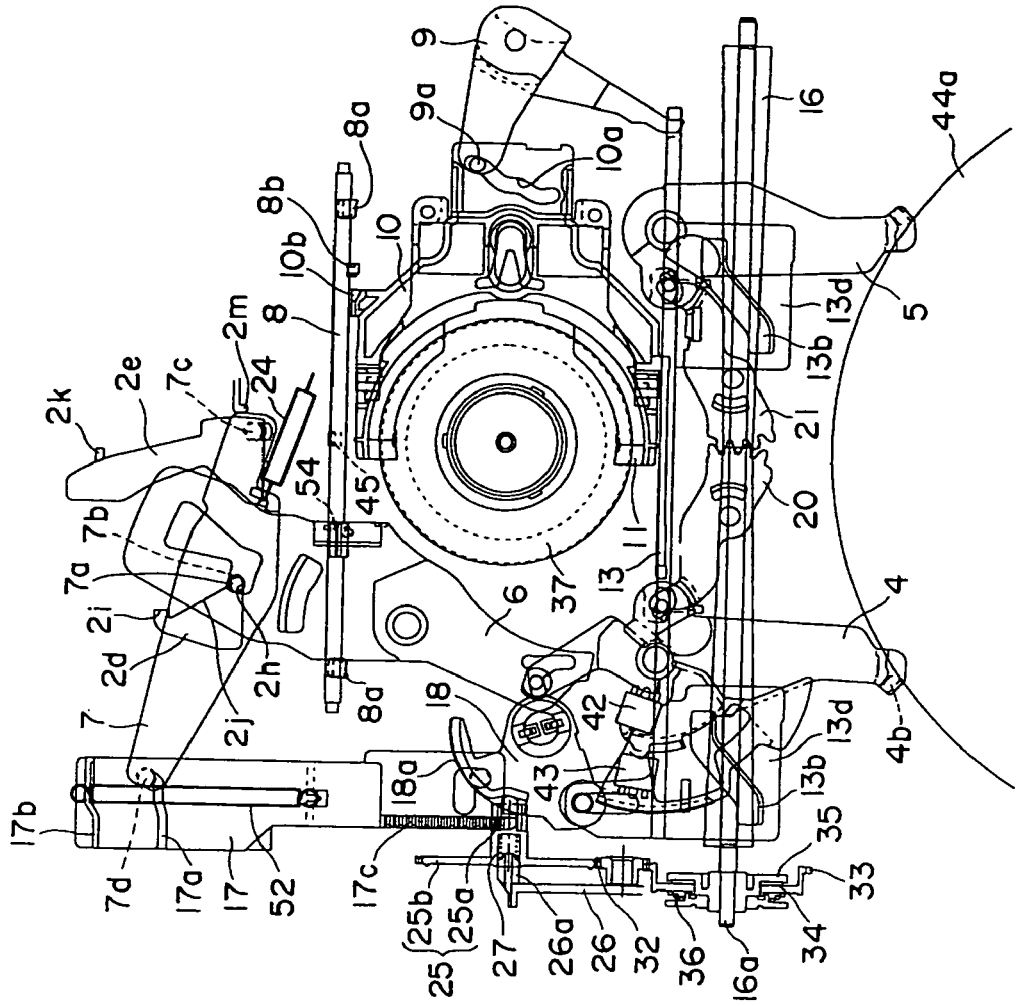
(B)
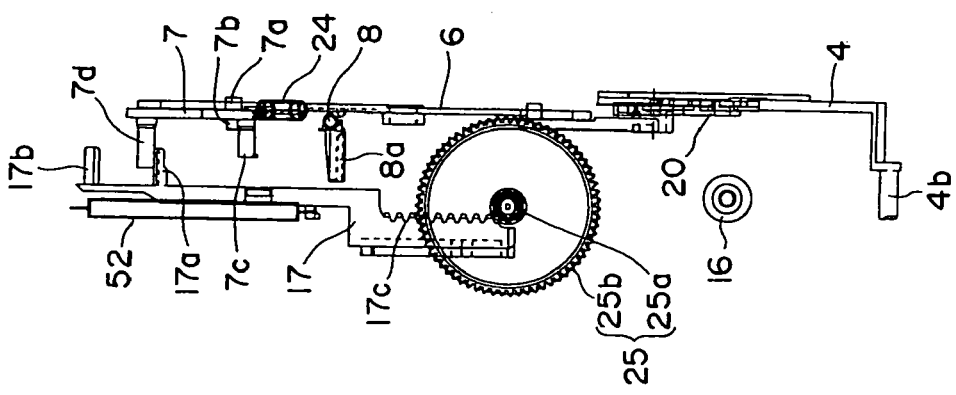
(A)

[Fig. 17]
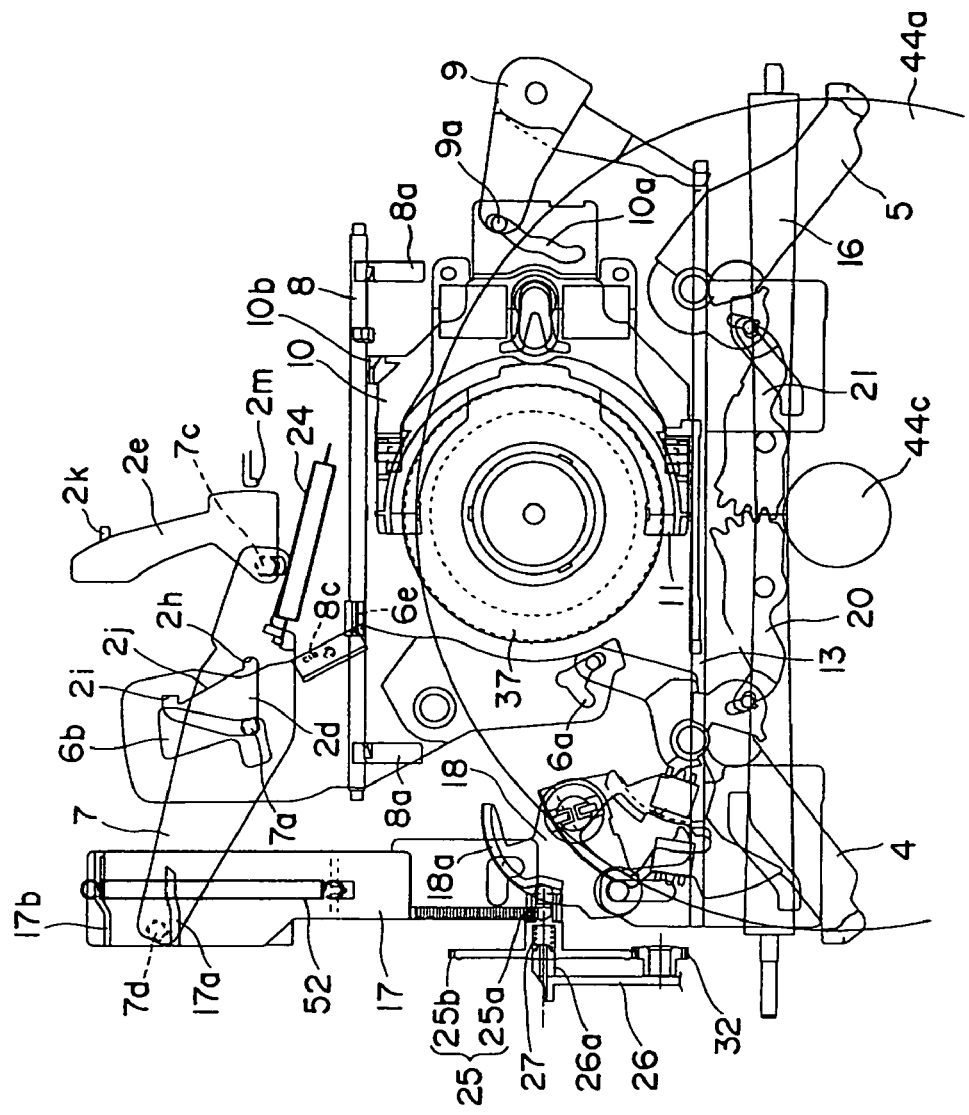
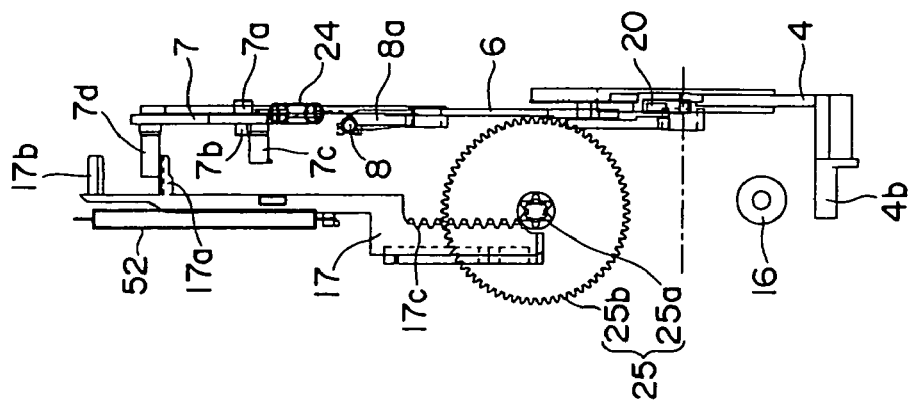

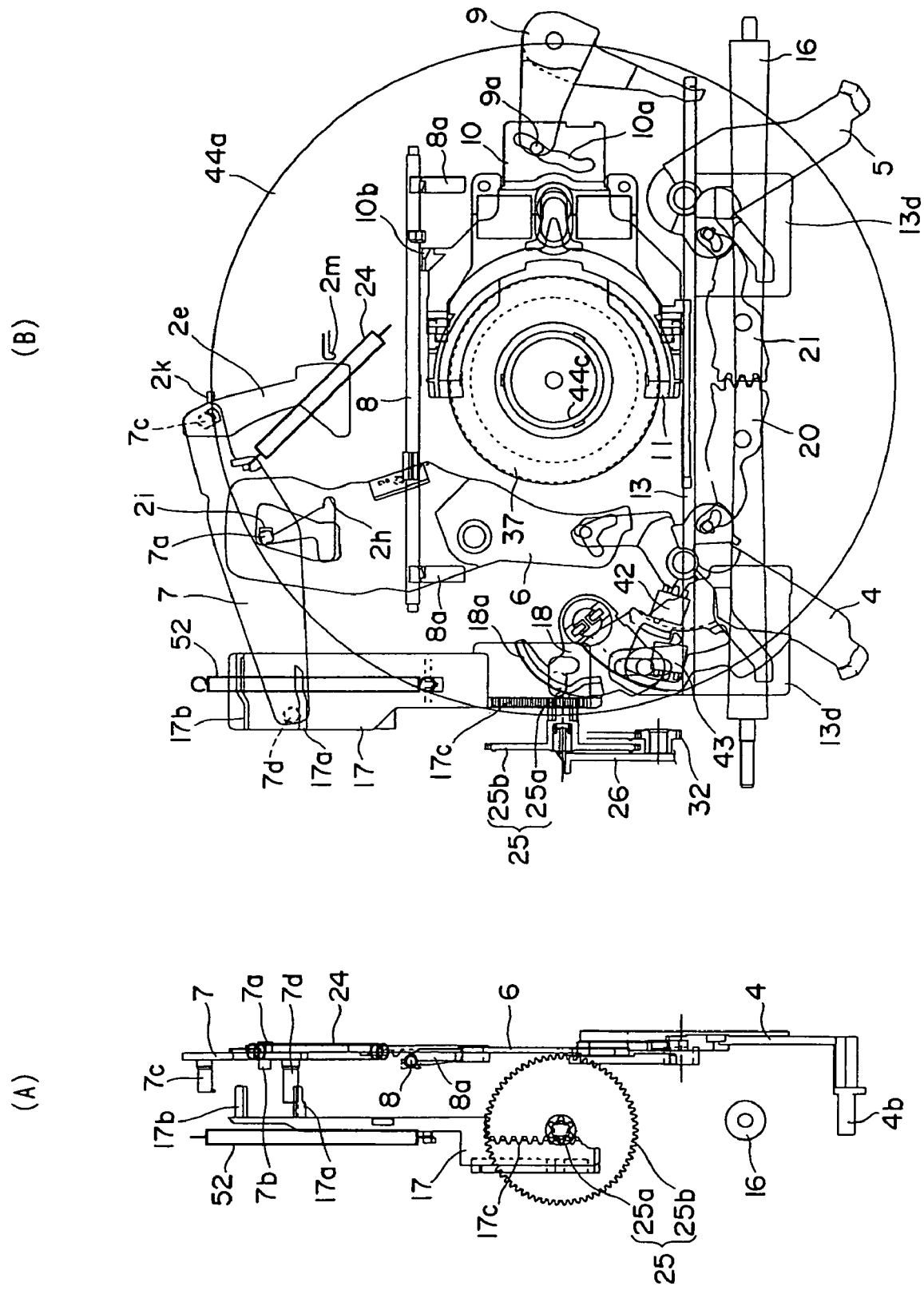
[Fig. 18]

[Fig. 19]
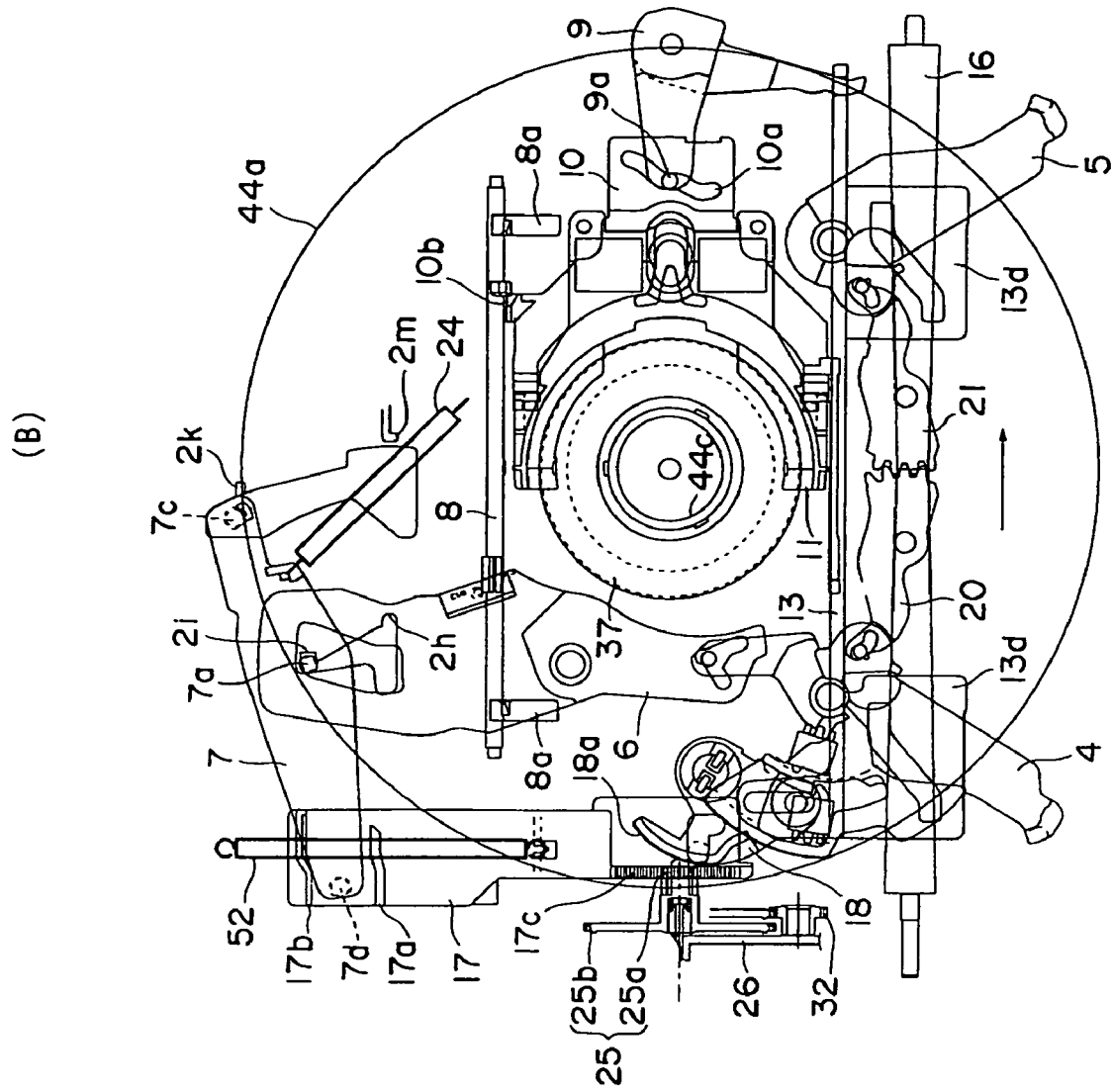
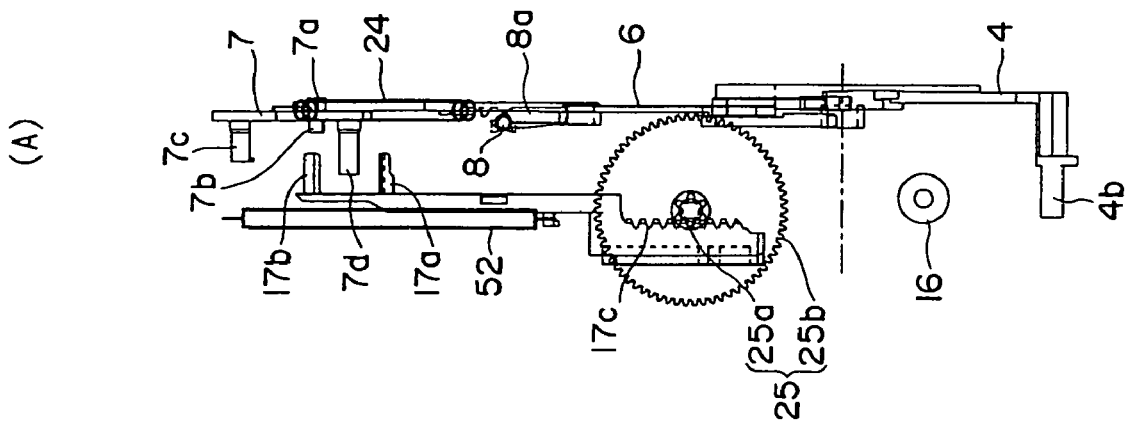

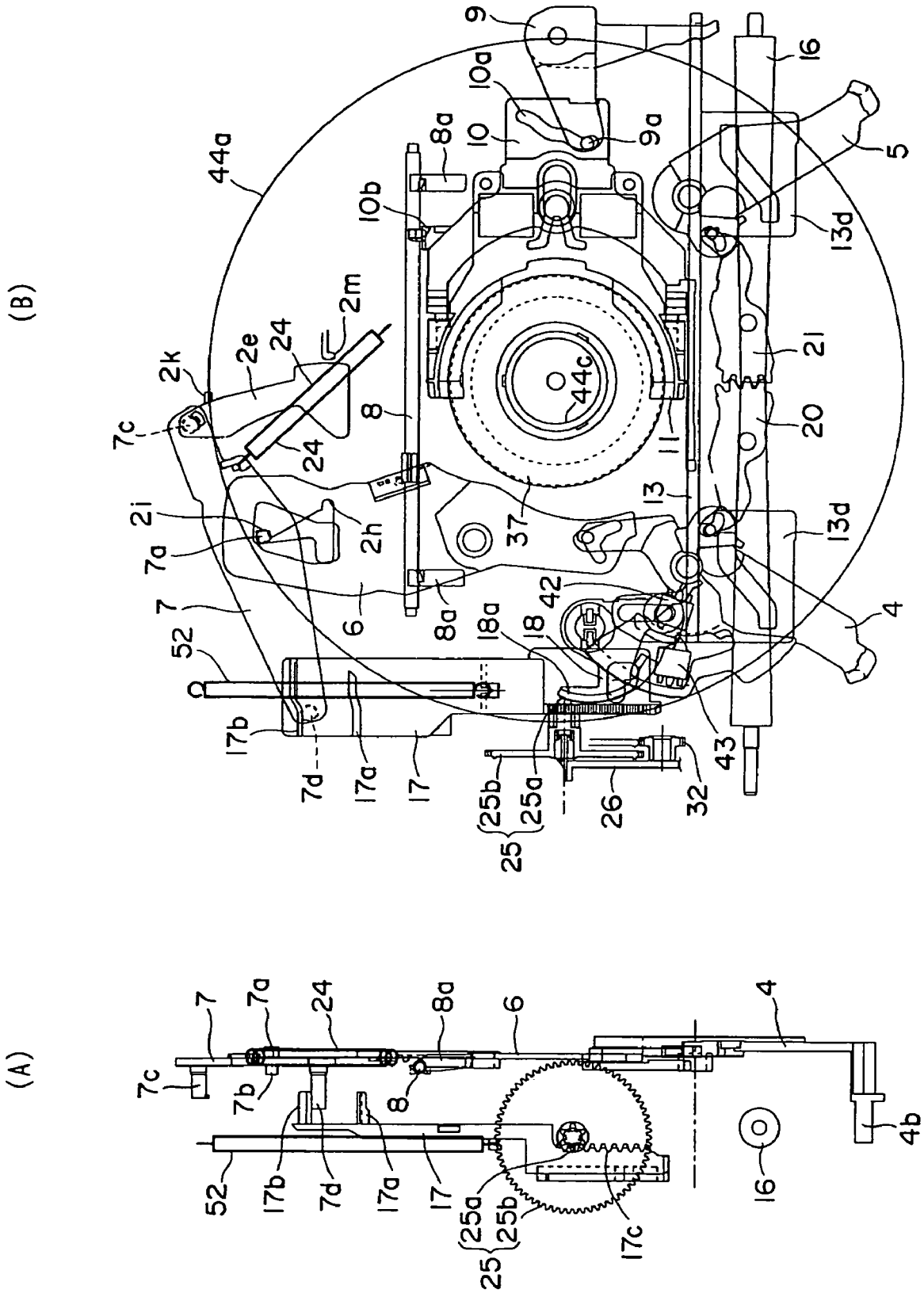

[Fig. 21]
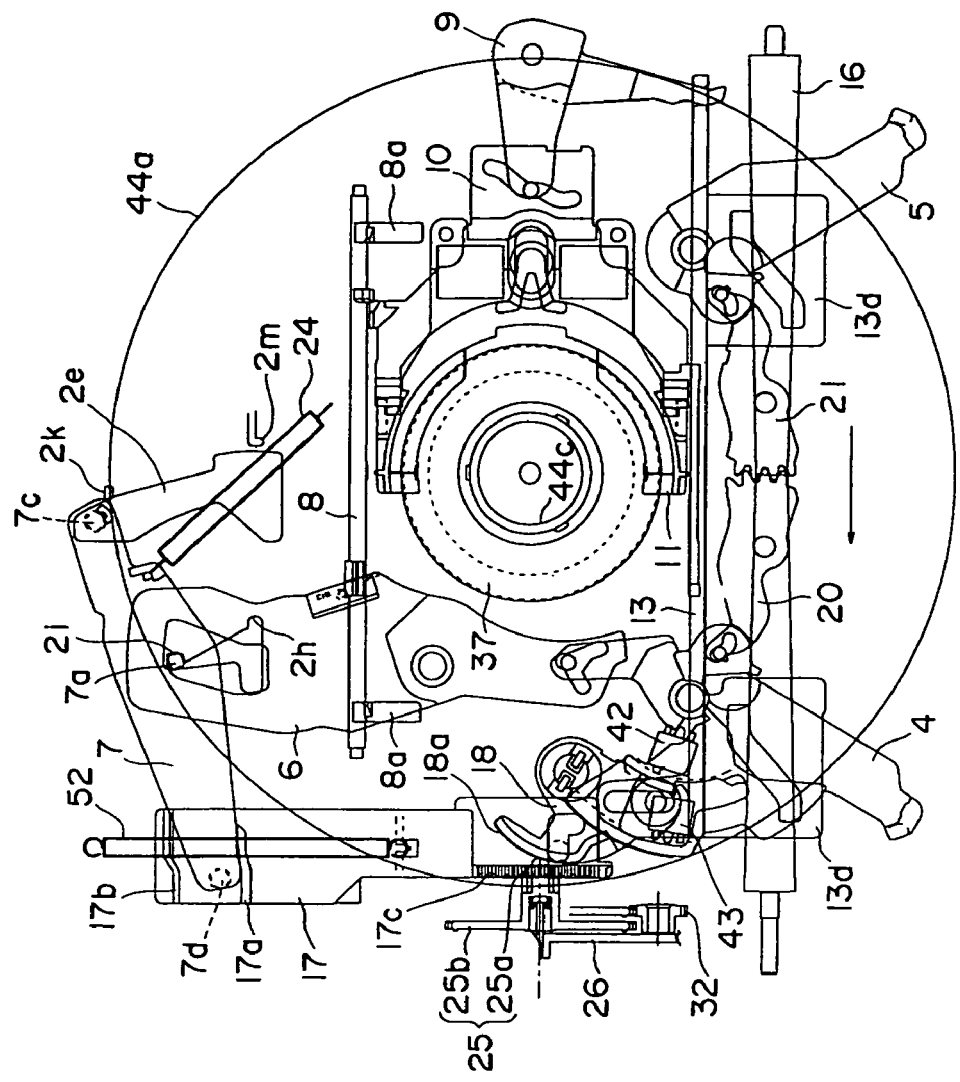
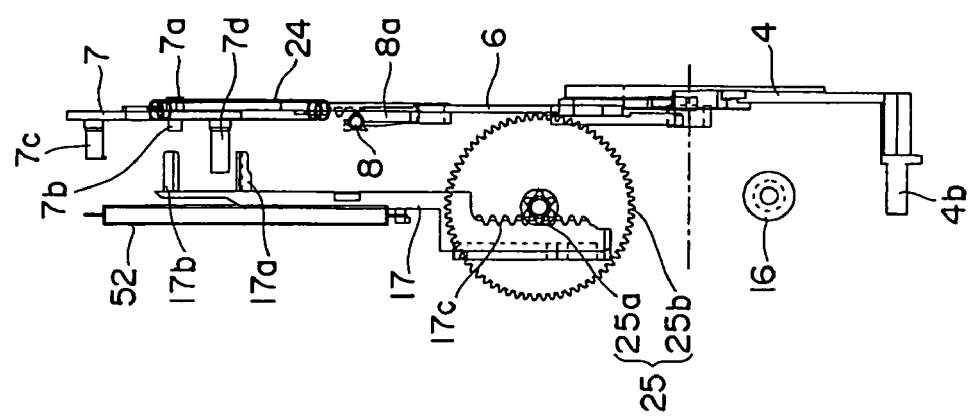

[Fig. 22]
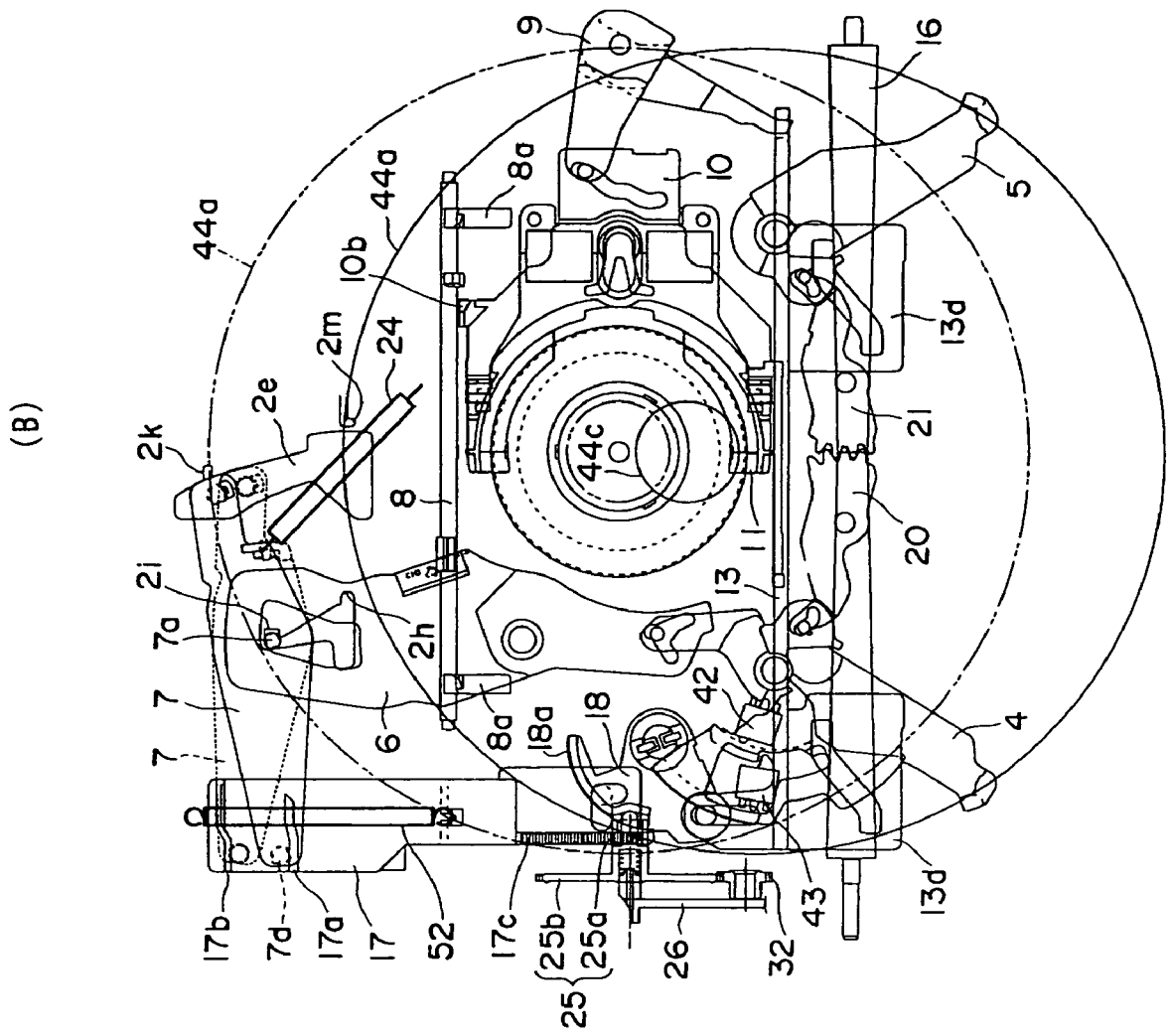
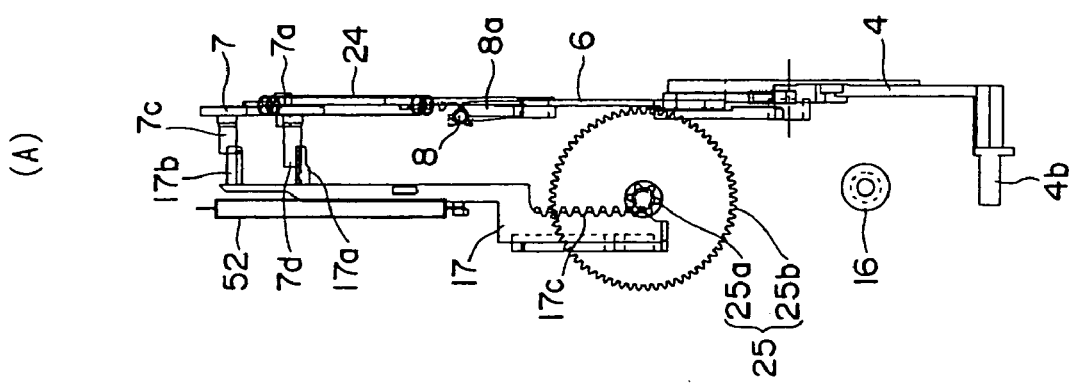

[Fig. 23]
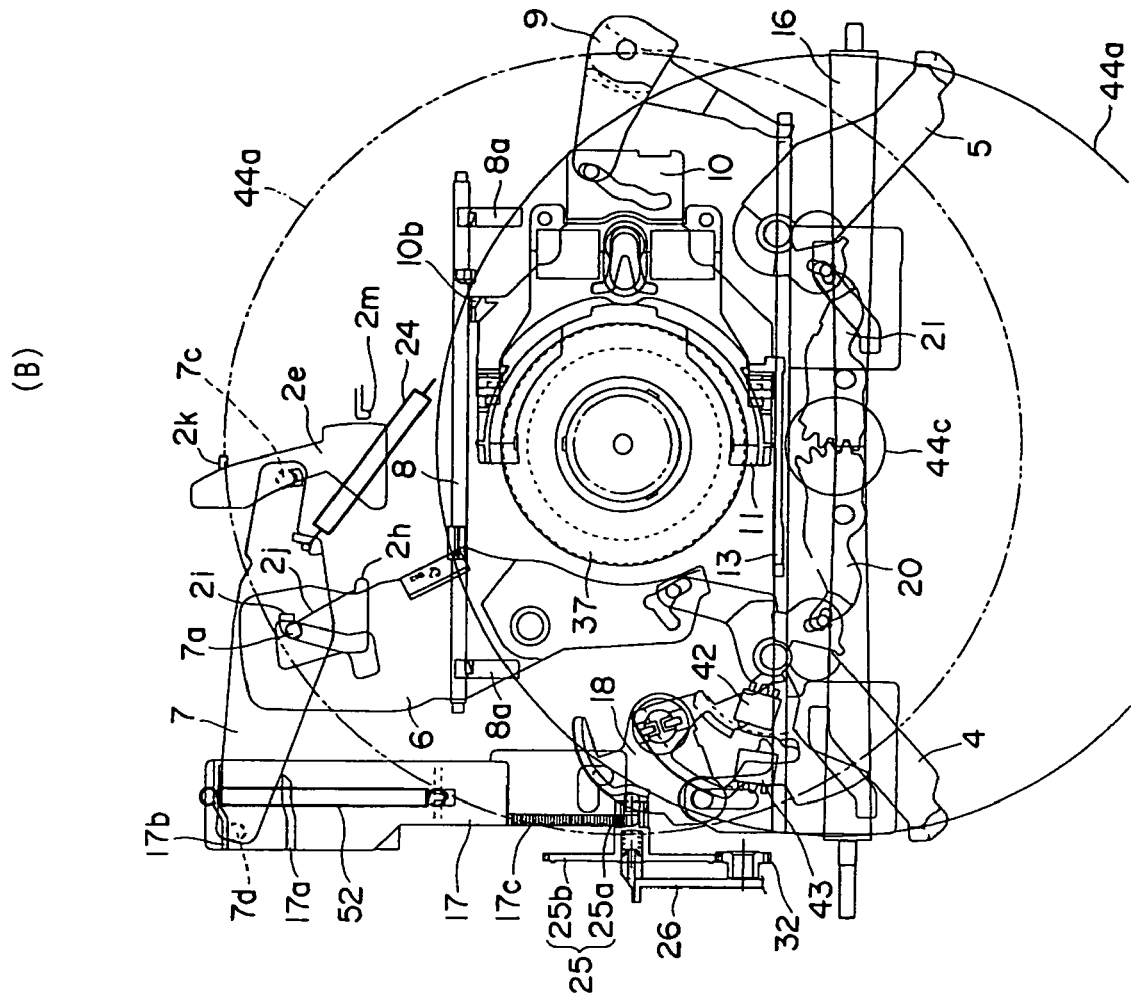
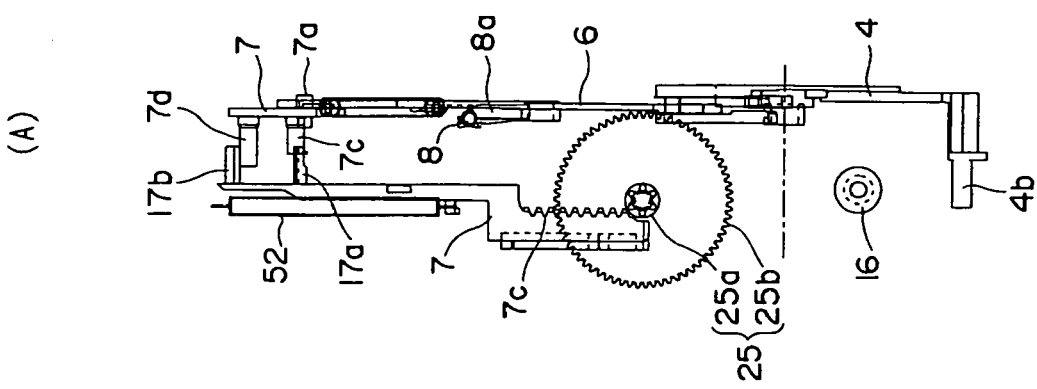

[Fig. 24]

[Fig. 25]
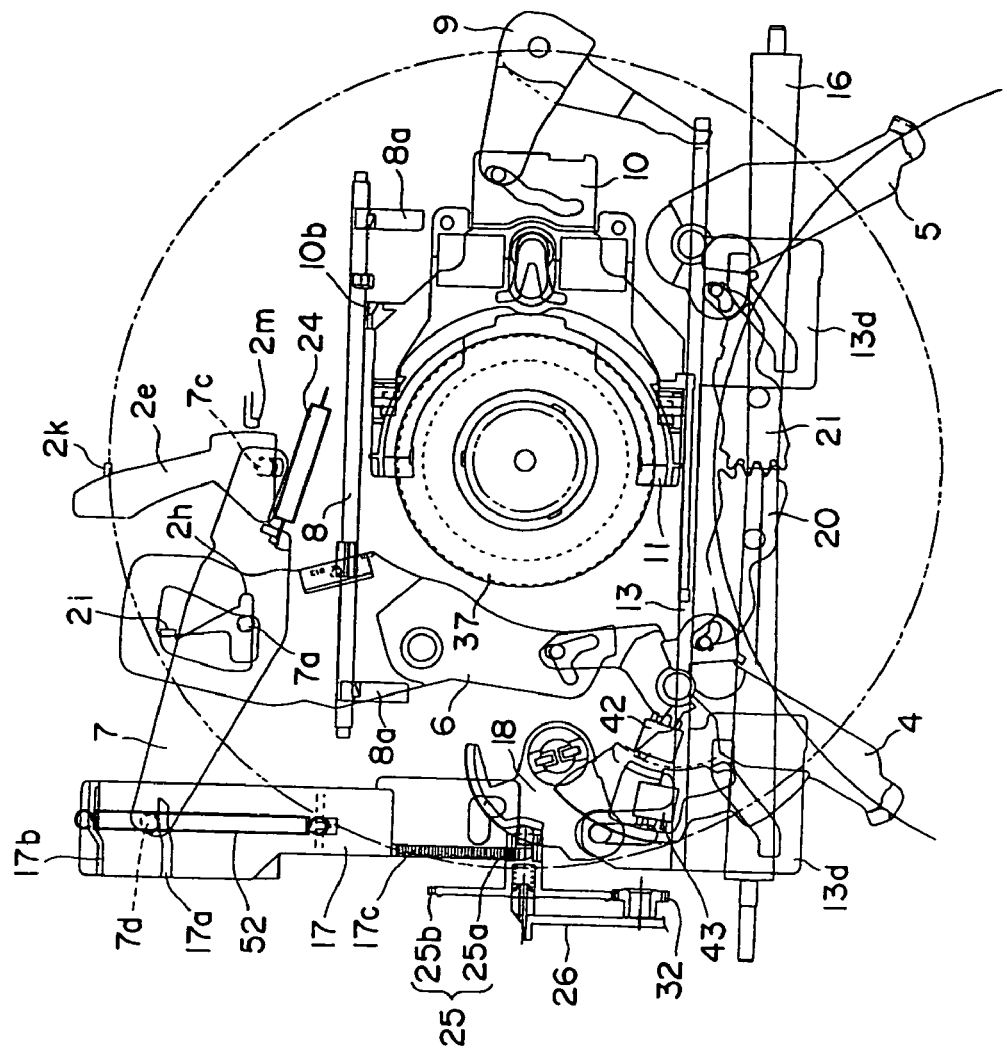
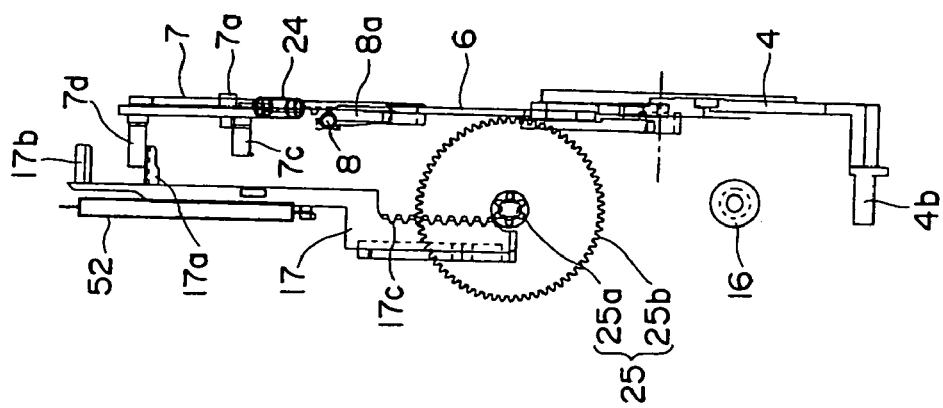

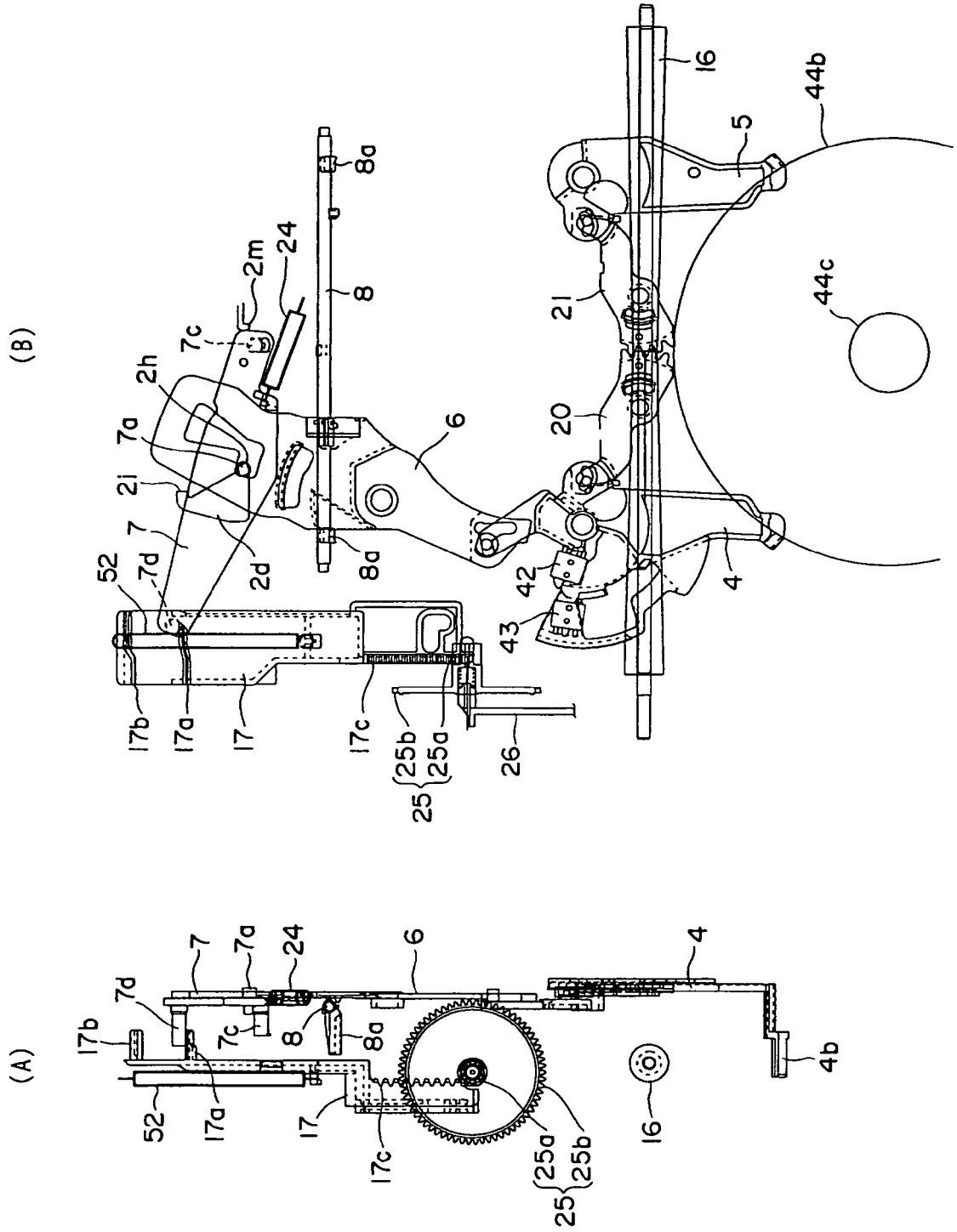
[Fig. 26]

[Fig. 27]
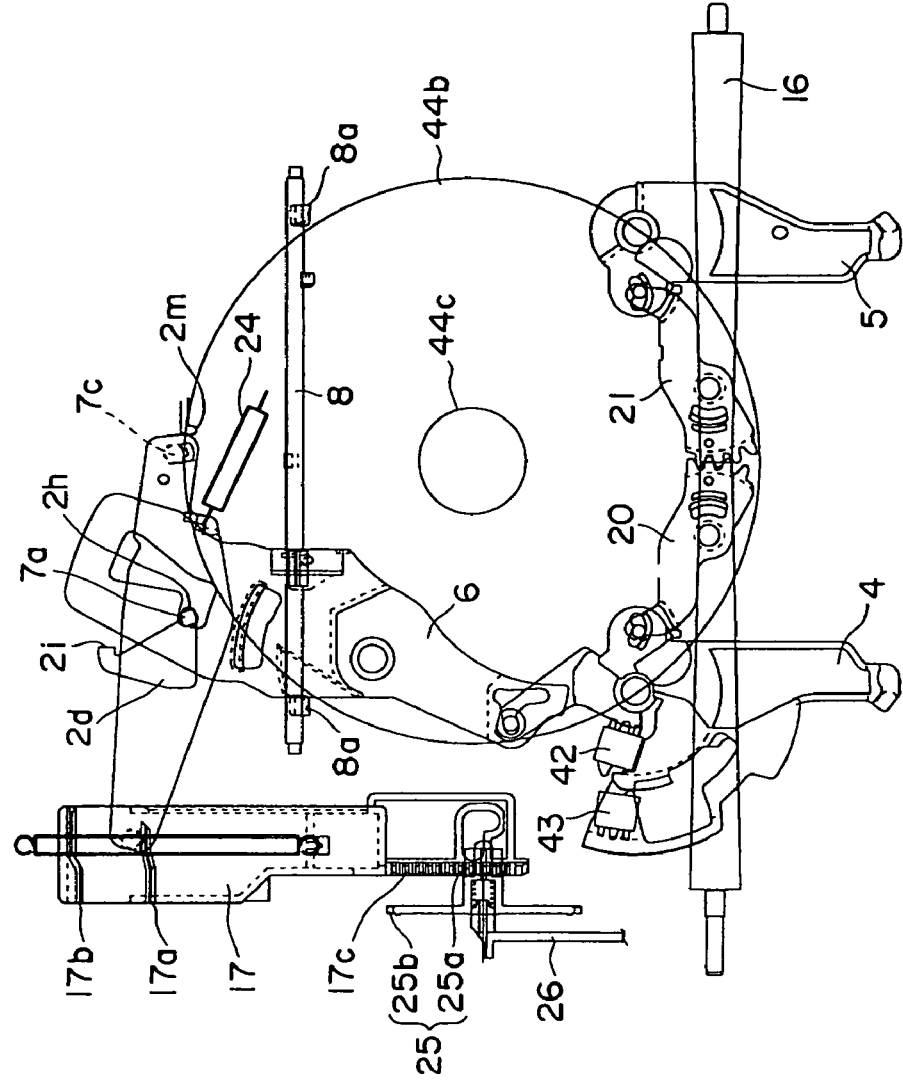
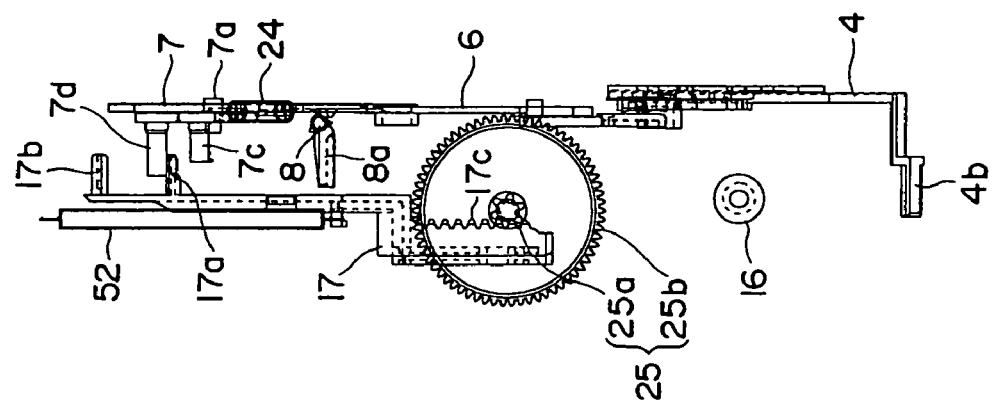

[Fig. 28]
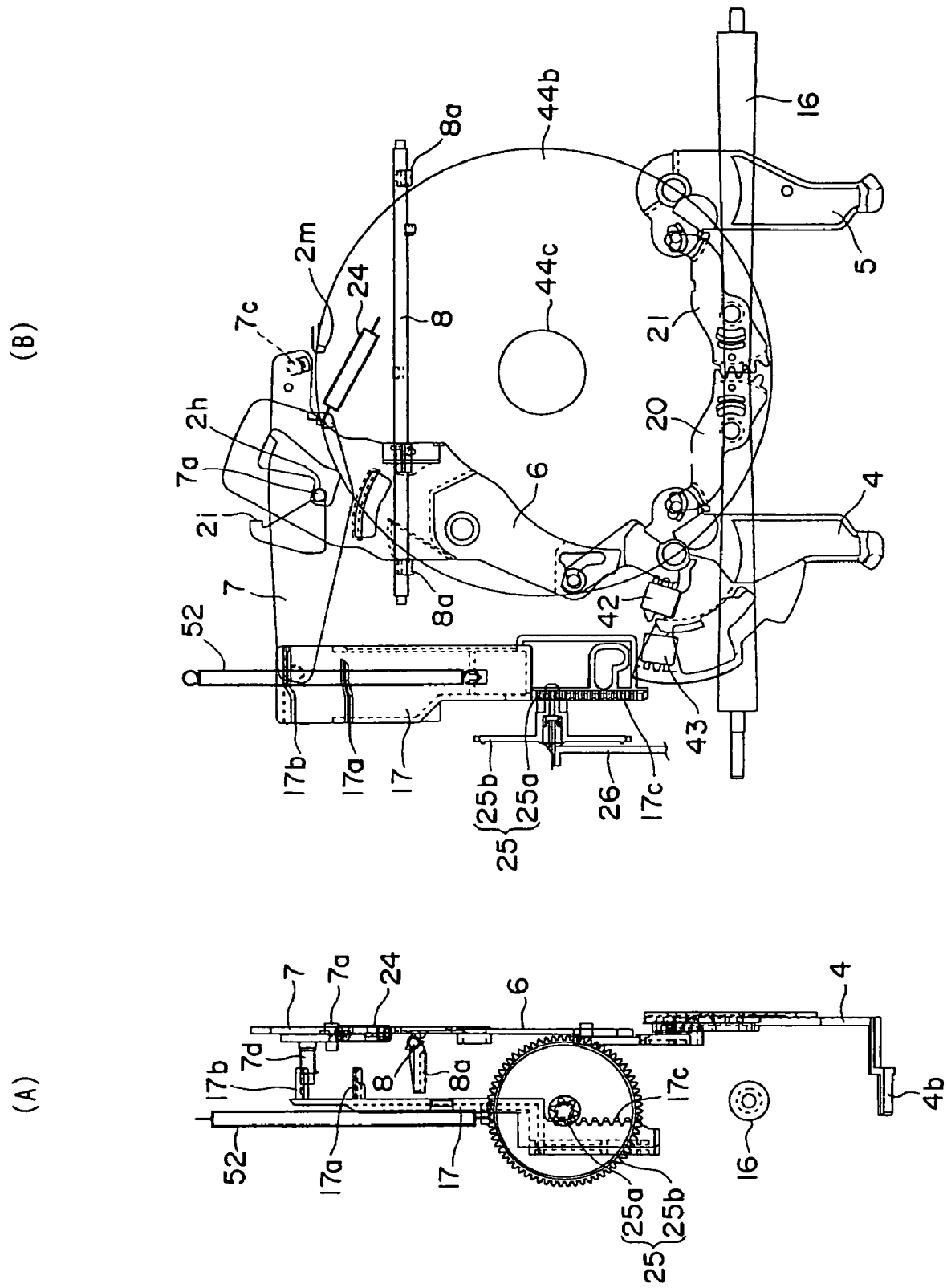

[Fig. 29]
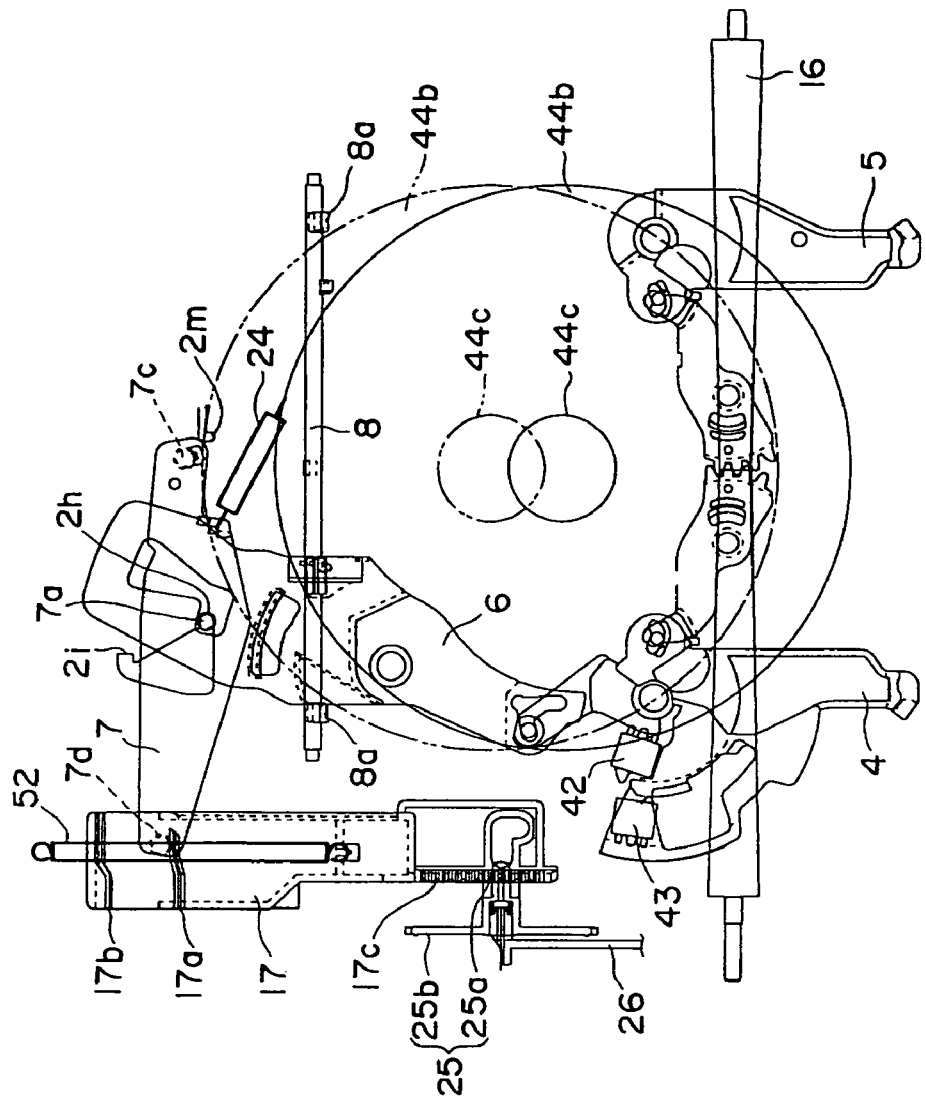
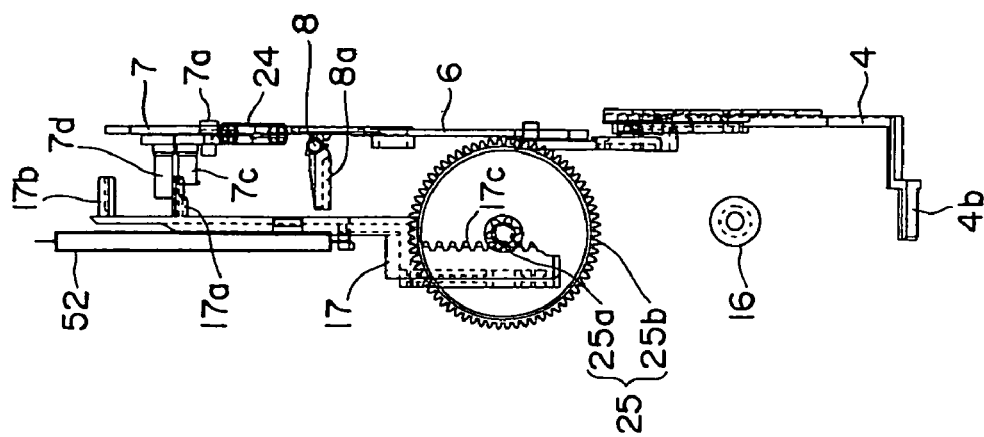

[Fig. 30]
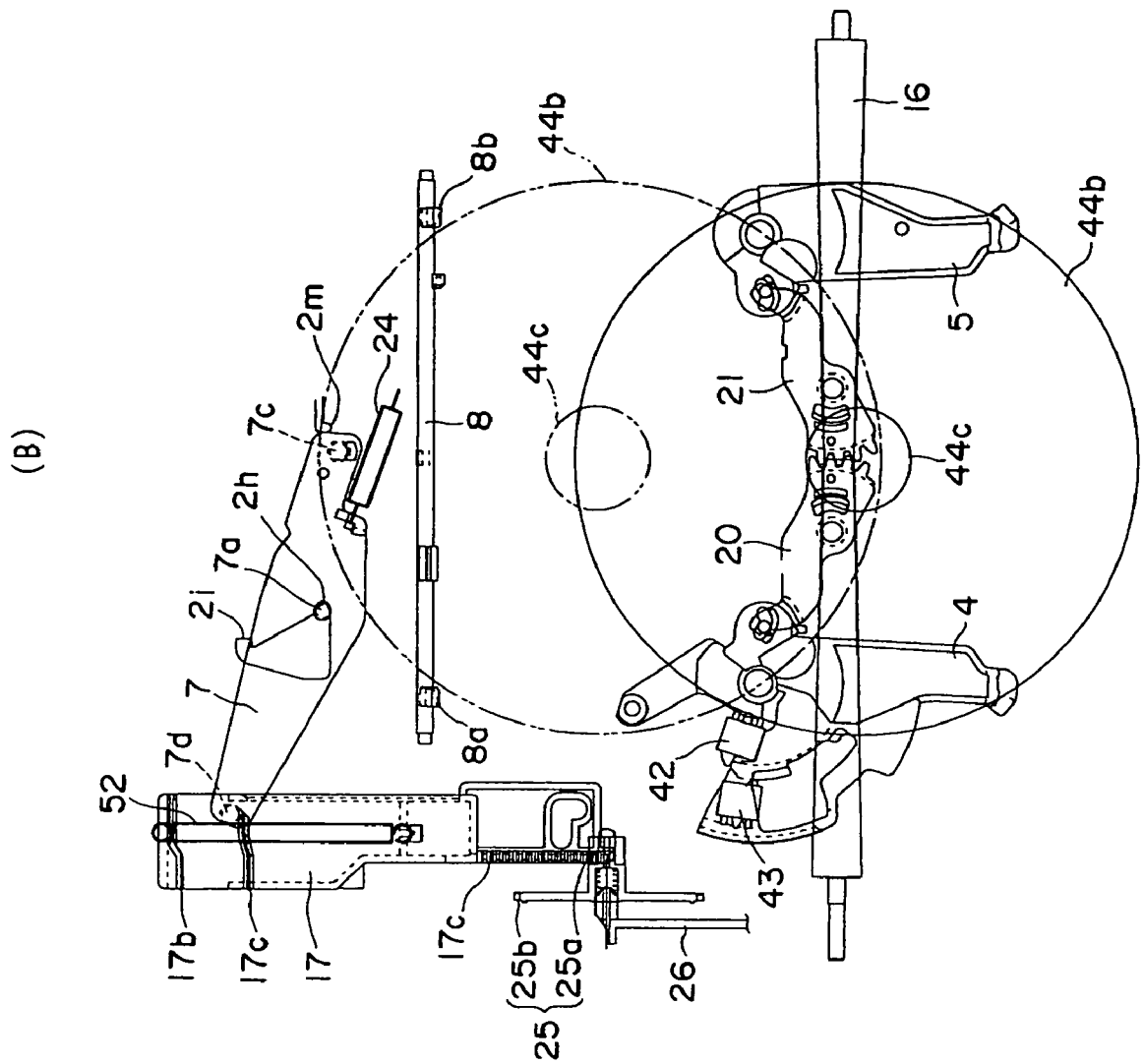
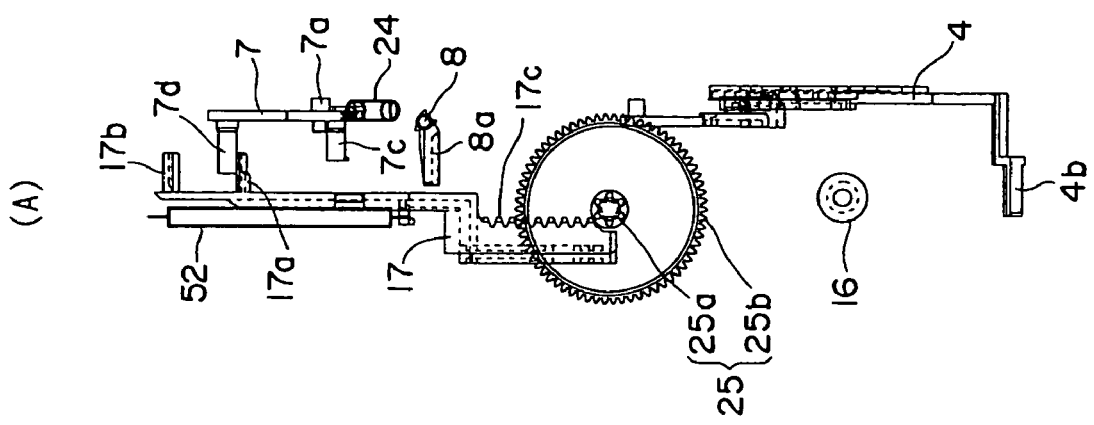

[Fig. 31]
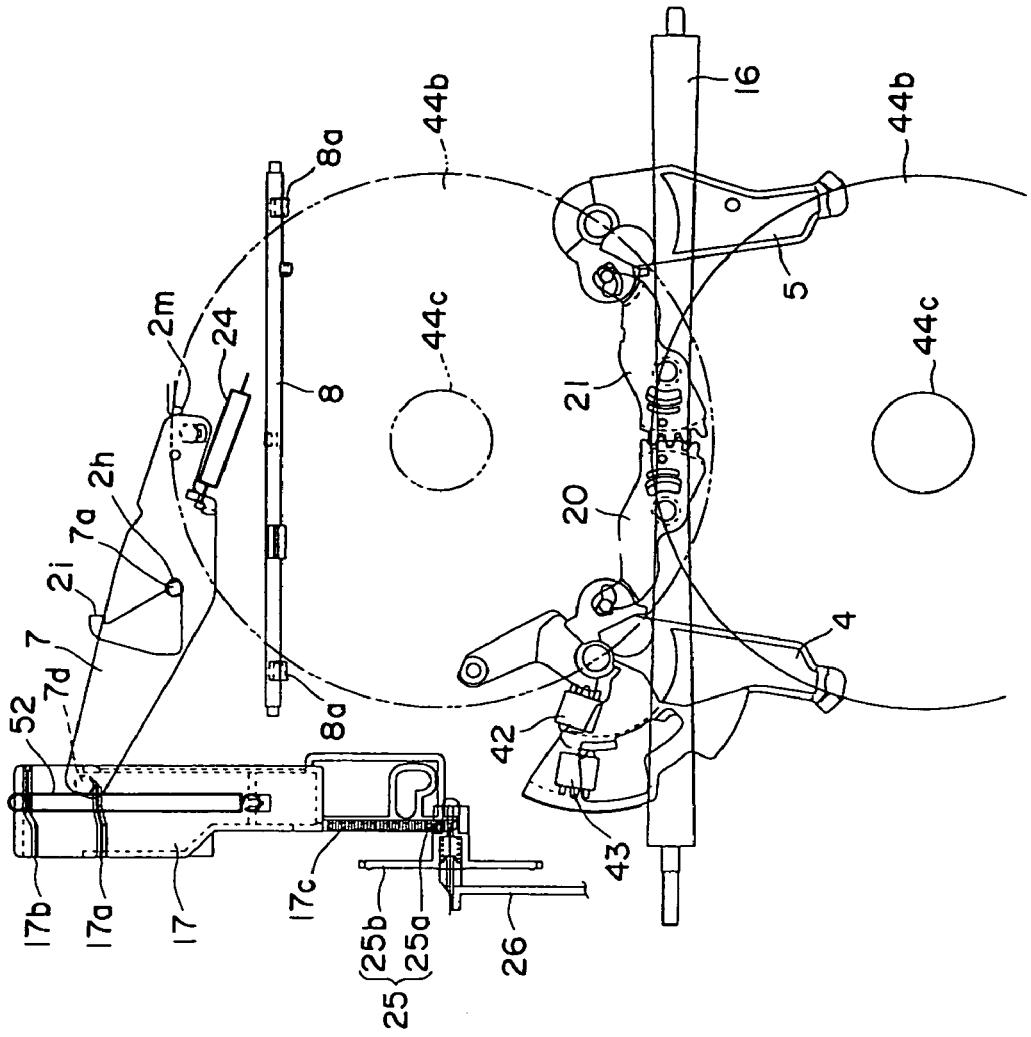
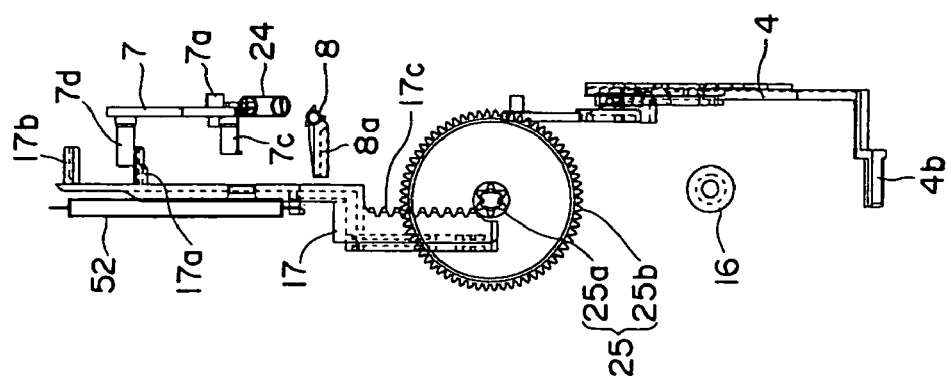

[Fig. 32]
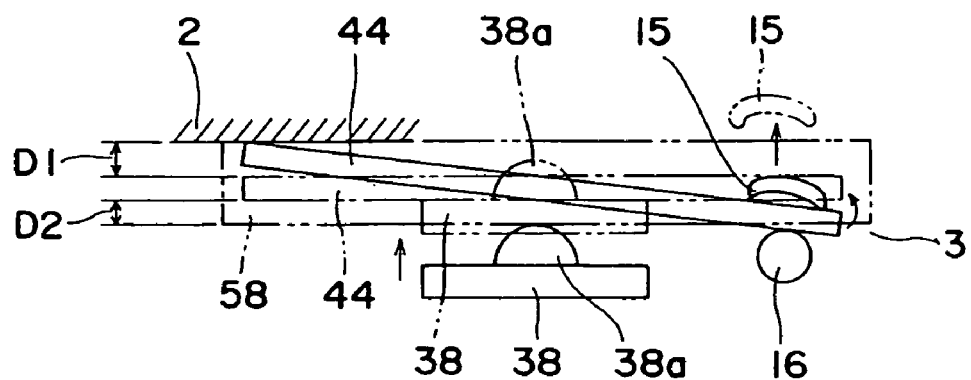
[Fig. 33]
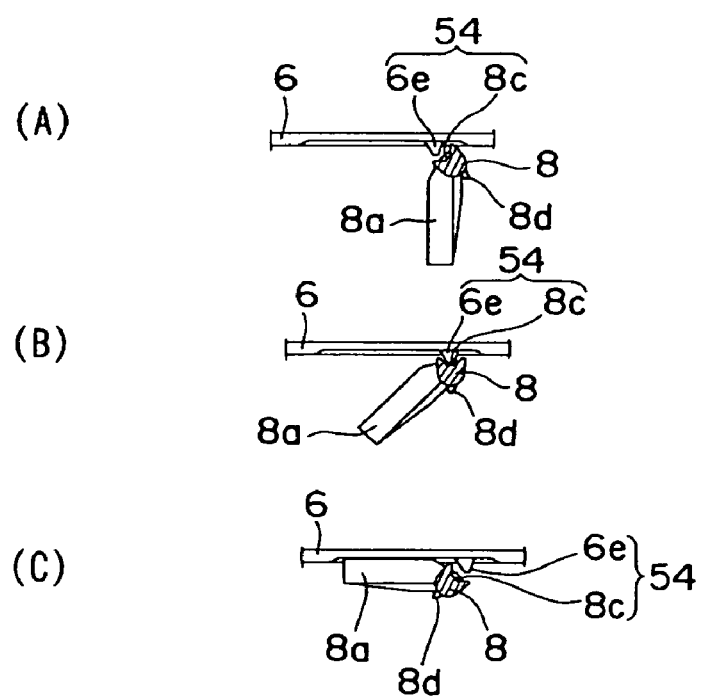

[Fig. 34]
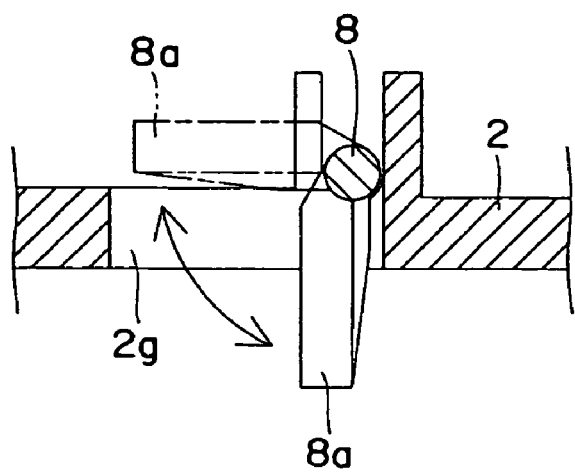
[Fig. 35]
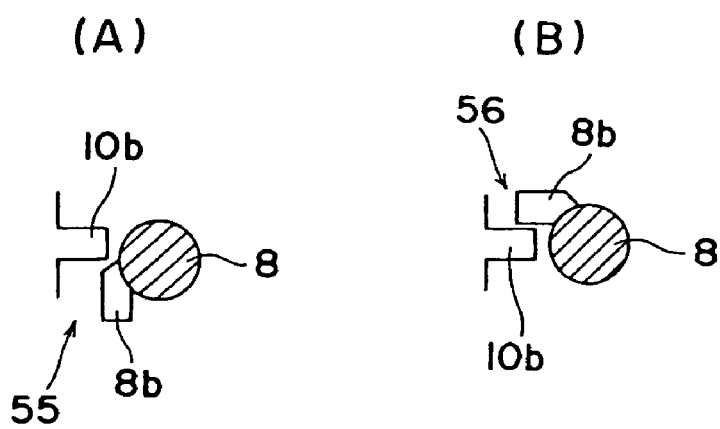

[Fig. 36]
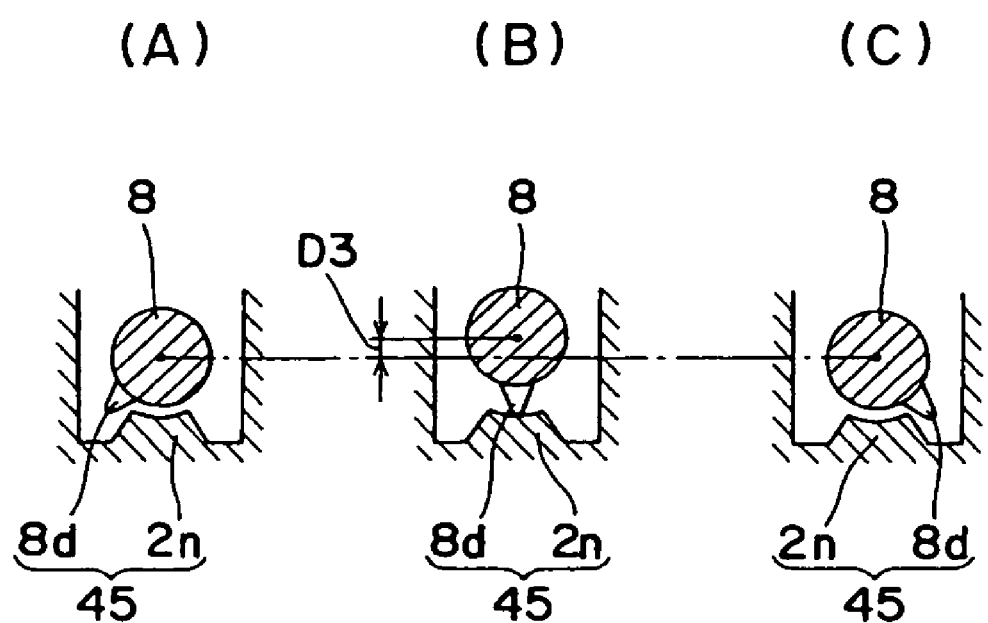

[Fig. 37]
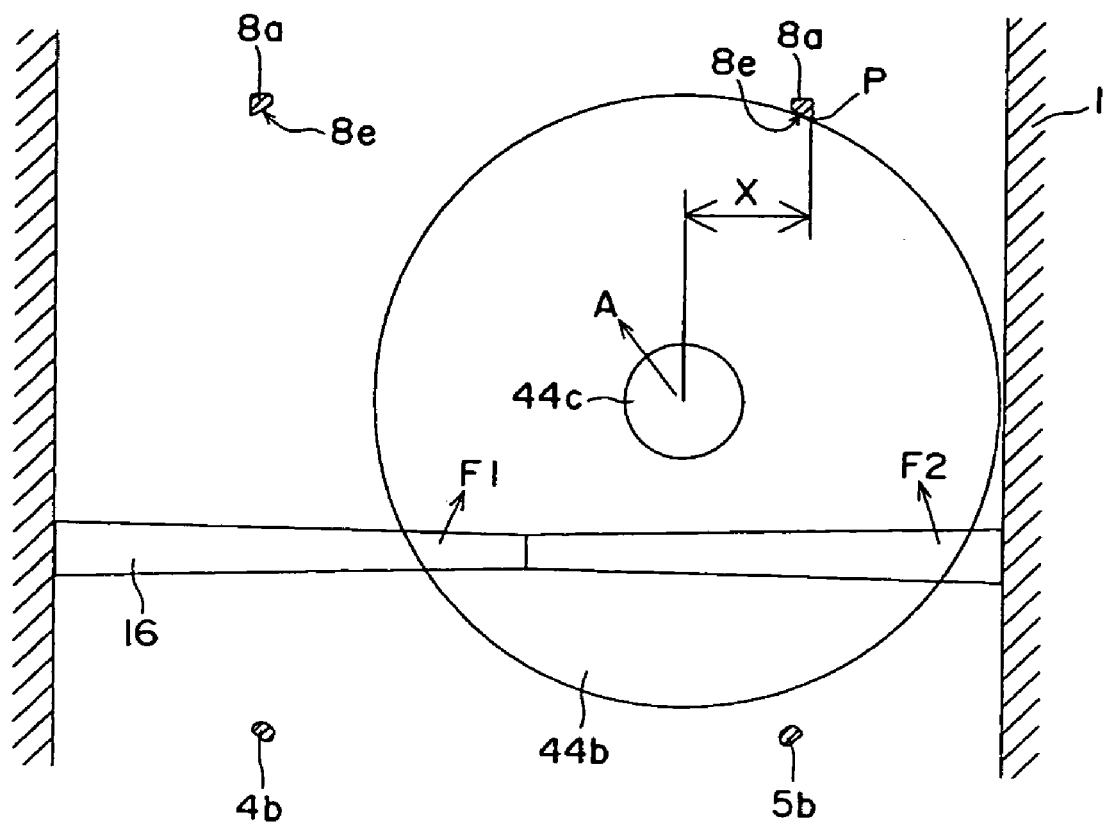

[Fig. 38]
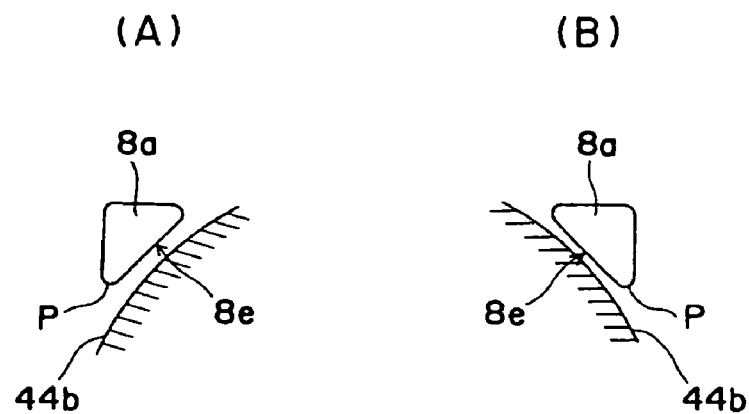
[Fig. 39]
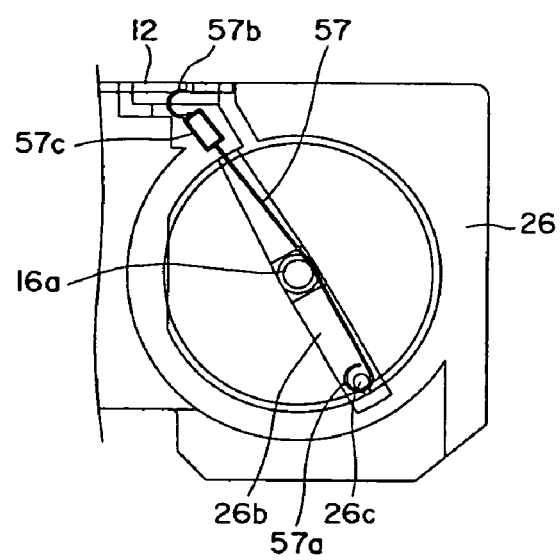

[Fig. 40]
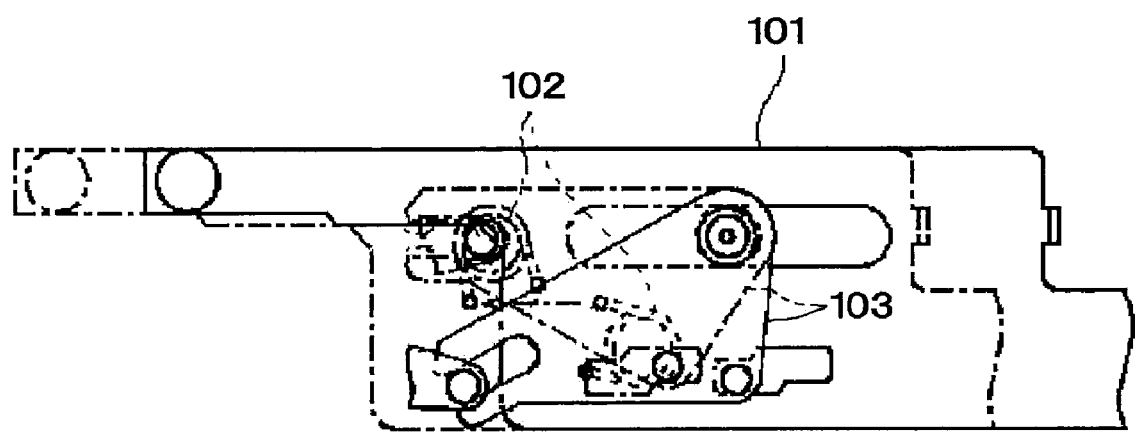
PRIOR ART

[Fig. 41]
(A)
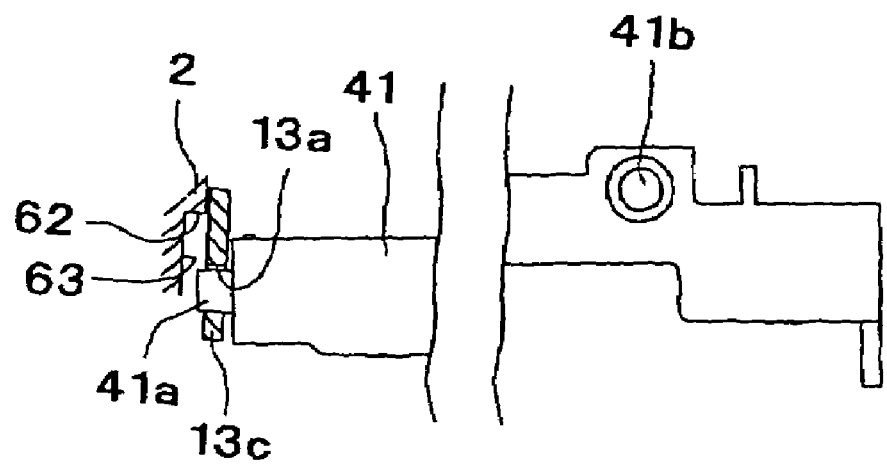
(B)
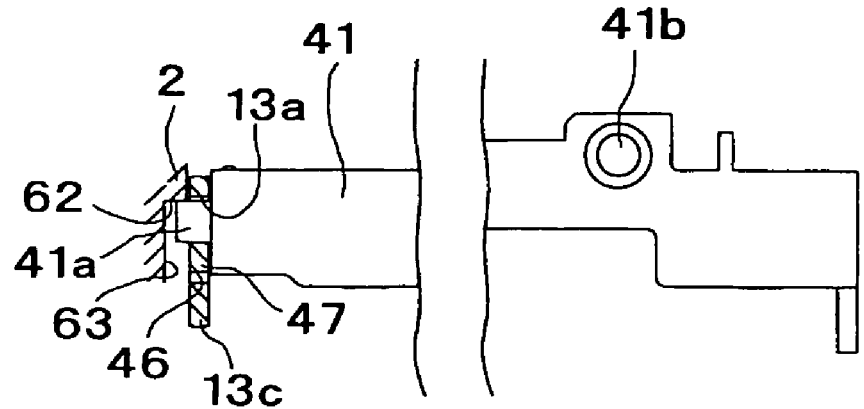

DISK CARRYING DEVICE WITH GUIDE BASE AND ARM ROLLER

CROSS REFERENCE TO RELATED APPLICATIONS

The present invention claims priority under 35 U.S.C. §119 to Japanese application 2004-119621 filed Apr. 14, 2004, the entire disclosure of which is incorporated herein by reference.

FIELD OF THE INVENTION

The present invention relates to a disk carrying device.

BACKGROUND OF THE INVENTION

A disk carrying device disclosed in Japanese Patent Laid-Open No. Hei 11-213506 has been known as a conventional disk carrying device. In the disk carrying device, as shown in FIG. 40, a reversing spring 102 is provided for urging a slider 101 which is moved with a detection member not shown in the drawing and the reversing spring 102 also generates urging force with which a transporting roller not shown in the drawing is made to pressure contact with a disk.

However, in the above mentioned disk carrying device, the reversing spring 102 is used both for urging the slider 101 and for pressing the transporting roller into contact with the disk. Therefore, it is difficult that the urging force and the pressing force are optimally set simultaneously. In other words, the urging force of the reversing spring 102 is determined by the disk carrying force and the force by which the slider 101 is moved, and thus the urging force of the reversing spring 102 is restricted by the attaching angle to a link 103 and the contact pressure of the transporting roller. Therefore, when the urging force which presses against the disk is increased so as to increase a disk carrying force, the force by which the slider 101 is moved also becomes larger. On the other hand, when the force by which the slider 101 is moved is set to be small, the urging force that presses against the disk becomes smaller. Therefore, the transporting roller and the disk may slip and thus the disk carrying force becomes smaller, too. Accordingly, the setting of the reversing spring 102 is very difficult.

SUMMARY OF THE INVENTION

In view of the problems described above, the present invention may advantageously provide a disk carrying device in which the urging forces are capable of being separately set optimally.

Thus, according to an embodiment of the present invention, there may be provided a disk carrying device including a transporting roller for carrying an inserted disk to a chucking position, a turntable and a damper for holding the disk that is carried to the chucking position, a cam plate for moving at least the turntable or the clamper, a trigger plate, which is moved by carrying of the disk to the chucking position, for changing a transmission route of driving force from the transporting roller to the cam plate, a first biasing means for urging the trigger plate to a position before moving, a guide base for pressing the disk on the transporting roller, an arm roller which is disposed on an opposite side of the guide base with respect to the transporting roller so as to move the guide base apart from the transporting roller, and a second biasing means disposed between the guide base and the arm roller. The guide base and the arm roller are arranged such that the guide base and the arm roller abut with each other when the disk is not present between the guide base and the arm roller, the second biasing means is attached to the guide base and the arm roller such that abutting parts of the guide base and the arm roller are held in an abutted state by urging force of the second biasing means, and the second biasing means is extended when the disk is present between the guide base and the transporting roller and generates urging force pulling the guide base to the transporting roller.

Accordingly, when a disk is not inserted, the guide base and the arm roller arranged across the transporting roller abut with each other and thus the second biasing means (coil spring) is prevented from being further extended. In this state, the trigger plate is positioned at a position before sliding by the first biasing means (coil spring) and the transmission route of driving force is set to be on the transporting roller side.

When a disk is inserted into a disk slot, the disk makes the guide base move in the direction away from the transporting roller and the arm roller and the disk enters between the guide base and the transporting roller. Also, the guide base is separated from the arm roller. Thereby, the second biasing means is extended to generate urging force which pulls the guide base back toward the arm roller and the transporting roller. The guide base presses the disk against the transporting roller by the urging force.

The disk inserted into the disk slot is carried to the chucking position by the transporting roller. When the disk is carried to or just before the chucking position, the disk makes the trigger plate slide against the urging force of the first biasing means and thus the transmission route of driving force is changed from the transporting roller side to the cam plate side. Thus, the rotation of the transporting roller is stopped and the cam plate starts to move. The turntable and the damper are moved by the movement of the cam plate to hold (clamp) the disk which is stopped at the chucking position. Further, the arm roller makes the guide base move in the direction separating from the transporting roller to retreat the guide base to the position where it does not contact with the disk during playing. Then, playing of the disk is started.

After the end of playing, the drive source such as a motor is rotated in the reverse direction, and reverse operations to the above-mentioned operations are performed and the disk is ejected.

According to the embodiment of the present invention described above, the biasing means for the trigger plate (first biasing means) and the biasing means for the guide base (second biasing means) are provided separately. Therefore, the urging force for the trigger plate and the urging force for the guide base can be set separately. Accordingly, these urging forces can be easily set optimally.

Further, the second biasing means is attached to the guide base and the arm roller such that abutting parts of the guide base and the arm roller are held in an abutted state by urging force of the second biasing means, and the second biasing means is extended when the disk is present between the guide base and the transporting roller and the second biasing means generates urging force pulling the guide base to the transporting roller. Therefore, when the disk is not present between the guide base and the transporting roller, the second biasing means does not apply the urging force on the portions other than the abutting parts of the guide base and the arm roller. Thus, even when the guide base and the arm roller are produced from plastic such as ABS, PC, POM, PS and AS, the occurrence of the creep deformation over a long time, the deformation due to a high temperature, the cracking at a low temperature or the like can be prevented. In other words, the material of structure members affected by the urging force of the second biasing means can be changed from an expensive material (expensive plastic such as plastic containing metals such as sheet iron or glass fiber or heat-resistant plastic) to inexpensive material, and thus production cost can be reduced.

In accordance with an embodiment of the present invention, the second biasing means may be disposed near the abutting position of the guide base with the arm roller. Therefore, the second biasing means can be attached on the portions with a high degree of rigidity of the guide base and the arm roller.

According to the embodiment of the present invention described above, adverse effects to the guide base and the arm roller due to the urging force of the second biasing means can be more securely prevented.

In accordance with an embodiment of the present invention, a shutter may be provided on the arm roller for closing the disk slot in cooperation with an operation of the guide base being separated from the transporting roller. Therefore, the shutter can close the disk slot in cooperation with the operation of the guide base being separated from the transporting roller.

According to the embodiment of the present invention described above, the shutter can close the disk slot in cooperation with the operation of the guide base retreated to the position where the guide base does not contact with the disk during playing.

In accordance with an embodiment of the present invention, the first biasing means and the second biasing means may be respectively a coil spring.

According to the embodiment of the present invention described above, coil springs are used as the first biasing means and the second biasing means and thus respective biasing means can be constructed by using a usual coil spring.

In accordance with an embodiment of the present invention, the cam plate may be provided with a cam hole for moving the arm roller, and the arm roller is moved by a movement of the trigger plate through the cam hole of the cam plate and the guide base is moved from a pressurizing position to a retreated position through the arm roller.

According to the embodiment of the present invention described above, the movement of the guide base from the pressurizing position to the retreated position can be easily realized by using interlocking movements of respective related members.

In accordance with an embodiment of the present invention, the disk carrying device may include a motor which is included in the transmission route of driving force, an intermediate gear which is included in the transmission route of driving force and which is rotationally driven by the motor and is axially movable, and an arm cam which is provided between the trigger plate and the cam plate so as to be swung by the trigger plate for transmitting movement of the trigger plate to the cam plate. The intermediate gear may be axially moved by the arm cam to change the driving force of the motor from the transporting roller to the cam plate.

According to the embodiment of the present invention described above, the driving force of the motor can be changed from the transporting roller side to the cam plate side by means of that the intermediate gear is axially moved by the arm cam.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1 is a plan view showing a disk player device in accordance with an embodiment of the present invention.

FIG. 2 is a plan view showing a state in which a frame of the disk player device in FIG. 1 is removed.

FIG. 3 is a front view showing the disk player device in FIG. 1.

FIG. 4 is a side view showing a state that a turntable movable in a vertical direction is at a retreated position.

FIG. 5 is a side view showing a state that the turntable is at an intermediate position when the turntable moves in the vertical direction.

FIG. 6 is a side view showing a state that the turntable is at a play position when the turntable moves in the vertical direction.

FIG. 7 is a side view showing a state in which a reproduction unit is installed on a swing chassis.

FIG. 8 shows a plan view showing a frame.

FIG. 9 shows a plan view showing a chassis.

FIG. 10(A) is a plan view showing a cam plate, FIG. 10(B) is its front view, and FIG. 10(C) is its side view.

FIGS. 11(A) and 11(B) show states in which the swing chassis is moved in the vertical direction. FIG. 11(A) is a front view showing a state in which the cam plate is not moved, and FIG. 11(B) is a front view showing a state in which the cam plate is moved.

FIG. 12 is a front view showing a protruded fitting part and a recessed fitting part.

FIGS. 13(A) and 13(B) show states in which an arm roller is moved in a vertical direction. FIG. 13(A) is a bottom view showing a state in which the cam plate is not moved and FIG. 13(B) is a bottom view showing a state in which the cam plate is moved.

FIG. 14 is a plan view showing a connected state of a pair of detection arms, a switching arm and a disk end detection lever.

FIG. 15 is a side view showing a connected state of the disk end detection lever, a trigger plate and a pinion gear.

FIGS. 16(A) and 16(B) show an operating state for playing a large diameter disk. FIG. 16(A) is an explanatory view showing a state at the time of detection of the large diameter disk which is viewed from side and FIG. 16(B) is an explanatory view showing a state at the time of detection of the large diameter disk which is viewed from upper side.

FIGS. 17(A) and 17(B) show another operating state for playing the large diameter disk. FIG. 17(A) is an explanatory view showing a subsequent state of the state in FIG. 16(A) which is viewed from side and FIG. 17(B) is an explanatory view showing a subsequent state of the state in FIG. 16(B) which is viewed from upper side.

FIGS. 18(A) and 18(B) show another operating state for playing the large diameter disk. FIG. 18(A) is an explanatory view showing a subsequent state of that in FIG. 17(A) which is viewed from side and FIG. 18(B) is an explanatory view showing a subsequent state of that in FIG. 17(B) which is viewed from upper side.

FIGS. 19(A) and 19(B) show another operating state for playing the large diameter disk. FIG. 19(A) is an explanatory view showing a subsequent state of that in FIG. 18(A) which is viewed from side and FIG. 19(B) is an explanatory view showing a subsequent state of that in FIG. 18(B) which is viewed from upper side.

FIGS. 20(A) and 20(B) show another operating state for playing the large diameter disk. FIG. 20(A) is an explanatory view showing a subsequent state of that in FIG. 19(A) which is viewed from side and FIG. 20(B) is an explanatory view showing a subsequent state of that in FIG. 19(B) which is viewed from upper side.

FIGS. 21(A) and 21(B) show another operating state for playing the large diameter disk. FIG. 21(A) is an explanatory view showing a subsequent state of that in FIG. 20(A) which is viewed from side and FIG. 21(B) is an explanatory view showing a subsequent state of that in FIG. 20(B) which is viewed from upper side.

FIGS. 22(A) and 22(B) show another operating state for playing the large diameter disk. FIG. 22(A) is an explanatory view showing a subsequent state of that in FIG. 21(A) which is viewed from side and FIG. 22(B) is an explanatory view showing a subsequent state of that in FIG. 21(B) which is viewed from upper side.

FIGS. 23(A) and 23(B) show another operating state for playing the large diameter disk. FIG. 23(A) is an explanatory view showing a subsequent state of that in FIG. 22(A) which is viewed from side and FIG. 23(B) is an explanatory view showing a subsequent state of that in FIG. 22(B) which is viewed from upper side.

Figure 24:
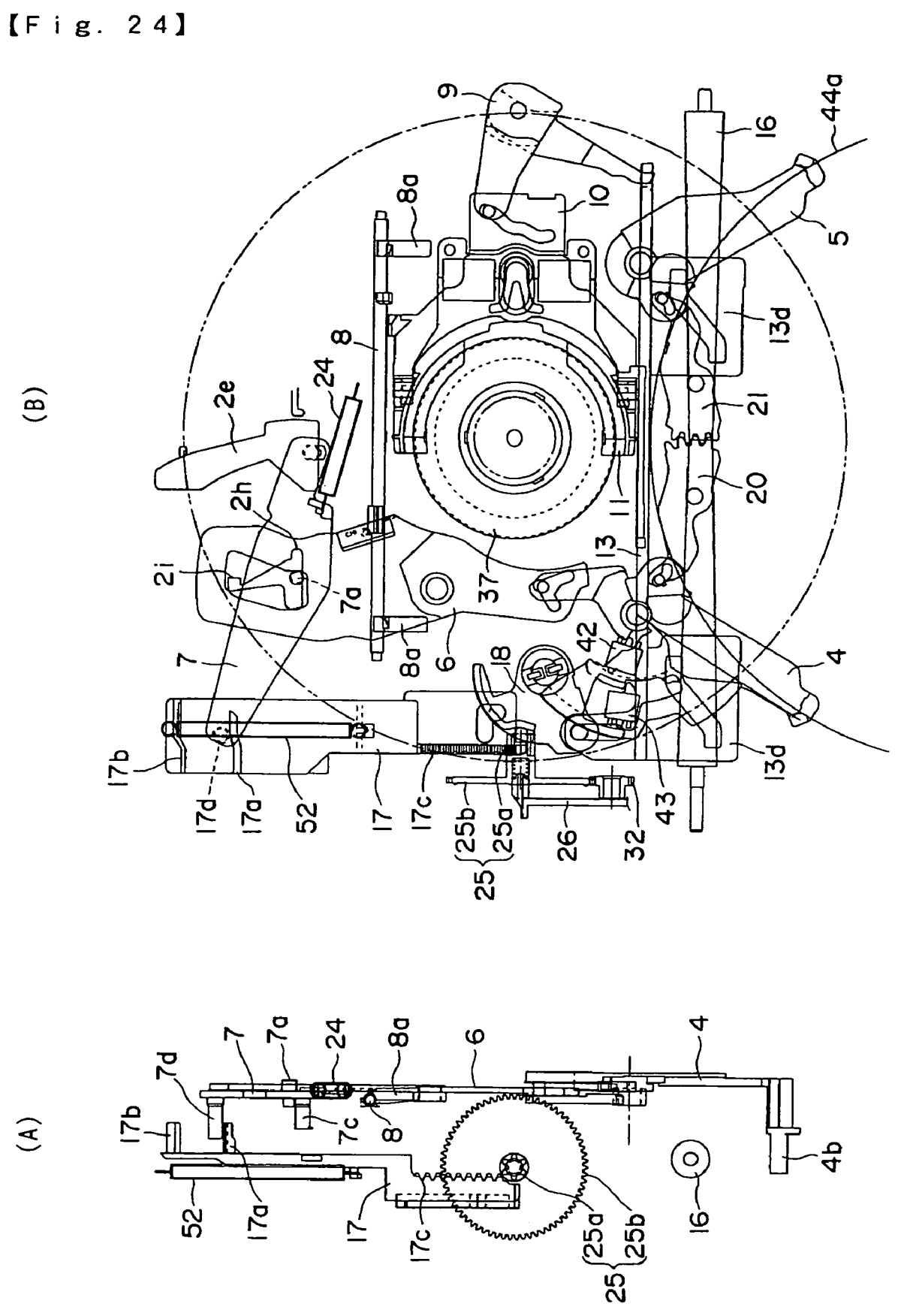

FIGS. 24(A) and 24(B) show another operating state for playing the large diameter disk. FIG. 24(A) is an explanatory view showing a subsequent state of that in FIG. 23(A) which is viewed from side and FIG. 24(B) is an explanatory view showing a subsequent state of that in FIG. 23(B) which is viewed from upper side.

FIGS. 25(A) and 25(B) show another operating state for playing the large diameter disk. FIG. 25(A) is an explanatory view showing a subsequent state of that in FIG. 24(A) which is viewed from side and FIG. 25(B) is an explanatory view showing a subsequent state of that in FIG. 24(B) which is viewed from upper side.

FIGS. 26(A) and 26(B) show an operating state for playing a small diameter disk. FIG. 26(A) is an explanatory view showing a state at the time of detection of the small diameter disk which is viewed from side and FIG. 26(B) is an explanatory view showing a state at the time of detection of the small diameter disk which is viewed from upper side.

FIGS. 27(A) and 27(B) show another operating state to play the small diameter disk. FIG. 27(A) is an explanatory view showing a subsequent state of that in FIG. 26(A) which is viewed from side and FIG. 27(B) is an explanatory view showing a subsequent state of that in FIG. 26(B) which is viewed from upper side.

FIGS. 28(A) and 28(B) show another operating state for playing the small diameter disk. FIG. 28(A) is an explanatory view showing a subsequent state of that in FIG. 27(A) which is viewed from side and FIG. 28(B) is an explanatory view showing a subsequent state of that in FIG. 27(B) which is viewed from upper side.

FIGS. 29(A) and 29(B) show another operating state for playing the small diameter disk. FIG. 29(A) is an explanatory view showing a subsequent state of that in FIG. 28(A) which is viewed from side and FIG. 29(B) is an explanatory view showing a subsequent state of that in FIG. 28(B) which is viewed from upper side.

FIGS. 30(A) and 30(B) show another operating state for playing the small diameter disk. FIG. 30(A) is an explanatory view showing a subsequent state of that in FIG. 29(A) which is viewed from side and FIG. 30(B) is an explanatory view showing a subsequent state of that in FIG. 29(B) which is viewed from upper side.

FIGS. 31(A) and 31(B) show another operating state for playing the small diameter disk. FIG. 31(A) is an explanatory view showing a subsequent state of that in FIG. 30(A) which is viewed from side and FIG. 31(1B) is an explanatory view showing a subsequent state of that in FIG. 30(B) which is viewed from upper side.

FIG. 32 is a schematic view showing a state in which a disk is loaded.

FIGS. 33(A), 33(B) and 33(C) show a stopper retreating means. FIG. 33(A) is a side view showing a state in which the stopper part of a guide lever protrudes in a disk playing space, FIG. 33(B) is a side view showing a state in which the guide lever is turned halfway, and FIG. 33(C) is a side view showing a state in which the stopper part of the guide lever is retreated from the disk playing space.

FIG. 34 is a sectional view showing an operation of the stopper part of the guide lever.

FIGS. 35(A) and 35(B) show a state in which the turning of the guide lever is prevented. FIG. 35(A) is a sectional view showing a first locking means and FIG. 35(B) is a sectional view showing a second locking means.

FIGS. 36(A), 36(B) and 36(C) show a click means. FIG. 36(A) is a sectional view at a first position, FIG. 36(B) is a sectional view at an intermediate position, and FIG. 36(C) is a sectional view at a second position.

FIG. 37 is a schematic view showing a state in which the centering of the small diameter disk is performed.

FIGS. 38(A) and 38(B) show the stopper part of the guide lever. FIG. 38(A) is a sectional view showing a left side stopper part and FIG. 38(B) is a sectional view showing a right side stopper part.

FIG. 39 is a side view showing a setting state of a spring wire.

FIG. 40 is a side view showing an essential portion of a conventional disk carrying device.

FIGS. 41(A) and 41(B) show states in which a swing chassis is moved in a vertical direction. FIG. 41(A) is a side view showing a state corresponding to FIG. 11(A) and FIG. 41(B) is a side view showing a state corresponding to FIG. 11(B).

DETAILED DESCRIPTION OF THE PREFERRED EMBODIMENTS

The construction in accordance with an embodiment of the present invention will be described in detail below with reference to the accompanying drawings. In the embodiment of the present invention, a disk player device will be described which is a type in which a disk is inserted while the disk is laid. However, the present invention is not limited to a disk player device of a type in which a disk is inserted while the disk is laid. For example, the present invention may be applied to a disk player device of a type in which a disk is inserted while the disk is stood on its end.

A disk player device is shown in FIGS. 1 through 39. A disk playing space 58 is formed between a chassis 1 and a frame 2 constructing a housing. A disk insert slot 3 is formed between a front wall 1a of the chassis 1 and a front wall 2a of the frame 2.

On an upper face of the frame 2 are mounted a pair of detection arms 4, 5, a switching arm 6, a disk end detection lever 7, a guide lever 8, a lift arm 9, a lift plate 10, an arm damper 11 and a switch plate 12. A cam plate 13, an arm roller 14, a guide base 15 and a transporting roller 16 are disposed near the disk insert slot 3 between the chassis 1 and the frame 2. In addition, on the bottom face of the chassis 1 are mounted a trigger plate 17, an arm cam 18 and a motor 19.

The pair of detection arms 4, 5 is connected through a synchronous means such that they swing so as to open or close in a synchronous manner. The synchronous means includes, for example, a pair of connection arms 20, 21, which turn about shafts 2b, 2c integrally formed on the frame 2 and the gear parts 20a, 21a of the connection arms 20, 21 are engaged with each other. An axis 20b on the left side connection arm 20 is inserted into a long hole 4a of the left side detection arm 4 and an axis 21b on the right side connection arm 21 is inserted into a long hole 5a of the right side detection arm 5 and thus they are respectively connected to swing. Therefore, the pair of detection arms 4, 5 swing so as to open or close in a synchronous manner. Abutting parts 4b, 5b are formed on the end parts of the pair of detection arms 4, 5 so as to cross the inside of the disk insert slot 3. The pair of detection arms 4, 5 are urged in a closing direction by a biasing means (spring member or torsion spring) 22.

A switching arm 6 is swingably mounted on the frame 2 with a screw 23. A first cam hole 6a is formed at one end of the switching arm 6 and a second cam hole 6b is formed at the other end respectively. An axis 4c integrally formed on the left side detection arm 4 is inserted into the first cam hole 6a and thus the switching arm 6 also swings when the left side detection arm 4 swings.

A disk end detection lever 7 is movably mounted between the frame 2 and the switching arm 6. Rotary axes 7a, 7b are integrally formed at the center of the upper face and the under face of the disk end detection lever 7 respectively in a coaxial manner. The rotary axis 7a on the upper face side is inserted into the second cam hole 6b of the switching arm 6 and the rotary axis 7b on the under face side is inserted into the cam hole 2d of the frame 2. An abutting part 7c is integrally formed on the under face at one end of the disk end detection lever 7. The abutting part 7c is inserted into the cam hole 2e of the frame 2 and abuts with a disk 44 that is carried to or just before the chucking position. A protruded part 7d is integrally formed on the under face at the other end of the disk end detection lever 7. The protruded part 7d is inserted into the hole 2f of the frame 2 and capable of abutting with the walls 17a, 17b of the trigger plate 17. The disk end detection lever 7 is pulled by a biasing means 24.

A guide lever 8 is provided with two stopper parts 8a protruding in the disk playing space 58. The guide lever 8 is turnably arranged at a position where, in the case that an inserted disk 44 is a small diameter disk 44b, when the small diameter disk 44b is carried at the chucking position, the periphery of the small diameter disk 44b abuts with the stopper parts 8a. The stopper part 8a protrudes into the disk playing space 58 through the hole 2g provided in the frame 2.

A trigger plate 17 is capable of sliding in a carrying direction of the disk 44. A rack 17c, which is capable of engaging with the pinion gear 25a of an intermediate transmission gear 25, is formed on the one end side of the trigger plate 17. The intermediate transmission gear 25 is rotatably mounted on the rotary shaft 26a of a sub chassis 26 so as to be movable in the axial direction. The intermediate transmission gear 25 is urged by a biasing means 27 such that the end face of the pinion gear 25a abuts with an arm cam 18.

A large diameter gear 25b of the intermediate transmission gear 25 engages with a gear 28 all the time and the rotation of a motor 19, which is a drive source, is transmitted to a pulley 29, a belt 30, a pulley 31, a gear 28, and a large diameter gear 25b. Also, the large diameter gear 25b engages with a gear 32 when the intermediate transmission gear 25 moves on the arm cam 18 side. On the other hand, when the intermediate transmission gear 25 moves on the opposite side to the arm cam 18, the engagement between the large diameter gear 25b and the gear 32 is released.

The gear 32 engages with a gear 33 all the time. The rotation of the gear 33 is transmitted to a friction disc 35 via a friction felt 34 and the rotation of the friction disc 35 is transmitted to a transporting roller 16. The gear 33 is pressed against the friction disc 35 through the friction felt 34 by a spring 36 and the rotating force is transmitted by frictional engagement. Therefore, when the rotational torque of the transporting roller 16 becomes excessive, the gear 33 idly rotates with respect to the friction disc 35 to protect the transporting roller 16 and the like. In other words, a clutch mechanism is constructed.

The trigger plate 17 is connected to the arm cam 18. Therefore, when the trigger plate 17 is moved, the arm cam 18 is swung to move a cam plate 13. A lift arm 9 is connected to the cam plate 13. An axis 9a of the lift arm 9 is inserted into a cam hole 10a of a lift plate 10. Therefore, when the lift arm 9 is swung by the movement of the cam plate 13, the lift plate 10 are slid to make an arm damper 11 that holds a damper 37 move in an vertical direction. The cam hole 10a of the lift plate 10 is provided with three operating positions.

Two kinds of cam holes 13a, 13b of two pieces each are respectively formed on the cam plate 13. First cam holes 13a, 13a are formed on a vertical plate 13c. Protruded parts 41a, 41a of a swing chassis 41, on which a play unit 40 integrally provided with a turntable 38 and a pickup 39 is mounted, are inserted into the first cam holes 13a, 13a. Therefore, when the cam plate 13 is moved, the swing chassis 41 is swung in the vertical direction. In other words, the swing chassis 41 also moves up-and-down interlocking with an up-and-down motion of the arm damper 11.

In addition, the second cam hole 13b of the cam plate 13 is formed on two horizontal plates 13d, 13d. Protruded parts 14a of the arm roller 14 are inserted into the second cam holes 13b, 13b. Therefore, when the cam plate 13 is moved, the arm roller 14 is turned.

A switch plate 12 is mounted on the frame 2 so as to cover the connected portion of the switching arm 6 and the left side detection arm 4. Two switches 42, 43 are mounted on the upper face of the switch plate 12. When the left side detection arm 4 is swung, an operation piece 4d that is integrally formed on the left side detection arm 4 performs a changeover operation of the two switches 42, 43. In the state that the left side detection arm 4 does not swing yet, the first switch 42 is turned off and the second switch 43 is turned on.

The transporting roller 16 is rotatably mounted on the chassis 1. In other words, the transporting roller 16 is not a sliding type and thus its position does not shift. A guide base 15 is vertically movably mounted on the under face of the frame 2. The arm roller 14 is turnably mounted on the chassis 1. The arm roller 14 and the transporting roller 16 are turnably and rotatably mounted in a coaxial manner.

Operations of the disk player device will be described below. First, the case for playing of a large diameter disk 44a will be described based on FIGS. 16(A) and 16(B) through FIGS. 25(A) and 25(B), which show positional relationships of respective members.

1. Detection of Large Diameter Disk 44a

In a waiting state in which the large diameter disk 44a is not inserted, as shown in FIGS. 16(A) and 16(B), since the cam plate 13 is not moved, the turntable 38 and the damper 37 are retreated from the disk playing space 58 as shown in FIG. 4. Further, since the trigger plate 17 is not also moved, the engagement between the rack 17c and the pinion gear 25a of the intermediate mediation gear 25 is released. In addition, since the intermediate mediation gear 25 is moved on the arm cam 18 side, the large diameter gear 25b is engaged with the gear 32.

In this state, when the large diameter disk 44a is inserted into the disk insert slot 3, the pair of detection arms 4, 5 are pushed and swung in the opening direction. At this time, even when the inserted large diameter disk 44a is deviated on left side or right side from the center position, the pair of detection arms 4, 5 are synchronously swung because they are connected by the connection arms 20, 21 that are the synchronous means. The first switch 42 is switched from OFF to ON by swinging of the left side detection arm 4. Therefore, the insertion of the large diameter disk 44a is detected and the motor 19 starts to rotate. The rotation of the motor 19 is transmitted to the pulley 29, the belt 30, the pulley 31, the gear 28, the large diameter gear 25b, the gear 32, the gear 33, the friction felt 34, the friction disc 35, and the transporting roller 16. Therefore, the transporting roller 16 starts to rotate and the preparation for carrying the large diameter disk 44a has been completed.

2. Release of Guide Lever 8, Recognition of Large Diameter Disk 44a, Moving of Rotation Shaft and Chucking Judgment When the large diameter disk 44a inserted into the disk insert slot 3 reaches the transporting roller 16 as shown in FIGS. 17(A) and 17(B), the large diameter disk 44a is pressed on the transporting roller 16 by the guide base 15 and carried toward the chucking position by a frictional force generated between the transporting roller 16 and the guide base 15. The pair of detection arms 4, 5 are further swung in the opening direction by the carrying of the large diameter disk 44a and the switching arm 6 is also swung by the swinging of the left side detection arm 4. When the switching arm 6 swings, a click means 45 disposed between the switching arm 6 and the guide lever 8 makes the guide lever 8 turn about 90 degrees. Therefore, the stopper part 8a of the guide lever 8 is moved from a protruding position protruding into the disk playing space 58 to a retreated position.

Further, the second switch 43 is changed from ON to OFF by the swinging of the left side detection arm 4. In this manner, the inserted disk 44 is recognized as the large diameter disk 44a.

The disk end detection lever 7 is moved by the swinging of the switching arm 6 and its rotary axis 7b disengages from a first engagement part 2h of the frame 2. When the large diameter disk 44a is further carried, the large diameter disk 44a abuts with the abutting part 7c of the disk end detection lever 7 and pushes it forward. Since the rotary axis 7b of the disk end detection lever 7 has already disengaged from the first engagement part 2h, the disk end detection lever 7 swings around the protruded part 7d, which is abutted with the wall 17a of the trigger plate 17, without swinging around the rotary axis 7b. In other words, the disk end detection lever 7 swings around the protruded part 7d without the wall 17a of the trigger plate 17 being pushed by the protruded part 7d, and thus the rotary axis 7b is moved to a second engagement part 2i.

When the largest part in the radial direction of the large diameter disk, 44a passes through the abutting parts 4b, 5b of the pair of detection arms 4, 5 by carrying of the large diameter disk 44a, the pair of detection arms 4, 5 having swung in the opening direction begin to swing in a closing direction. Thus, the second switch 43 is turned to ON from OFF again. Then, the disk end detection lever 7 is swung by further carrying of the large diameter disk 44a and the rotary axis 7b is moved to the second engagement part 2i from the first engagement part 2h along an inclined face 2j of the cam hole 2d of the frame 2. Then, the rotary axis 7a on the upper face side pushes the edge 6c of the second cam hole 6b of the switching arm 6 to swing the switching arm 6. The pair of detection arms 4, 5 is swung in the opening direction again by the swinging of the switching arm 6, and thus the second switch 43 is changed from ON to OFF again. Accordingly, the passage of the large diameter disk 44a can be detected and, after a lapse of prescribed time (previously set time), it is judged that the large diameter disk 44a has been held (chucked) by the turntable 38 and the damper 37.

3. Completion of Disk 44 Carrying and Chucking Start

As shown in FIGS. 18(A) and 18(B), the rotary axis 7b engages with the second engagement part 2i just before the center hole 44c of the large diameter disk 44a reaches to a position (chucking position) where the rotary shaft of the turntable 38 is capable of being inserted into the center hole 44c of the large diameter disk 44a. After that, the disk end detection lever 7 swings with the rotary axis 7b as a fulcrum which is engaged with the second engagement part 2i. Therefore, the protruded part 7d of the disk end detection lever 7 pushes the wall 17a against the urging force of the biasing means 24 to make the trigger plate 17 move toward the intermediate mediation gear 25 side. Since the rack 17c becomes engaged with the rotating pinion gear 25a by the movement of the trigger plate 17, afterwards, the trigger plate 17 is slid by utilizing the rotation of the motor 19.

When the trigger plate 17 is moved further, the arm cam 18 is swung such that the cam face 18a makes the intermediate transmission gear 25 move to separate the large diameter gear 25b from the gear 32. Therefore, the rotation of the transporting roller 16 is stopped.

4. Temporary Holding of Clamper 37 and Chucking

When the cam plate 13 is moved by the swinging of the arm cam 18, the damper 37, the swing chassis 41, the guide base 15, the arm roller 14 are operated (see FIGS. 19(A) and 19(B)). In other words, the lift arm 9 is swung by the movement of the cam plate 13, which makes the lift plate 10 slide. Thus, the arm damper 11, which holds the damper 37, begins to go down so that the damper 37 is protruded into the disk playing space 58. At this time, since the cam hole 10a of the lift plate 10 is formed so as to have three operating positions, the arm damper 11 can be temporarily stopped on the way of moving downward. In other words, while the axis 9a of the lift arm 9 is sliding along the position of the second stage of the cam hole 10a, the lowering of the arm damper 11 can be stopped to hold the damper 37 at an intermediate position. The damper 37 is constructed to be attracted to the turntable 38 by a magnetic force to clamp the disk 44 between the damper 37 and the turntable 38. In the embodiment of the present invention, the problem that an impact sound is generated due to a strong attraction of the damper 37 to the turntable 38 can be prevented by temporarily stopping of the lowering of the arm damper 11 on the way. FIGS. 19(A) and 19(B) show a state that the axis 9a of the lift arm 9 is sliding at a position of the second stage of the cam hole and the lowering of the damper 37 is temporarily stopped.

The protruded part 41a of the swing chassis 41 is inserted into the first cam hole 13a of the cam plate 13 and thus the swing chassis 41 begins to go up by the movement of the cam plate 13. Therefore, the turntable 38 mounted on the swing chassis 41 is protruded into the disk playing space 58.

Further, the arm roller 14 is turned by the movement of the cam plate 13 to cause to lift the guide base 15, which has pressed the large diameter disk 44a on the transporting roller 16, so as to be separated from the large diameter disk 44a.

Thus, the large diameter disk 44*a* becomes rotatable. Also, a shutter 14*b* integrally formed on the arm roller 14 is lifted by the turning of the arm roller 14 to close the disk slot 3.

5. Chucking Completion and Performance (Play)

The motor 19 is rotated during a prescribed time period after the passage of the large diameter disk 44*a* is detected by switching operation of the second switch 43 and thus the following operations are performed by the rotational drive force of the motor 19 (see FIGS. 20(A) and 20(B)).

(a) The trigger plate 17 is further moved by the rotation of the large diameter gear 25*b* of the intermediate transmission gear 25 and the arm cam 18 is further turned, and thus the cam plate 13 is further moved, too.

(b) The protruded part 7*d* of the disk end detection lever 7 is pushed by the wall 17*b* of the trigger plate 17, and the disk end detection lever 7 is swung with the rotary axis 7*b* that is engaged with the second engaging part 2*i* as a fulcrum to cause to separate the abutting part 7*c* from the disk 44 slightly. Thus, the abutting part 7*c* is retreated to a position where it does not come into contact with the disk 44 that is rotated and played.

(c) The swing chassis 41 is further lifted by further movement of the cam plate 13 and the axis of the turntable 38 is inserted into the center hole 44*c* of the large diameter disk 44*a*. Thus, the turntable 38 and the damper 37 are magnetically connected to hold the large diameter disk 44*a*.

(d) When the cam plate 13 is further moved, the lift arm 9 and the lift plate 10 are interlocked to make the arm damper 11 retreat to a position where the arm damper 11 does not come into contact with the large diameter disk 44*a* and the damper 37 during a playing operation.

(e) A protrusion 10*b* of the lift plate 10 is located at a position where the protrusion 10*b* prevents the turning of the protruded part 8*b* of the guide lever 8.

(f) The arm roller 14 is turned by the movement of the cam plate 13 such that the shutter 14*b* prevents the insertion of another disk 44 and the guide base 15 is retreated to a position where the guide base 15 does not come into contact with the large diameter disk 44*a* during playing operation.

6. Beginning of Eject Operation of Disk 44, Temporary Holding of Clamper 37, Chucking Release, and Temporary Locking of Disk End Detection Lever 7

The following operations are performed by driving the motor 19 in the reverse direction, which has been stopped during playing operation (see FIG. 21).

(a) The trigger plate 17 and the arm cam 18 which are interlocked with each other begin to move the cam plate 13*d* toward the original position due to the rotation of the intermediate transmission gear 25.

(b) The following operations are performed by the movement of the cam plate 13. In other words, the lift plate 10 and the lift arm 9 are interlocked each other to make the arm damper 11 move to an intermediate position from the retreated position at the time of playing operation. Also, the guide base 15 is moved in the direction to the transporting roller 16 from the retreated position and the holding operation of the large diameter disk 44*a* is started so as to sandwich the large diameter disk 44*a*. Further, the swing chassis 41 is lowered and the turntable 38 starts to move down from the play position to the retreated position and away from the damper 37 (chucking released). Also, the shutter 14*b* of the arm roller 14 is moved to the retreated position. In addition, the lift arm 9, the lift plate 10 and the arm damper 11 are interlocked to make the damper 37 move to the retreated position at the time of the carrying operation of the disk 44.

(c) The wall 17*b* pushing the protruded part 7*d* of the disk end detection lever 7 is retreated by the movement of the trigger plate 17 and the disk end detection lever 7 becomes to be swingable. However, the swinging of the disk end detection lever 7 is temporarily locked by the protruded part 2*k* of the frame 2 and the tension of the biasing means 24. Thus, the situation can be prevented in which the abutting part 7*c* of the disk end detection lever 7 accidentally engages over the large diameter disk 44*a*.

7. Release of Temporary Locking of Swinging of Disk End Detection Lever 7 After Eject Starts As a result of the swinging of the arm cam 18, the intermediate transmission gear 25, which has been axially moved by the cam face 18*a*, returns to a position where the large diameter gear 25*b* engages with the gear 32 by the urging force of the biasing means 27. Therefore, the transporting roller 16 starts to rotate and the carrying of the large diameter disk 44*a* for ejection is started (see FIGS. 22(A) and 22(B)). When the large diameter disk 44*a* starts moving, the protruded part 7*d* of the disk end detection lever 7 is pushed by the wall 17*a* of the trigger plate 17 and the disk end detection lever 7 is escaped from the locking due to the protruded part 2*k* of the frame 2. In this state, the large diameter disk 44*a* is present at the most apart position from the turntable 38 in the play space and the large diameter disk 44*a* is located at a position apart from the abutting part 7*c* of the disk end detection lever 7.

8. Releasing Engagement of Swinging Fulcrum of Disk End Detection Lever 7

As shown in FIGS. 23(A) and 23(B), the pair of detection arms 4, 5 swing in the opening direction through the carrying of the large diameter disk 44*a* for ejection. Therefore, the switching arm 6 and the left side detection arm 4 are interlocked with each other to make the rotary axis 7*b* of the disk end detection lever 7 move to a position where the rotary axis 7*b* disengages from the second engaging part 2*i*.

The rotary axis 7*b* of the disk end detection lever 7 is capable of moving in a direction of the first engaging part 2*h* of the frame 2 by tension of the biasing means 24. However, since the rotary axis 7*a* is inserted into the second cam hole 6*b* of the switching arm 6, the rotary axis 7*a* moves along a slant face 6*d*. In other words, since the pair of detection arms 4, 5 are swung by the urging force of the biasing means 22, the position at the slant face 6*d* is determined by the abutting position between the outer peripheral part of the large diameter disk 44*a* which is carried for ejection and the abutting parts 4*b*, 5*b* of the pair of detection arms 4, 5.

9. Restricted Movement of Swinging Fulcrum of Disk End Detection Lever 7

The left side detection arm 4 and the switching arm 6 are interlocked with each other to guide the rotary axis 7*a* of the disk end detection lever 7 by means of that the pair of detection arms 4, 5 continue to swing in the opening direction during carrying of the large diameter disk 44*a* for ejection as shown in FIGS. 24(A) and 24(B). The disk end detection lever 7 makes the rotary axis 7*a* move along the slant face 6*d* and makes the rotary axis 7*b* move along the inclined face 2*j* while receiving the tensile force of the biasing means 24.

The rotary axis 7*b* of the disk end detection lever 7 is capable of moving in the direction of the first engaging part 2*h* by the tensile force of the biasing means 24. However, in this state, the rotary axis 7*a* cannot be moved because the rotary axis 7*a* is prevented from moving by the slant face 6*d* of the switching arm 6. This is because the rotary axis 7*b* engages with the second engaging part 2*i* even when the disk 44 is carried into again (re-inserted) without taking out after the disk 44 has been completely ejected. According to the construction described above, the increase of load to the large diameter disk 44*a* due to that the abutting parts 4*b*, 5*b* of the pair of detection arms 4, 5 are swung by the urging force of the biasing means 22 at the time of carrying of the large diameter disk 44*a* for rejection can be prevented. Also, unexpected switching operation of the second switch 43 and the turning of the stopper part 8*a* of the guide lever 8 by the protruded part 6*e* can be prevented.

After the maximum position of the outer diameter of the large diameter disk 44*a* has passed through the pair of abutting parts 4*b*, 5*b* of the detection arms 4, 5, the abutting parts 4*b*, 5*b* slide along the outer circumferential edge of the large diameter disk 44*a* and the pair of detection arms 4, 5 is swung in the closing direction. The switching arm 6 is swung in cooperation with this operation and the movement of the rotary axis 7*b* of the disk end detection lever 7 by the slant face 6*d* toward the direction of the first engagement part 2*h* is permitted.

10. Completion of Ejection (Stoppage)

As shown in FIGS. 25(A) and 25(B), when the large diameter disk 44*a* carried for ejection reaches to a prescribed position, the second switch 43 is changed from OFF to ON by the left side detection arm 4. This position is detected as the eject position and the rotation of the motor 19 is stopped after the elapse of a prescribed time period. In other words, since the motor 19 is rotated during the prescribed time period after the second switch 43 is changed to ON, the large diameter disk 44*a* is carried to an eject position where a user can pick up and take out the large diameter disk 44*a*.

When the user takes out the large diameter disk 44*a*, the disk width of the large diameter disk 44*a* with which the pair of detection arms 4, 5 abut decreases. Therefore, the pair of detection arms 4, 5 is swung in the closing direction by the urging force of the biasing means 22. Thus, the protruded part 6*e* of the switching arm 6 makes the guide lever 8 turn so as to return the stopper part 8*a* to the passage blocking position for the disk 44 from the retreated position.

The movement of the disk end detection lever 7 has been restricted by means of that the switching arm 6 abuts with the rotary axis 7*a*. However, the restriction of the movement is released by the swinging of the switching arm 6 when a user takes out the large diameter disk 44*a*. The disk end detection lever 7 is moved by the tensile force of the biasing means 24 and the rotary axis 7*b* engages with the first engaging part 2*h*.

When the user takes out the large diameter disk 44*a* from the disk slot 3, the first switch 42 is changed from ON to OFF, and thus the taking out of the large diameter disk 44*a* is recognized and the operation is finished.

Next, the case for playing of a small diameter disk 44*b* will be described based on FIGS. 26(A) and 26(B) through FIGS. 31(A) and 31(1B), which show positional relationships of respective members.

1. Detection of Small Diameter Disk 44*b*

In the waiting state in which the small diameter disk 44*b* is not inserted, as shown in FIGS. 26(A) and 26(B), since the cam plate 13 is not moved, the turntable 38 and the damper 37 are retreated from the disk playing space 58 (see FIG. 4). Further, since the trigger plate 17 is not also moved, the engagement between the rack 17*c* and the pinion gear 25*a* of the intermediate mediation gear 25 is released. In addition, since the intermediate mediation gear 25 is moved on the arm cam 18 side, the large diameter gear 25*b* is engaged with the gear 32.

In this state, when the small diameter disk 44*a* is inserted into the disk insert slot 3, the pair of detection arms 4, 5 are pushed and moved in the opening direction. At this time, even when the inserted small diameter disk 44*a* is deviated on left side or right side from the center position, the pair of detection arms 4, 5 are synchronously swung because they are connected by the connection arms 20, 21 that are a synchronous means. The first switch 42 is changed from OFF to ON by the swinging of the left side detection arm 4. Therefore, the insertion of the small diameter disk 44*a* is detected and the motor 19 starts to rotate. The rotation of the motor 19 is transmitted to the pulley 29, the belt 30, the pulley 31, the gear 28, the large diameter gear 25*b*, the gear 32, the gear 33, the friction felt 34, the friction disc 35, and the transporting roller 16. Therefore, the transporting roller 16 starts to rotate and the preparation for carrying the small diameter disk 44*b* has been completed.

The stopper part 8*a* of the guide lever 8 is provided for performing the positioning of the small diameter disk 44*b* to a chucking position and thus the stopper part 8*a* does not retreat from the disk playing space 58 when the small diameter disk 44*b* is carried. The stopper part 8*a* of the guide lever 8 protrudes in the disk playing space 58 but does not come into contact with the small diameter disk 44*b*.

2. Confirmation and Completion of Carrying of Small Diameter Disk 44*b* and Chucking Start)

When the small diameter disk 44*b* inserted into the disk insert slot 3 reaches the transporting roller 16 as shown in FIGS. 27(A) and 27(B), the small diameter disk 44*b* is pressed on the transporting roller 16 by the guide base 15 and carried toward the chucking position by a frictional force generated between the transporting roller 16 and the guide base 15. The pair of detection arms 4, 5 is further swung in the opening direction by the carrying of the small diameter disk 44*b*. Since the small diameter disk 44*b* has a small diameter and thus its maximum part of the outer periphery immediately passes through the abutting parts of the pair of detection arms 4, 5. Therefore, the pair of detection arms 4, 5 begin to swing in the closing direction by the urging force of the biasing means 22. Thus, the first switch 42 is changed from ON to OFF. In other words, after the first switch 42 is changed from OFF to ON (first switching) by the insertion of the disk 44, the first switch 42 is changed from ON to OFF (second switching) without the switching of the second switch 43. As a result, the inserted disk 44 is recognized as a small diameter disk 44*b*. Further, when a lapse of prescribed time (previously set time) has passed after the second switching of the first switch 42 is performed, it can be judged that the small diameter disk 44*b* has been held (chucked) by the turntable 38 and the damper 37.

When the small diameter disk 44*b* reaches a position (position just before the outer circumferential edge of the small diameter disk 44*b* reaches the stopper part 8*a* of the guide lever 8) which is just before the chucking position (position where the protruded part of the turntable 38 is capable of being inserted into the center hole 44*c* of the disk 44), the small diameter disk 44*b* abuts with the abutting part 7*c* of the disk end detection lever 7 and pushes it. Therefore, the disk end detection lever 7 swings with the rotary axis 7*b* as the swinging center, which is engaged with the first engaging part 2*h* of the frame 2, and the protruded part 7*d* pushes the wall 17*a* of the trigger plate 17. Therefore, the trigger plate 17 slides and a chucking operation begins as similarly to the case of the large diameter disk 44*a*.

The following judgments are performed on the basis of the switching timing of the first switch 42. In order to perform the judgments, the range of an elapse time is previously set which is between the detection of disk insertion (first switching from OFF to ON of the first switch 42) and the detection of disk passage (second switching from ON to OFF of the first switch 42). When an actual elapsed time is within the range of the previously set time period, it is determined that the carrying of the small diameter disk 44*b* has been properly performed and operation is continued. In the case that the passage of the small diameter disk 44*b* cannot be detected even when the time period which is previously set is elapsed after the insertion of the small diameter disk 44*b* is detected, it is judged that abnormality has happened and thus the motor 19 is reversed and the small diameter disk 44*b* is rejected. Alternatively, when it is judged that abnormality has happened, the motor 19 is reversed during a prescribed time period and then the small diameter disk 44*b* may be carried by rotating in the normal direction again. Alternatively, when it is judged that abnormality has happened, the motor 19 may be stopped and rotated by manual operation to eject the small diameter disk 44*b*.

3. Play

After the passage of the small diameter disk 44*b* is detected, the motor 19 is rotated during a prescribed time period. The following operations are performed by rotation of the motor 19 (see FIGS. 28(A) and 28(B)).

(a) The rotation of the motor 19 is transmitted to the pulley 29, the belt 30, the pulley 31, the gear 28, and the large diameter gear 25*b* of the intermediate transmission gear 25. The trigger plate 17 is slid because the disk end detection lever 7 pushes it. Since the rack 17*c* engages with the pinion gear 25*a* of the intermediate transmission gear 25, the trigger plate 17 is further moved by the rotation of the pinion gear 25*a* of the intermediate transmission gear 25 and thus the arm cam 18 is swung and the cam plate 13 is moved.

(b) The protruded part 7*d* of the disk end detection lever 7 is pushed by the wall 17*b* of the trigger plate 17, and the disk end detection lever 7 is swung with the rotary axis 7*b* that is engaged with the first engaging part 2*h* as a fulcrum to make the abutting part 7*c* separate from the small diameter disk 44*b*. Thus, the abutting part 7*c* is retreated to a position where it does not come into contact with the small diameter disk 44*b* that is rotated and played.

(c) When the cam plate 13 is moved, the small diameter disk 44*b* is clamped with the turntable 38 and the damper 37 with operations as similar to the case in the large diameter disk 44*a*.

(d) The arm clamper 11 is retreated by the movement of the cam plate 13 to a position where the arm damper 11 does not come into contact with the small diameter disk 44*b* and the damper 37 during a playing operation with operations as similar to the case in the large diameter disk 44*a*.

(e) The protrusion 10*b* of the lift plate 10 is located at a position for preventing the turning of the protruded part 8*b* of the guide lever 8.

(f) The arm roller 14 is turned by the movement of the cam plate 13 such that the shutter 14*b* prevents the insertion of another disk 44 and that the guide base 15 is retreated to a position where it does not come into contact with the small diameter disk 44*b* during playing operation.

The difference in comparison with the case of the large diameter disk 44*a* is that the disk 44 which is inserted is not the large diameter disk 44*a* but the small diameter disk 44*b* and that the rotary axis 7*b* of the disk end detection lever 7 is not swung with the second engaging part 2*i* but with the first engaging part 2*h* as the fulcrum.

4. Beginning of Eject Operation for Small Diameter Disk 44*b*, Temporary Holding of Clamper 37, Chucking Release and Temporary Locking of Disk End Detection Lever 7

The following operations are performed by driving the motor 19 in the reverse direction which has been stopped during playing operation (see FIGS. 29(A) and 29(B)).

(a) The trigger plate 17 and the arm cam 18 are interlocked with each other and begin to move the cam plate 13*d* toward the original position with the rotation of the intermediate transmission gear 25.

(b) The following operations are performed by the movement of the cam plate 13. In other words, the arm damper 11 is moved to the intermediate position from the retreated position at the time of playing operation by the interlocking movement of the lift plate 10 and the lift arm 9. Also, the guide base 15 is moved to the direction of the transporting roller 16 from the retreated position and the holding operation of the small diameter disk 44*b* is started such that the small diameter disk 44*b* is sandwiched. Further, the swing chassis 41 is lowered and the turntable 38 starts to move from the play position to the retreated position and away from the damper 37 (chucking released). Also, the shutter 14*b* of the arm roller 14 moves to the retreated position. In addition, the damper 37 is moved to the retreated position for the carrying operation of the disk 44 by the interlocking movement of the lift arm 9, the lift plate 10 and the arm damper 11.

(c) The wall 17*b* pushing the protruded part 7*d* of the disk end detection lever 7 is retreated by the movement of the trigger plate 17 and the disk end detection lever 7 becomes swingable. However, the swinging of the disk end detection lever 7 is temporarily locked by the protruded part 2*m* of the frame 2 and the tension of the biasing means 24. Thus, the situation can be prevented in which the abutting part 7*c* of the disk end detection lever 7 accidentally engages over the small diameter disk 44*b*.

The difference in comparison with the case of the large diameter disk 44*a* is that the disk 44 which is inserted is not the large diameter disk 44*a* but the small diameter disk 44*b* and that the portion by which the disk end detection lever 7 is temporarily locked is not the protruded part 2*k* but the protruded part 2*m* of the frame 2.

5. Release of Temporary Locking of Swinging of Disk End Detection Lever 7 After Eject Starts and Detection of Eject Position (Case by the First Switch 42)

(a) As a result of the swinging of the arm cam 18, the intermediate transmission gear 25, which has been axially moved by the cam face 18*a*, returns to a position where the large diameter gear 25*b* engages with the gear 32 by the urging force of the biasing means 27 (spring member i.e., coil spring). Therefore, the transporting roller 16 starts to rotate and the carrying for ejection of the small diameter disk 44*b* is started (see FIGS. 30(A) and 30(B)).

(b) When the small diameter disk 44*b* starts moving, the protruded part 7*d* of the disk end detection lever 7 is pushed by the wall 17*a* of the trigger plate 17 and the disk end detection lever 7 escapes from the locking of the protruded part 2*m* of the frame 2. In this state, the small diameter disk 44*b* is present at the most apart position from the turntable 38 in the playing space and the small diameter disk 44*b* is located at a position apart from the abutting part 7*c* of the disk end detection lever 7.

(c) The pair of detection arms 4, 5 is swung in the opening direction by the carrying for ejection of the small diameter disk 44*b*. Therefore, the first switch 42 is changed from OFF to ON and thus this position is detected as the eject position and the rotation of the motor 19 is stopped after the elapse of a prescribed time period. In other words, since the motor 19 is rotated during the prescribed time period after the first switch 42 is changed to ON, the small diameter disk 44*b* is carried to the eject position where a user can pick up and take out the small diameter disk 44*b*.

6. Completion of Ejection (Stoppage)

When a user takes out the small diameter disk 44*b* from the disk slot 3 in the state shown in FIGS. 31(A) and 31(1B), the first switch 42 is changed from ON to OFF, and thus the taking out of the small diameter disk 44*b* is recognized and the operation is finished.

The disk player device is provided with the disk playing space 58 on the inner side of the disk slot 3. The disk slot 3 is formed at a position which is deviated in the direction of the disk rotating shaft with respect to the disk playing position (position of the disk 44 shown by the two-dot chain line in FIG. 32) in the disk playing space 58. The disk player device in accordance with the embodiment of the present invention is a type in which a disk is inserted while the disk is laid. The disk slot 3 is formed at a position which is deviated in the vertical direction with respect to the disk playing position, for example, in the lower direction. As shown by the solid line in FIG. 32, the disk 44 which is inclined toward the disk playing position is carried obliquely to the disk playing position from the disk slot 3 under the state that the turntable 38 and the damper 37 are retreated from the disk playing space 58. In this case, the disk 44 is carried while the tip end of the disk 44 slides along a housing which is provided with the damper 37, that is, the disk 44 slides along the under face of the frame 2 in the embodiment of the present invention. Then, as shown by the two-dot chain line in FIG. 32, the turntable 38 and the damper 37 are advanced in the disk playing space 58 to hold the disk 44, and the slope of the disk 44 is cancelled and the disk 44 is positioned in a playing attitude.

Therefore, the disk 44 can be carried by utilizing the disk playing space 58. In other words, the disk playing space 58 is formed wider by the distances D1 and D2 in the rotation shaft direction in FIG. 32 than the thickness of the disk 44 in consideration of the deviation of the disk 44 which is being played. Since this space can be utilized for carrying the disk 44, the carrying space other than the disk playing space 58 which is required only to carry the disk can be made small. The attitude at the time of carrying the disk 44 is the inclined state with respect to the playing attitude and thus the disk can not be played directly. However, the attitude of the disk 44 can be changed in the lateral state, which is capable of playing, by means of holding the disk 44 with the turntable 38 and the damper 37 after the disk has been carried.

Accordingly, the disk 44 can be carried by utilizing the disk playing space 58 and thus the carrying space required only to carry the disk 44 can be made small and the device can be miniaturized.

Since the tip end of the inclined disk 44 is slid on the under face of the frame 2, the drift of the disk 44 during carrying can be prevented.

In an embodiment of the present invention, there is provided with the transporting roller 16, which is disposed on the inner side of the disk slot 3 at a position where it does not come into contact with the disk 44 during playing, the guide base 15 which is movable between a pressurizing position (solid line position in FIG. 32) where the disk 44 is pressed on the transporting roller 16 in an inclined state and a retreated position (position in FIG. 6 and position shown by the two-dot chain line in FIG. 32) where the disk 44 during playing does not come into contact with the guide base 15, and an operation means (cam plate 13 in the present embodiment) which makes the guide base move to the pressurizing position at the time of carrying the disk and makes the guide base 15 move to the retreated position at the time of the playing of the disk 44. The operation means makes the guide base 15 move to the retreated position from the pressurizing position at the time or just before the protruded part of the turntable 38 is inserted into the center hole 44*c* of the disk 44.

Therefore, the disk 44 can be carried by using the transporting roller 16. The disk 44 is carried in the inclined state in which the disk 44 is sandwiched by the transporting roller 16 and the guide base 15. After the disk 44 has been carried, the guide base 15 is moved to the retreated position and the inclination of the disk 44 is canceled by means of holding with the turntable 38 and the damper 37 and the disk 44 is changed into a playing attitude. In this case, the timing when the cam plate 13 as the operation means makes the guide base 15 move to the retreated position from the pressurizing position, in other words, the timing when the guide base 15 is separated from the disk 44, is at the time or just before the protruded part of the turntable 38 is inserted into the center hole 44*c* of the disk 44. Therefore, the disk 44 can be securely held (chucked) with the turntable 38 and the damper 37.

In an embodiment of the present invention, the shutter 14*b* is provided for closing the disk slot 3 at the time of the playing of a disk. The shutter 14*b* is closed by interlocking with the guide base 15 moving from the pressurizing position to the retreated position. Therefore, the shutter 14*b* closes the disk slot 3 in cooperation with the chucking operation and thus further insertion of another disk 44 can be prevented in the state in which a disk 44 has been inserted.

Further, the disk player device includes a disk placing part (swing chassis 41 in the present embodiment) which is movable between the retreated position (position in FIG. 4) and the play position (position in FIG. 6) and a cam member provided with a cam recessed part (cam hole) for guiding the protruded part 41*a* of the swing chassis 41. The swing chassis 41 is moved to the retreated position or to the play position by the movement of the cam member. In the embodiment of the present invention, the cam plate 13 in a plate shape is used as the cam member. However, the cam member is not limited to be formed in a plate shape.

As shown in FIG. 10(B), FIGS. 11(A) and 11(B) and FIGS. 41(A) and 41(B), the cam member (cam plate 13) is formed with spring parts 47 each of which is capable of being elastically deformed by a cut part 46 continuously formed with the cam hole 13*a* (cam recessed part). The protruded part 41*a* makes the spring part 47 elastically deformed and the spring part 47 presses against the protruded part 41*a*.

Therefore, as shown in FIGS. 11(B) and 41(B), when the protruded part 41*a* of the swing chassis 41 is guided to the position of the spring part 47 of the cam hole 13*a* by the movement of the cam plate 13, the protruded part 41*a* pushes the spring part 47 to cause to be elastically deformed. Accordingly, the spring part 47 pushes and presses the protruded part 41*a* to a wall 62. In other words, the protruded part 41*a* of the swing chassis 41 can be pressed against the wall 62 in the groove 63 formed at the opposed position to the protruded part 41*a* of the chassis 41 by the pressing force of the spring part 47. Therefore, the swing chassis 41 is fixed and shaking can be prevented. For example, when the spring part 47 is provided at the position where the turntable 38 mounted on the swing chassis 41 is moved at the play position, the shaking of the turntable 38 at the time of the playing of the disk can be prevented. Further, the height position of the turntable 38 can be maintained at the time of the playing of the disk and thus the deviation and vibration due to the unbalance in the disk rotation can be prevented.

A fitting protruded part 48 and a fitting recessed part 49 are provided between the chassis 1 as the housing and the swing chassis 41 such that they are fitted in the pressing direction of the spring part 47 (see FIG. 12). An inclined face 50 for abutting with the other side is provided on either one of the fitting protruded part 48 and the fitting recessed part 49. In the embodiment of the present invention, the fitting protruded part 48 is provided on the swing chassis 41 and a hole as the fitting recessed part 49 is formed in the chassis 1. The fitting protruded part 48 is a conical protruded part and its conical face is the inclined face 50. The fitting recessed part 49 is a conical hole and its circumference face is the inclined face 50.

Therefore, the pressing force of the spring part 47 acts in the direction of making the fitting protruded part 48 fit into the fitting recessed part 49 more deeply to press their inclined faces 50 with each other. In other words, the fitting protruded part 48 and the fitting recessed part 49 can be fitted more deeply by the pressing force of the spring part 47. Therefore, the swing chassis 41 can be further securely clamped in the direction perpendicular to the pressing direction of the spring part 47 and thus the shaking of the swing chassis 41, i.e., the turntable 38 and the like can be further securely prevented. Particularly, when the inclined face 50 is formed in a conical face, the swing chassis 41 can be further securely clamped in the direction of 360 degrees perpendicular to the pressing direction of the spring part 47. Therefore, the shaking of the swing chassis 41 can be further securely prevented in either of the upper and lower, right and left and front and rear directions of the disk player device. For example, when the spring part 47 is provided at the position where the turntable 38 on the swing chassis 41 is moved to the play position, the shaking of the turntable 38 at the time of the playing of the disk can be further securely prevented in either of the upper and lower, right and left and front and rear directions. Further, the height position of the turntable 38 can be maintained at the time of the playing of the disk and thus the deviation and vibration due to the unbalance in the disk rotation can be prevented.

FIG. 11(B) is described for convenience such that the entire swing chassis 41 moves upward in a parallel manner to easily understand the relationship between the cam hole 13a and the protruded part 41a. However, actually, the swing chassis 41 is swung about the shaft part 41b (see FIGS. 4 through 6).

Further, there is provided the damper 37 for holding the disk 44 between the turntable 38 and the damper 37 at the time of the playing of the disk, the shutter 14b for closing the disk slot 3 at the time of the playing of the disk, and the guide base 15 which moves between the pressurizing position where the disk 44 is pressed on the transporting roller 16 at the time of insertion of the disk and the retreated position apart from the disk 44 at the time of the playing of the disk. The damper 37, the shutter 14b and the guide base 15 are operated by the cam plate 13. Therefore, the damper 37, the shutter 14b and the guide base 15 can be simultaneously operated and thus the timing of these operations can be accurately controlled in a synchronous manner. In addition, operation means for each of the damper 37, the shutter 14b and the guide base 15 is not required to be arranged separately. Therefore, the number of component parts can be decreased, the device can be miniaturized and its quality can be improved.

The disk player device includes a disk carrying force connecting and separating mechanism. The disk carrying force connecting and separating mechanism is arranged as a gear train 51, which transmits a driving force of the motor 19 as a drive source to the transporting roller 16 for carrying the disk 44 as shown in FIG. 2. The meshing with and the separation from another gear are changed by axially moving the intermediate transmission gear 25 constructing the gear train 51.

Therefore, the meshing with another gear (driving force transmitting state) and the separation of the meshing (state in which the driving force is not transmitted) can be changed by axially moving the intermediate transmission gear 25. In other words, the rotation shaft of the intermediate transmission gear 25 is not required to move such that the meshing state is changed by moving the intermediate transmission gear 25 in the direction except the axial direction (radial direction, tangential direction of its outer periphery and their composite direction) and thus the construction becomes simple and the number of component parts can be reduced. Further, since the rotation axis of the intermediate transmission gear 25 can be formed in a fixed type, the meshing between-axes distance with another gear can be accurately maintained. Therefore, the rotation of the gear can be smoothly performed and the occurrence of a noise can be prevented. In addition, since the intermediate transmission gear 25 is moved in the direction perpendicular to the rotating direction of the gear, the affections to the rotation of the gear (variation of rotational load and rotation speed or the like) caused by the movement of the intermediate transmission gear 25 can be restrained most. In other words, when the intermediate transmission gear 25 is moved in the direction except the axial direction (radial direction, tangential direction of its outer periphery and their composite direction), the moving direction and the rotating direction of the gear exist on the same plane. Therefore, the movement of the intermediate transmission gear 25 remarkably affects the rotation of the gear (variation of rotational load and rotation speed or the like). However, in the disk carrying force connecting and separating mechanism in accordance with the embodiment of the present invention, the above-mentioned affection can be restrained.

The intermediate transmission gear 25 is movable between the position where it meshes with both a driving side gear and a driven side gear and the position where the meshing is disengaged from either one of or both the driving side gear and the driven side gear. The intermediate transmission gear 25 in accordance with the embodiment of the present invention is constructed of the large diameter gear 25b and the pinion gear 25a. The large diameter gear 25b meshes the gear 32 as the driven side gear and the meshing is released based on the movement in the axial direction. The large diameter gear 25b always meshes with the gear 28 that is the driving side gear. Further, the meshing of the pinion gear 25a with the rack 17c of the trigger plate 17 is not released by the movement of the intermediate transmission gear 25 in the axial direction.

The disk carrying force connecting and separating mechanism includes the biasing means (spring member, i.e., coil spring) 27 for biasing the intermediate transmission gear 25 to either one of the meshing position and the meshing disengage position and the arm cam 18 which makes the intermediate transmission gear 25 axially move in relation to the movement of the guide base 15 that presses the disk 44 on the transporting roller 16. Therefore, the meshing state of the intermediate transmission gear 25 can be changed based on the movement of the guide base 15.

The disk player device is provided with a disk carrying device. The disk conveying device includes the transporting roller 16 for carrying the inserted disk 44 to the chucking position (the position where the protruded part 38a of the turntable 38 fits into the center hole 44c of the disk 44, the position of the large diameter disk 44a in FIGS. 18(A) and 18(B), and the position of the small diameter disk 44b in FIGS. 27(A) and 27(B), the turntable 38 and the damper 37 for holding the disk 44 carried to the chucking position, the cam plate 13 for moving the turntable 38 and the damper 37, the trigger plate 17 which is slid by the carrying of the disk 44 to the chucking position for changing the transmission route of driving force from the transporting roller 16 to the cam plate 13, the first biasing means (spring member, i.e., coil spring) 52 for biasing the trigger plate 17 toward the position before sliding, the guide base 15 for pressing the disk 44 on the transporting roller 16, the arm roller 14 which is disposed on the opposite side of the guide base 15 across the transporting roller 16 for moving the guide base 15 in the direction apart from the transporting roller 16, and the second biasing means 53 (spring member, i.e., coil spring) disposed between the guide base 15 and the arm roller 14. The guide base 15 and the arm roller 14 abut with each other when the disk 44 is not sandwiched between them. The second biasing means 53 is attached between the guide base 15 and the arm roller 14 such that their abutting parts are abutted with each other by its urging force. When the disk 44 is present between the guide base 15 and the transporting roller 16, the second biasing means 53 is extended to give urging force for pulling the guide base 15 toward the transporting roller 16 side.

Therefore, when the disk 44 is not inserted, the guide base 15 and the arm roller 14, which are disposed across the transporting roller 16, abut with each other and thus the urging force of the second biasing means 53 does not affect the portion except the abutting parts or hardly affect the portion even if it may affect. Further, in this state, the trigger plate 17 is located at the position prior to sliding by the first biasing means 52 and the transmission route of the rotating force of the motor 19 is set to be on the transporting roller 16 side.

When the disk 44 is inserted into the disk insert slot 3, the disk 44 makes the guide base 15 move in the direction apart from the transporting roller 16 and the arm roller 14, and the disk 44 enters between the guide base 15 and the transporting roller 16. Thus, the guide base 15 is separated from the arm roller 14. Therefore, the second biasing means 53 is extended and urging force is generated which pulls the guide base 15 back toward the arm roller 14 and the transporting roller 16. The guide base 15 presses the disk 44 on the transporting roller 16 by the urging force.

The disk 44 inserted into the disk insert slot 3 is carried to the chucking position by the transporting roller 16. When the disk 44 is carried to or just before the chucking position, the disk 44 makes the trigger plate 17 slide against the urging force of the first biasing means 52 and thus the transmission route of the rotating force of the motor 19 is changed from the transporting roller 16 to the cam plate 13. Therefore, the transporting roller 16 is stopped and the cam plate 13 is moved. The turntable 38 and the damper 37 are moved by the movement of the cam plate 13 and the disk 44 that is stopped at the chucking position is sandwiched (clamped). Further, the arm roller 14 makes the guide base 15 move in the direction apart from the transporting roller 16 and the guide base 15 is retreated to the position where the guide base 15 does not come into contact with the disk 44 during playing. Then, the playing of the disk 44 is started.

After the playing is finished, the reverse operations as described above are performed and the disk 44 is ejected by rotating the motor 19 in the reverse direction.

The biasing means (first biasing means 52) for the trigger plate 17 and the biasing means (second biasing means 53) for the guide base 15 are provided separately. Therefore, the magnitude of the urging force for the trigger plate 17 and the magnitude of the urging force for the guide base 15 can be set separately. Accordingly, these urging forces can be easily set in a suitable manner.

The second biasing means 53 is mounted between the guide base 15 and the arm roller 14, which are abutted with each other, such that their abutting parts are held by its urging force. Since the second biasing means 53 is extended to give urging force when the disk 44 is present between the guide base 15 and the transporting roller 16, the urging force does not act on the portion except abutting parts of the guide base 15 and the arm roller 14 when the disk 44 is not present between them. Thus, even when the guide base 15 and the arm roller 14 are produced from plastic such as ABS, PC, POM, PS and AS, the occurrence of the creep deformation over a long time, the deformation due to a high temperature, the cracking at a low temperature or the like can be prevented. In other words, the material of structure members affected by the urging force of the second biasing means 53 can be changed from an expensive material (expensive plastic such as plastic containing metals such as sheet iron or glass fiber or heat-resistant plastic) to inexpensive material, and thus production cost can be reduced.

The second biasing means 53 is disposed near the abutting position of the guide base 15 and the arm roller 14. Therefore, the second biasing means 53 can be mounted on the portions with a high degree of rigidity of the guide base 15 and the arm roller 14. Accordingly, adverse influence due to the urging force of the second biasing means 53 which is given to the guide base 15 and the arm roller 14 can be further surely prevented.

The arm roller 14 is provided with the shutter 14b. The disk insert slot 3 is closed by the shutter 14b interlocked with the operation separating the guide base 15 from the transporting roller 16. Therefore, the shutter 14b can be closed interlocked with the operation of the arm roller 14 separating the guide base 15 from the transporting roller 16. Accordingly, the shutter 14b can be closed interlocked with the operation of the guide base 15 retreated to the position where it does not come into contact with the disk 44 during playing.

The disk player device is provided with a sensor actuating mechanism. The sensor actuating mechanism includes the pair of detection arms 4, 5 which swing in the opening or closing direction by abutting with the peripheral edge of the inserted disk 44, a synchronous means for synchronizing the opening and closing swinging of the pair of detection arms 4, 5, the biasing means 22 biasing the pair of detection arms 4, 5 in the closing direction, the first switch 42 which is changed when the detection arms 4, 5 are opened slightly, and the second switch 43 which is changed when the detection arms 4, 5 are opened to the position where the detection arms 4, 5 reach in the case of the large diameter disk 44a but do not reach in the case of the small diameter disk 44b. The disk 44 is judged to be the large diameter disk 44a when the first switch 42 is changed by the insertion of the disk 44 and then the second switch 43 is changed. Further, when the first switch 42 is changed by the insertion of the disk 44 and then the first switch 42 is changed again without the second switch 43 being changed, it is judged that the disk 44 is the small diameter disk 44b and has carried further inside than a specified position (passing a specified position). When the disk 44 is judged to be the large diameter disk 44a, at the time of ejection of the disk 44, after the second switch 43 is changed and then a predetermined time period has passed, the motor 19 is stopped. When the disk 44 is judged to be the small diameter disk 44b, at the time of ejection of the disk, after the first switch 42 is changed and then a predetermined time period has passed, the motor 19 is stopped.

At the time of the carrying of the disk, the width of the disk 44 first increases and then decreases at the position where the detection arms 4, 5 abut with the disk. Therefore, the pair of detection arms 4, 5 are pushed by the disk 44 and swung in the opening direction according to the increase of the disk width, and then the pair of detection arms 4, 5 are swung in the closing direction by the biasing means (spring member, i.e., torsion spring) 22 according to the decrease of the disk width. Since the pair of detection arms 4, 5 are swung synchronously with the synchronizing means, the first and the second switches 42, 43 can be satisfactorily changed even when the inserted position of the disk 44 is deviated.

Therefore, the first and the second switches 42, 43 can be satisfactorily changed even when the inserted position of the disk 44 is deviated as well as the case that the disk 44 is inserted into the center position of the disk slot 3. Accordingly, two switches 42, 43 can be satisfactorily operated. Further, the detection of insertion of a disk, the confirmation of loading, the detection of disk position at the time of ejection of the disk, and the detection whether the inserted disk 44 is the large diameter disk 44a or the small diameter disk 44b can be performed by the two switches 42, 43 and thus the number of expensive switches can be decreased to reduce production cost.

In an embodiment of the present invention, a detection arm operating means (disk end detection lever 7 and switching arm 6) is provided which makes the pair of detection arms 4, 5 open to the position where the second switch 43 is changed when the large diameter disk 44a is carried to a predetermined position. The large diameter disk 44a is judged to have been carried to the predetermined position based on the switching of the second switch 43.

Accordingly, the loading of the large diameter disk 44a can be confirmed. Further, since the pair of detection arms 4, 5 are maintained in an opened state by the detection arm operating means, the operation for opening the detection arms 4, 5 against the urging force of the biasing means 22 is reduced at the time of ejection of the disk and thus the load at the time of ejection of the disk can be reduced.

The disk player device is provided with a disk guide device. The disk guide device includes the transporting roller 16 for carrying the inserted disk 44 to the chucking position, the pair of detection arms 4, 5 which abut with the periphery of the inserted disk 44 and synchronously swing in the opening direction by the insertion of the disk 44, the biasing means 22 for urging the pair of detection arms 4, 5 in the closing direction, the guide lever 8 which is provided with the stopper part 8a protruding into the disk playing space 58 and turnably disposed at the position where the periphery of the small diameter disk 44b abuts with the stopper part 8a when the small diameter disk 44b is carried to the chucking position, a stopper retreating means 54 for turning the guide lever 8 at the time of the carrying of the large diameter disk 44a such that the stopper part 8a is retreated from the disk playing space 58, a first lock means 55 for maintaining the guide lever 8 in the state that the stopper part 8a is protruded into the disk playing space 58, and a second lock means 56 for maintaining the guide lever 8 in the state that the stopper part 8a is retreated from the disk playing space 58.

In an embodiment of the present invention, the stopper retreating means 54 is constructed of the protruded part 6e formed on the switching arm 6 and the recessed part 8c formed on the guide lever 8. When the switching arm 6 is swung by the swinging of the pair of detection arms 4, 5, the guide lever 8 is turned about 90 degrees (see FIG. 34) while the protruded part 6e fits into the recessed part 8c as shown in FIG. 33. Even though the turning of the switching arm 6 is in either direction, the guide lever 8 can be turned while the protruded part 6e fits into the recessed part 8c.

In an embodiment of the present invention, the protrusion 10b formed on the lift plate 10 and the protruded part 8b formed on the guide lever 8 are served as the first lock means 55 and the second lock means 56. The protrusion 10b is located on the upper side of the protruded part 8b during playing of the small diameter disk 44b as shown in FIG. 35(A). Therefore, the stopper part 8a of the guide lever 8 can not be turned in the direction retreated from the disk playing space 58 (function as the first lock means 55). Further, the protrusion 10b is located on the under side of the protruded part 8b during playing of the large diameter disk 44a as shown in FIG. 35(B). Therefore, the stopper part 8a of the guide lever 8 can not be turned in the direction protruding to the disk playing space 58 (function as the second lock means 56).

The disk 44 inserted into the disk slot 3 is carried to the chucking position by the transporting roller 16. In this case, the disk 44 goes inside while pushing and swinging the pair of detection arms 4, 5 in the opening direction against the urging force of the biasing means 22. The pair of detection arms 4, 5 which is synchronously turned is swung in the opening direction in a bilaterally symmetrical manner and the disk 44 is guided to the center of the disk playing space 58.

When the inserted disk 44 is the large diameter disk 44a, the stopper retreating means 54 turns the guide lever 8 to make the stopper part 8a retreat from the disk playing space 58 (see the two-dot chain line in FIG. 34). Therefore, the large diameter disk 44a advances inside without abutting with the stopper part 8a and carried to the chucking position. On the other hand, when the inserted disk 44 is the small diameter disk 44b, the stopper part 8a is retained as it is protruded in the disk playing space 58 (see the solid line in FIG. 34) because the stopper retreating means 54 does not turn the guide lever 8. Therefore, the inserted small diameter disk 44b is carried until it abuts with the stopper part 8a. When the small diameter disk 44b is carried to the chucking position, the guide lever 8 is disposed at the position where the periphery of the small diameter disk 44b abuts with the stopper part 8a, and thus the small diameter disk 44b abutted with the stopper part 8a is positioned at the chucking position.

The small diameter disk 44b which is positioned at the chucking position is held (clamped) by the turntable 38 and the damper 37 and played. In this case, the small diameter disk 44b becomes slightly away from the stopper part 8a by the above-mentioned clamping. At the time of playing of the small diameter disk 44b, the protrusion 10b and the protruded part 8b serve as the first lock means 55 to retain the guide lever 8. Therefore, the guide lever 8 is prevented to be turned by vibration or the like and thus the stopper part 8a is prevented to abut with the small diameter disk 44b. On the other hand, at the time of playing of the large diameter disk 44a, the protrusion 10b and the protruded part 8b serve as the second lock means 56 to retain the guide lever 8. Therefore, the guide lever 8 is prevented to be turned by vibration or the like and thus the stopper part 8a is prevented from protruding in the disk playing space 58 and from abutting with the large diameter disk 44a. In other words, the situation in which the stopper part 8a abuts with the disk 44 during playing can be securely prevented.

The disk guide device includes the click means 45 which makes the guide lever 8 elastically deform at a middle position (position in FIG. 36(B)) which is between a first position of the guide lever 8 (position in FIG. 36(A)) where the stopper part 8a is protruded in the disk playing space 58 and a second position (position in FIG. 36(C)) where the stopper part 8a is retreated from the disk playing space 58. The guide lever 8 is turned to the first position or the second position from the middle position by return force generated by the elastic deformation. In the embodiment of the present invention, the click means 45 is constructed of the protruded part 8d formed on the guide lever 8 and the protruded part 2n formed on the frame 2 as shown in FIGS. 36(A), 36(B) and 36(C). When the turning position of the guide lever 8 becomes to the middle position, the protruded part 8d comes into contact with the protruded part 2n. The guide lever 8 and the frame 2 are resin component parts and thus they can be elastically deformed. Therefore, when the protruded part 8d comes into contact with the protruded part 2n by the turning of the guide lever 8, the guide lever 8 itself and the protruded part 8d and the protruded part 2n are elastically deformed and thus the position of the guide lever 8 is separated from the frame 2 by the distance D3 (see FIG. 36(B)) to permit the turning of the guide lever 8.

In other words, in order to make the guide lever 8 turn from the first position to the second position or from the second position to the first position, the guide lever 8 is required to be elastically deformed to come beyond the click means 45. Therefore, the guide lever 8 is prevented from being turned to change its position by vibration or the like. Further, even when the guide lever 8 stops at the middle position during turning, the guide lever 8 can be turned to the first position or the second position by utilizing the elastic force of the guide lever 8 itself.

Accordingly, a click feeling can be provided for the turning of the guide lever 8 by utilizing the elastic force of the guide lever 8 itself. Also, the guide lever 8 can be prevented from turning due to vibration or the like by utilizing the feeling of click. In addition, since the elastic force of the guide lever 8 itself is utilized to obtain the feeling of click, it is not required to use an urging member such as a spring as a discrete component part and thus the increase of the number of component parts and production cost can be restrained.

The guide lever 8 is provided with two stopper parts 8a so as to be disposed in a bilateral symmetrical manner with respect to the small diameter disk 44b located at the chucking position. The stopper part 8a is formed with a guide face 8e for guiding the small diameter disk 44b to the other stopper part 8a side when the small diameter disk 44b abuts with one of the stopper parts 8a. The transporting roller 16 is formed to be gradually larger in diameter toward both ends from the center portion. This is shown in FIG. 37.

Since the transporting roller 16 is formed to be gradually larger in diameter toward both ends from the center, a force for carrying the disk 44 toward obliquely left forward side is generated in the portion on the right side from the center and a force for carrying the disk 44 toward obliquely right forward side is generated in the portion on the left side from the center. Therefore, even though the disk 44 is inserted into the position which is deviated from the center of the disk slot 3 (laterally deviated position), the disk 44 can be carried while moving in the center direction. When the disk 44 is inserted to the center position of the disk slot 3, forces acting on the right and left sides of the disk 44 are cancelled and thus the disk 44 can be carried forward straightly.

When the inserted position of the small diameter disk 44b to the disk slot 3 is remarkably deviated from the center, the small diameter disk 44b can not be sometimes moved to the center position until the small diameter disk 44b has been carried to the chucking position. In this case, the small diameter disk 44b abuts with one of the stopper parts 8a. The stopper part 8a is provided with a guide face 8e and the carrying force of the transporting roller 16 acts on the small diameter disk 44b in an obliquely forward direction. Therefore, the small diameter disk 44b abutting with one of the stopper parts 8a moves to the center direction while turning about the abutting point "P".

In other words, as shown in FIG. 37, when the inserted position of the small diameter disk 44b is apart from the center, the small diameter disk 44b is subjected to the carrying forces F1, F2 by the transporting roller 16. On the other hand, the carrying of the small diameter disk 44b is restricted by either one of two stopper parts 8a (right side stopper part 8a in the case of FIG. 37) of the guide lever 8. In this case, since the guide face 8e is provided on the stopper part 8a, the small diameter disk 44b abutting with the stopper part 8a moves along the guide face 8e while turning with the abutting point "P" as the turning center. Alternatively, the centering of the small diameter disk 44b is performed while sliding with respect to the guide face 8e. In other words, when the deviation distance between the center of the small diameter disk 44b and the abutting point "P" with the stopper part 8a is set to be "X", the small diameter disk 44b is turned in the direction of the arrow "A" in FIG. 37 by the rotating force of "F=(F1+F2)X" and moved to the chucking position at the center.

The shape of the guide face 8e is preferably formed to be similar to the shape of the outer periphery or the tangential line of the small diameter disk 44b in the state that the guide face 8e is in the vicinity of the outer periphery of the small diameter disk 44b at the time of playing, for example, as shown in FIGS. 38(A) and 38(B). The abutting point "P" for advancing the small diameter disk 44b to the center side is preferably set to be the most outside position or its vicinity of the guide face 8e.

In an embodiment of the present invention, the centering of the disk 44 is performed for a disk player device of a type in which a disk is inserted while the disk is laid. However, the centering of the disk 44 may be performed to a disk player device of a type in which a disk is inserted while the disk is stood on its end.

The disk player device includes a disk carrying device. The disk carrying device includes the first engagement part 2h which is provided on a fixing member and serves as the swinging fulcrum of disk end detection lever 7 for the small diameter disk 44b, the second engagement part 2i which is provided on the same fixing member as the first engagement part 2h and serves as the swinging fulcrum of the disk end detection lever 7 when the large diameter disk 44a is inserted, the biasing means 24 for urging the disk end detection lever 7 in the direction that the rotation shaft 7b moves to the first engaging part 2h, and the switching arm 6 which is moved by the insertion of the large diameter disk 44a to disengage the rotation shaft 7b of the disk end detection lever 7 from the first engagement part 2h against the urging force of the biasing means 24. The first engaging part 2h and the second engaging part 2i are connected by a guide groove 2j and the rotation shaft 7b of the disk end detection lever 7 is arranged so as to be movable between the first engagement part 2h and the second engagement part 2i. After the switching arm 6 has disengaged the rotation shaft 7b from the first engagement part 2h, the disk end detection lever 7 is moved by the carrying of the large diameter disk 44a and the rotation shaft 7b is moved to the second engagement part 2i. In the embodiment of the present invention, the first engagement part 2h and the second engagement part 2i are formed on the frame 2 which is the fixing member.

Therefore, in the state in which the disk 44 is not inserted, the disk end detection lever 7 is urged by the biasing means (spring member, i.e., coil spring) 24 and the rotation shaft 7b is located at the position where the rotation shaft 7b engages with the first engagement part 2h. In this state, when the small diameter disk 44b is carried to or just before the chucking position, the disk end detection lever 7 is pushed by the small diameter disk 44b and swung with the first engagement part 2h as the fulcrum.

When the large diameter disk 44a is inserted, the switching arm 6 is moved by the insertion of the large diameter disk 44a and thus the disk end detection lever 7 is moved so that the rotation shaft 7b is disengaged from the first engagement part 2h. When the large diameter disk 44a is carried further inside, the disk end detection lever 7 is moved by the large diameter disk 44a so that the rotation shaft 7b is moved to the second engagement part 2i. Then, when the large diameter disk 44a is carried to or just before the chucking position, the disk end detection lever 7 is pushed by the large diameter disk 44a and swung with the second engagement part 2i as the fulcrum.

Since the first engagement part 2h and the second engagement part 2i are formed on the frame 2, these can be positioned with a high degree of accuracy. Therefore, the positional accuracy of the swinging fulcrum for the disk end detection lever 7 is improved and thus the operation of members operated by the disk end detection lever 7 can be stabilized. In other words, the operation of the trigger plate 17 operated by the disk end detection lever 7 becomes stable and the switching timing of the transmission route for the driving force of the motor 19 can be controlled with a high degree of accuracy. Also, since the movement of the rotation shaft 7b of the disk end detection lever 7 can be controlled by the switching arm 6, the number of component parts is reduced and the construction becomes simple. As a result, the cost of component parts can be reduced, assembling productivity can be improved, and operation quality can be improved.

In the disk player device, static electricity generated on the transporting roller 16 is released on the ground side as follows (see FIG. 39). The metal shaft 16a of the transporting roller 16 is protruded outside of the sub chassis 26 and a spring wire 57 is made point contact with the protruded portion. The spring wire 57 is made of metal wire and provided with hooks 57a, 57b at both ends. The base end portion of the spring wire 57 is wound around in a spiral shape to be formed in a coil spring 57c. The spring wire 57 is disposed along the groove 26b of the sub chassis 26. A hook 57a of the tip end of the spring wire 57 is hung on a protruded part 26c of the sub chassis 26 in the state in which the coil spring 57c is extended a little. A hook 57b of the base end of the spring wire 57 is soldered in the state in which the hook 57b is hung on a hole that is formed at a contact point connected to the ground side of a switch circuit board 12. According to the construction described above, the transporting roller 16 is conductively connected to the ground side. The spring wire 57 can be made contact with the metal shaft 16a all the time by the elastic force given by the coil spring 57c and, even when the spring wire 57 disengages from the groove 26b of the sub chassis 26 and strands on the end face of the metal shaft 16a, the spring wire 57 can be returned in the groove 26b and made contact on the circumferential face of the metal shaft 16a.

The present invention is not limited to the embodiments described above, and many modifications can be made without departing from the subject matter of the present invention.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A disk carrying device comprising:
    a transporting roller for carrying a disk to a chucking position;
    a turntable and a damper for holding the disk carried to the chucking position;
    a cam plate for moving at least the turntable or the damper;
    a trigger plate, which is moved by carrying of the disk to the chucking position, for changing a transmission route of driving force from the transporting roller to the cam plate;
    a first biasing means for urging the trigger plate to a position before moving;
    a guide base for pressing the disk on the transporting roller;
    an arm roller which is disposed on an opposite side of the guide base with respect to the transporting roller so as to move the guide base apart from the transporting roller;
    a second biasing means disposed between the guide base and the arm roller; and
    a shutter provided on the arm roller for closing a disk slot in cooperation with an operation of the guide base being separated from the transporting roller;
    wherein the guide base and the arm roller abut with each other when the disk is not present between the guide base and the arm roller;
    the second biasing means is attached to the guide base and the arm roller such that abutting parts of the guide base and the arm roller are held in an abutted state by urging force of the second biasing means;
    the second biasing means is extended when the disk is present between the guide base and the transporting roller and generates urging force pulling the guide base to the transporting roller;
    the cam plate is provided with a cam hole for moving the arm roller, and the arm roller is moved by a movement of the trigger plate through the cam hole of the cam plate at a time of playing of the disk, and the guide base and the transporting roller are moved to be apart from each other against the second biasing means to be located out of a disk playing space; and
    movement of at least the turntable or the damper, and movement of the arm roller are operated by the cam plate.

2. The disk carrying device according to claim 1, wherein the second biasing means is disposed near an abutting position of the guide base with the arm roller.

3. The disk carrying device according to claim 1, wherein the first biasing means and the second biasing means are each a coil spring.

4. The disk carrying device according to claim 3, further comprising:
    a motor included in the transmission route of driving force;
    an intermediate gear which is included in the transmission route of driving force and which is rotationally driven by the motor and is axially movable; and
    an arm cam which is provided between the trigger plate and the cam plate so as to be swung by the trigger plate for transmitting movement of the trigger plate to the cam plate,
    wherein the intermediate gear is axially moved by the arm cam to change the driving force of the motor from the transporting roller to the cam plate.

* * * * *